(12) United States Patent
Pierce et al.

(10) Patent No.: US 8,041,505 B2
(45) Date of Patent: Oct. 18, 2011

(54) NAVIGATION SERVICES BASED ON POSITION LOCATION USING BROADCAST DIGITAL TELEVISION SIGNALS

(75) Inventors: Matthew D. Pierce, Los Angeles, CA (US); Matthew Rabinowitz, Portola Valley, CA (US)

(73) Assignee: TruePosition, Inc., Berwyn, PA (US)

( * ) Notice: Subject to any disclaimer, the term of this patent is extended or adjusted under 35 U.S.C. 154(b) by 0 days.

(21) Appl. No.: 12/834,580

(22) Filed: Jul. 12, 2010

(65) Prior Publication Data

US 2010/0292920 A1    Nov. 18, 2010

Related U.S. Application Data

(60) Continuation of application No. 10/121,836, filed on Apr. 11, 2002, now abandoned, which is a division of application No. 10/008,613, filed on Nov. 8, 2001, which is a continuation-in-part of application No. 09/932,010, filed on Aug. 17, 2001, now Pat. No. 7,126,536, which is a continuation-in-part of application No. 09/887,158, filed on Jun. 21, 2001, now abandoned.

(60) Provisional application No. 60/293,812, filed on May 25, 2001, provisional application No. 60/293,813, filed on May 25, 2001, provisional application No. 60/293,646, filed on May 25, 2001, provisional application No. 60/281,269, filed on Apr. 3, 2001, provisional application No. 60/281,270, filed on Apr. 3, 2001, provisional application No. 60/265,675, filed on Feb. 2, 2001.

(51) Int. Cl.
*G01C 21/00*    (2006.01)

(52) U.S. Cl. .......................... 701/201; 701/207; 701/208

(58) Field of Classification Search .......... 701/200–202, 701/213–215, 207–208; 340/988; 348/113, 348/118, 148–149; 342/357.06, 457, 463
See application file for complete search history.

(56) References Cited

U.S. PATENT DOCUMENTS

| | | | |
|---|---|---|---|
| 4,355,368 A | 10/1982 | Zeidler et al. |
| 4,555,707 A | 11/1985 | Connelly |
| 4,578,678 A | 3/1986 | Hurd |
| 4,652,884 A | 3/1987 | Starker |
| 4,700,306 A | 10/1987 | Wallmander |
| 4,876,598 A | 10/1989 | Carlstedt et al. |

(Continued)

FOREIGN PATENT DOCUMENTS

| | | |
|---|---|---|
| DE | 3242997 | 5/1984 |
| GB | 2 222 922 | 3/1990 |
| GB | 2 254 508 | 10/1992 |
| JP | 58129277 | 8/1983 |
| JP | 2000-023055 | 1/2000 |

OTHER PUBLICATIONS

U.S. Appl. No. 10/008,613, filed Nov. 8, 2001, Pierce et al.

(Continued)

*Primary Examiner* — Yonel Beaulieu
(74) *Attorney, Agent, or Firm* — Woodcock Washburn LLP

(57) ABSTRACT

A service depends on the location of a device. The device location is determined using DTV signals. More specifically, the device location is determined based on pseudo-ranges between the device and a plurality of digital television (DTV) transmitters and the pseudo-ranges are determined based on broadcast DTV signals received by the device from the DTV transmitters. Examples of DTV signals include the American Television Standards Committee (ATSC) signals, the European Telecommunications Standards Institute Digital Video Broadcasting-Terrestrial (DVB-T) signals and the Japanese Integrated Service Digital Broadcasting-Terrestrial (ISDB-T) signals.

21 Claims, 38 Drawing Sheets

U.S. PATENT DOCUMENTS

| | | | |
|---|---|---|---|
| 4,894,662 A | 1/1990 | Counselman | |
| 5,045,861 A | 9/1991 | Duffett-Smith | |
| 5,157,686 A | 10/1992 | Omura et al. | |
| 5,166,952 A | 11/1992 | Omura et al. | |
| 5,271,034 A | 12/1993 | Abaunza | |
| 5,323,322 A | 6/1994 | Meuller et al. | |
| 5,398,034 A | 3/1995 | Spilker, Jr. | |
| 5,432,542 A | 7/1995 | Thibadeau et al. | |
| 5,459,473 A | 10/1995 | Dempster et al. | |
| 5,481,316 A | 1/1996 | Patel | |
| 5,493,339 A | 2/1996 | Birch et al. | |
| 5,504,492 A | 4/1996 | Class et al. | |
| 5,510,801 A * | 4/1996 | Engelbrecht et al. | 342/457 |
| 5,604,765 A | 2/1997 | Bruno et al. | |
| 5,630,206 A | 5/1997 | Urban et al. | |
| 5,648,982 A | 7/1997 | Durrant et al. | |
| 5,774,829 A | 6/1998 | Cisneros et al. | |
| 5,784,339 A | 7/1998 | Woodsum et al. | |
| 5,835,060 A | 11/1998 | Czarnecki et al. | |
| 5,920,284 A | 7/1999 | Victor | |
| 5,938,034 A | 8/1999 | Josephsen et al. | |
| 5,940,411 A | 8/1999 | Takeda | |
| 5,952,958 A | 9/1999 | Speasl et al. | |
| 5,953,311 A | 9/1999 | Davies et al. | |
| 5,986,603 A | 11/1999 | Schipper | |
| 5,995,041 A | 11/1999 | Bradley et al. | |
| 5,999,223 A | 12/1999 | Patel et al. | |
| 6,006,097 A | 12/1999 | Hornfeldt et al. | |
| 6,016,119 A | 1/2000 | Krasner | |
| 6,028,537 A | 2/2000 | Suman et al. | |
| 6,055,020 A | 4/2000 | Lorenz et al. | |
| 6,078,284 A | 6/2000 | Levanon | |
| 6,094,168 A | 7/2000 | Duffett-Smith et al. | |
| 6,107,959 A | 8/2000 | Levanon | |
| 6,115,113 A | 9/2000 | Flockencier | |
| 6,131,067 A | 10/2000 | Girerd et al. | |
| 6,131,885 A | 10/2000 | Patel et al. | |
| 6,137,441 A | 10/2000 | Dai et al. | |
| 6,144,413 A | 11/2000 | Zatsman | |
| 6,147,642 A | 11/2000 | Perry et al. | |
| 6,160,587 A | 12/2000 | Walker et al. | |
| 6,181,921 B1 | 1/2001 | Konisi et al. | |
| 6,184,921 B1 | 2/2001 | Limberg | |
| 6,201,497 B1 | 3/2001 | Synder et al. | |
| 6,215,778 B1 | 4/2001 | Lomp et al. | |
| 6,229,480 B1 | 5/2001 | Shintani | |
| 6,289,280 B1 | 9/2001 | Fernandez-Corbaton et al. | |
| 6,317,452 B1 | 11/2001 | Durrant et al. | |
| 6,317,500 B1 | 11/2001 | Murphy | |
| 6,373,432 B1 | 4/2002 | Rabinowitz et al. | |
| 6,374,177 B1 | 4/2002 | Lee et al. | |
| 6,400,753 B1 | 6/2002 | Kohli et al. | |
| 6,400,767 B1 | 6/2002 | Nuber et al. | |
| 6,433,740 B1 | 8/2002 | Gilhousen | |
| 6,437,832 B1 | 8/2002 | Grabb et al. | |
| 6,473,038 B2 | 10/2002 | Patwari et al. | |
| 6,484,034 B1 | 11/2002 | Tsunehara et al. | |
| 6,487,500 B2 | 11/2002 | Lemelson et al. | |
| 6,522,297 B1 | 2/2003 | Rabinowitz et al. | |
| 6,559,800 B2 | 5/2003 | Rabinowitz et al. | |
| 6,559,894 B2 | 5/2003 | Omura et al. | |
| 6,563,893 B2 | 5/2003 | Smith et al. | |
| 6,590,529 B2 | 7/2003 | Schwoegler | |
| 6,617,940 B2 | 9/2003 | Stenberg | |
| 6,618,077 B1 | 9/2003 | Baina et al. | |
| 6,618,452 B1 | 9/2003 | Huber et al. | |
| 6,646,603 B2 | 11/2003 | Dooley et al. | |
| 6,711,214 B1 | 3/2004 | Hershberger | |
| 6,717,547 B2 | 4/2004 | Spilker, Jr. et al. | |
| 6,721,365 B1 | 4/2004 | Yin et al. | |
| 6,727,847 B2 | 4/2004 | Rabinowitz et al. | |
| 6,753,812 B2 | 6/2004 | Rabinowitz et al. | |
| 6,754,281 B1 | 6/2004 | Dujardin et al. | |
| 6,760,077 B2 | 7/2004 | Choi et al. | |
| 6,768,517 B2 | 7/2004 | Limberg et al. | |
| 6,806,830 B2 | 10/2004 | Panasik et al. | |
| 6,809,775 B2 | 10/2004 | Yule | |
| 6,816,628 B1 | 11/2004 | Sarachik et al. | |
| 6,839,024 B2 | 1/2005 | Spilker, Jr. et al. | |
| 6,859,173 B2 | 2/2005 | Spilker, Jr. et al. | |
| 6,861,984 B2 | 3/2005 | Rabinowitz et al. | |
| 6,879,286 B2 | 4/2005 | Rabinowitz et al. | |
| 6,907,224 B2 | 6/2005 | Younis | |
| 6,914,560 B2 | 7/2005 | Spilker, Jr. et al. | |
| 6,917,328 B2 | 7/2005 | Rabinowitz et al. | |
| 6,937,866 B2 | 8/2005 | Duffett-Smith et al. | |
| 6,952,182 B2 | 10/2005 | Spilker, Jr. et al. | |
| 6,961,020 B2 | 11/2005 | Robinowitz et al. | |
| 6,963,306 B2 | 11/2005 | Spilker, Jr. et al. | |
| 6,970,132 B2 | 11/2005 | Spilker, Jr. et al. | |
| 6,993,009 B2 | 1/2006 | Kelly et al. | |
| 7,042,396 B2 | 5/2006 | Omura et al. | |
| 7,042,949 B1 | 5/2006 | Omura et al. | |
| 7,120,123 B1 | 10/2006 | Quigley et al. | |
| 7,126,536 B2 | 10/2006 | Rabinowitz et al. | |
| 7,190,704 B2 | 3/2007 | Rabenko et al. | |
| 7,260,378 B2 | 8/2007 | Holland et al. | |
| 7,269,424 B2 | 9/2007 | Camp, Jr. | |
| 7,307,666 B2 | 12/2007 | Wu et al. | |
| 7,372,405 B2 | 5/2008 | Rabinowitz et al. | |
| 7,418,065 B2 | 8/2008 | Qiu et al. | |
| 7,430,193 B2 | 9/2008 | Kim et al. | |
| 7,463,195 B2 | 12/2008 | Rabinowicz et al. | |
| 7,466,266 B2 | 12/2008 | Opshaug | |
| 7,471,244 B2 | 12/2008 | Omura et al. | |
| 7,498,873 B2 | 3/2009 | Opshaug et al. | |
| 7,558,245 B2 | 7/2009 | Laroia et al. | |
| 7,573,423 B2 | 8/2009 | Monnerat | |
| 7,609,903 B2 | 10/2009 | Tanaka | |
| 7,733,270 B1 | 6/2010 | Rabinowitz et al. | |
| 7,737,893 B1 | 6/2010 | Furman et al. | |
| 7,792,156 B1 | 9/2010 | Lee et al. | |
| 7,826,343 B2 | 11/2010 | Krasner | |
| 7,860,193 B2 | 12/2010 | Gupta | |
| 2001/0046262 A1 | 11/2001 | Freda | |
| 2002/0090997 A1 | 7/2002 | Bailey | |
| 2002/0152462 A1 | 10/2002 | Hoch et al. | |
| 2002/0184653 A1 | 12/2002 | Pierce et al. | |
| 2003/0162547 A1 | 8/2003 | McNair | |
| 2004/0073914 A1 | 4/2004 | Spilker et al. | |
| 2004/0201779 A1 | 10/2004 | Spilker et al. | |
| 2005/0066373 A1 | 3/2005 | Rabinowitz | |
| 2005/0251844 A1 | 11/2005 | Martone et al. | |
| 2007/0050824 A1 | 3/2007 | Lee et al. | |
| 2007/0121555 A1 | 5/2007 | Burgess et al. | |
| 2009/0070847 A1 | 3/2009 | Furman et al. | |
| 2009/0175379 A1 | 7/2009 | Rubin et al. | |

OTHER PUBLICATIONS

U.S. Appl. No. 12/209,971, filed Sep. 12, 2008, Do et al.

Li, X. et al., "Indoor Geolocation Using OFDM Signals in HIPERLAN/2 Wireless LANS," 11th IEEE International Symposium on Personal Indoor and Mobile Radio Communications, PIMRC 2000, Proceedings (Cat. No. 00TH8525), Proceedings of 11th International Symposium on Personal Indoor and Mobile Radio Communication, London, UK, Sep. 18-21, 1449-1459, vol. 2, XPO10520871, 2000, Piscataway, NJ, USA, IEEE, USA, ISBN; 9-7803-6463-5, Chapter I and III.

Parkinson, B.W. et al., "Autonomous GPS Integrity Monitoring Using the Pseudorange Residual," *J. of the Institute of Navigation*, 1988, 35(2), 255-274.

Rabinowitz, M., "A dDifferential Carrier Phase Navigation System Combining GPS with Low Earth Orbi Satellites for Rapid Resolution of Integer Cycle Ambiguities," *PHD. Thesis for Department of Electrocl Engineering*, Stanford University, Dec. 2000, 59-73.

Rabinowitz, M. et al., "Positioning Using the ATSC Digital Televsion Signal," Rosum whitepaper, Online!, 2001, XP002235053, Retrieved from the Internet on Mar. 13, 2003 at URL www.rosum.com/whitepaper 8-7-01.pdf.

Spilker, Jr., J.J., "Fundamentals of Signal Tracking Theory," *Global Positioning System: Theory and Applications*, 1994, 1(7), 245-327.

Van Dierendock, A.J., "GPS Receivers," *Global Positioning System: Theory and Applications*, 1995, 1(8), 329-407.

* cited by examiner

1400

| 4 | 511 Symbols | 63 | 63 | 63 | 128 |

| 4 | 828 Symbols |

NAVIGATION SERVICES BASED ON POSITION LOCATION USING BROADCAST DIGITAL TELEVISION SIGNALS

CROSS-REFERENCE TO RELATED APPLICATIONS

This application is a continuation of U.S. application Ser. No. 10/121,836, filed Apr. 11, 2002, now abandoned, which is a divisional of U.S. application Ser. No. 10/008,613, filed Nov. 8, 2001, currently pending, which is a continuation-in-part of U.S. application Ser. No. 09/932,010, filed Aug. 17, 2001, now U.S. Pat. No. 7,126,536, which is a continuation-in-part of U.S. application Ser. No. 09/887,158, filed Jun. 21, 2001, now abandoned, which claims the benefit under 35 U.S.C. §119(e) of U.S. Provisional Application Nos. 60/265,675, filed Feb. 2, 2001; 60/281,269 and 60/281,270, both filed Apr. 3, 2001; and 60/293,646, 60/293,812, and 60/293,813, all filed May 25, 2001.

U.S. application Ser. No. 10/008,613 also claims the benefit under 35 U.S.C. §119(e) of U.S. Provisional Application Nos. 60/265,675, filed Feb. 2, 2001; 60/281,269 and 60/281,270, both filed Apr. 3, 2001; and 60/293,646, 60/293,812, and 60/293,813, all filed May 25, 2001, U.S. application Ser. No. 09/932,010 also claims the benefit under 35 U.S.C. §119(e) of U.S. Provisional Application Nos. 60/265,675, filed Feb. 2, 2001; 60/281,269 and 60/281,270, both filed Apr. 3, 2001; and 60/293,646, 60/293,812, and 60/293,813, all filed May 25, 2001.

The subject matter of all of the foregoing are incorporated herein by reference.

BACKGROUND OF THE INVENTION

1. Field of the Invention

This invention relates generally to position location and providing services based on position location. More specifically, it relates to providing services in cases where the position location is based on DTV signals.

2. Description of the Related Art

There have long been methods of two-dimensional latitude/longitude position location systems using radio signals. In wide usage have been terrestrial systems such as Loran C and Omega, and a satellite-based system known as Transit. Another satellite-based system enjoying increased popularity is the Global Positioning System (GPS).

Initially devised in 1974, GPS is widely used for position location, navigation, survey, and time transfer. The GPS system is based on a constellation of 24 on-orbit satellites in sub-synchronous 12 hour orbits. Each satellite carries a precision clock and transmits a pseudo-noise signal, which can be precisely tracked to determine pseudo-range. By tracking 4 or more satellites, one can determine precise position in three dimensions in real time, world-wide. More details are provided in B. W. Parkinson and J. J. Spilker, Jr., Global Positioning System-Theory and Applications, Volumes I and II, AIAA, Washington, D.C., 1996.

GPS has revolutionized the technology of navigation and position location. However in some situations, GPS is less effective. Because the GPS signals are transmitted at relatively low power levels (less than 100 watts) and over great distances, the received signal strength is relatively weak (on the order of −160 dBw as received by an omni-directional antenna). Thus the signal is marginally useful or not useful at all in the presence of blockage or inside a building.

There has even been a proposed system using conventional analog National Television System Committee (NTSC) television signals to determine position. This proposal is found in a U.S. patent entitled "Location Determination System And Method Using Television Broadcast Signals," U.S. Pat. No. 5,510,801, issued Apr. 23, 1996. However, the present analog TV signal contains horizontal and vertical synchronization pulses intended for relatively crude synchronization of the TV set sweep circuitry. Further, in 2006 the Federal Communication Commission (FCC) will consider turning off NTSC transmitters and reassigning that valuable spectrum so that it can be auctioned for other purposes deemed more valuable.

Knowledge of an object or individual's position is useful or even required in providing certain services. For example, emergency 911 services require knowledge of the caller's location. Similarly, navigation services typically require knowledge of the user's position. Other services, such as traffic reports and concierge services, can be provided without knowledge of an individual's location but can be greatly enhanced if the user's location is known.

However, the current position location systems have significant drawbacks that prevent or inhibit their use for many of these services. For example, the proposed NTSC system is not suitable for services that require high precision. In addition, since the NTSC transmitters may be turned off in 2006, services that require large initial investments are also less attractive since the time to recover the investment may be limited. GPS systems generally have higher precision than the NTSC system. However, the receivers are relatively complex and expensive, thus making the GPS approach inappropriate for services that require simple and/or low-cost receivers. In addition, the GPS signal is not particularly robust. GPS' low signal power makes it marginally useful in the presence of blockage or inside buildings. Its low bandwidth signal also makes it susceptible to multipath effects. The GPS satellites also travel at high speeds and significant Doppler aiding may be required to determine their exact location. At times, GPS geometries may be insufficient, leading to high Geometric Dilution of Precision (GDOP) and making it difficult to provide highly accurate position fixes. These factors make GPS unsuitable for many types of services.

SUMMARY OF THE INVENTION

The present invention overcomes the limitations of the prior art by providing a service according to a location of a device. The location is determined based on pseudo-ranges between the device and a plurality of digital television (DTV) transmitters. The pseudo-ranges are calculated based on broadcast DTV signals received by the device from the DTV transmitters. Examples of DTV signals include the American Television Standards Committee (ATSC) signals, the European Telecommunications Standards Institute Digital Video Broadcasting-Terrestrial (DVB-T) signals and the Japanese Integrated Service Digital Broadcasting-Terrestrial (ISDB-T) signals.

The use of DTV signals for position location has many advantages. To begin with, DTV signals have excellent coverage. In the United States, the use of DTV signals is mandated by the Federal Communication Commission. In addition, compared to GPS alternatives, DTV position location typically also has advantages of simple and inexpensive implementation, stronger and larger bandwidth signals, less susceptibility to multipath, and does not require network aiding to mitigate Doppler effects.

Different implementations enable different services to be provided to the user. Common services include both the performance of a physical service and/or the provision of information. Examples of services which are more physical in nature include emergency-911 service and roadside assistance. Examples of information-based services include navigation services (e.g., maps and directions), tracking (e.g., remote tracking of objects and "black-box" type applications) and providing information tailored to the device location (e.g., local news, local traffic reports, and information about local commercial establishments and points of interest). In another example, knowledge of the location of the device is used to adjust a configuration of the device (e.g., adjusting reception for a cell phone or data rate for a wireless modem). Other applications will be apparent.

Note that the device is not required to be mobile. It could be stationary. For example, DTV-based position location can be used to adjust a stationary television set for improved reception. Nor is the service necessarily provided to the user of the device or at the location of the device. For example, in remote tracking, the current location of an object may be provided to a third party (e.g., an insurer of the object) at some central location. Depending on the application, the service may or may not be requested by the user of the device. For example, with information-based services, the information may be solicited or unsolicited. In some implementations, there are different geographic domains (e.g., cells, service regions or zones) and the service depends on in which geographic domain the device is located. Once the location of the device is determined, it can be mapped into one of the geographic domains. The service appropriate to that domain can then be provided.

In different implementations, the various functions to be performed may be allocated among different entities in different ways. For example, in one approach, the device location is calculated by the device itself and then transmitted to (or requested by) a service provider's system. In a different approach, the device location is determined by a separate DTV location server in communication with the device. In another approach, there is no separate service provider; the device itself renders the service. As a final example, the service can be provided in many ways. In one implementation, the service provider provides the service directly to the user. In another approach, the service provider transmits a request for service to a third party, which provides the service. In yet another approach, the service provider transmits a key code for the service to the user, thus authorizing the user to acquire the service.

Other aspects of the invention include apparatus and systems for carrying out the methods described above. In one approach, the invention is implemented in software on a programmable processor. In another approach, some or all of the functions are also implemented in hardware.

BRIEF DESCRIPTION OF THE DRAWING

The invention has other advantages and features which will be more readily apparent from the following detailed description of the invention and the appended claims, when taken in conjunction with the accompanying drawing, in which:

FIG. 14 illustrates the structure of the field synchronization segment of the ATSC frame.

FIG. 15 illustrates the structure of the data segment of the ATSC frame.

FIG. 25 shows the carrier numbers for the first 50 continuous pilot carriers.

DETAILED DESCRIPTION OF THE PREFERRED EMBODIMENTS

Overview

Figure 1:
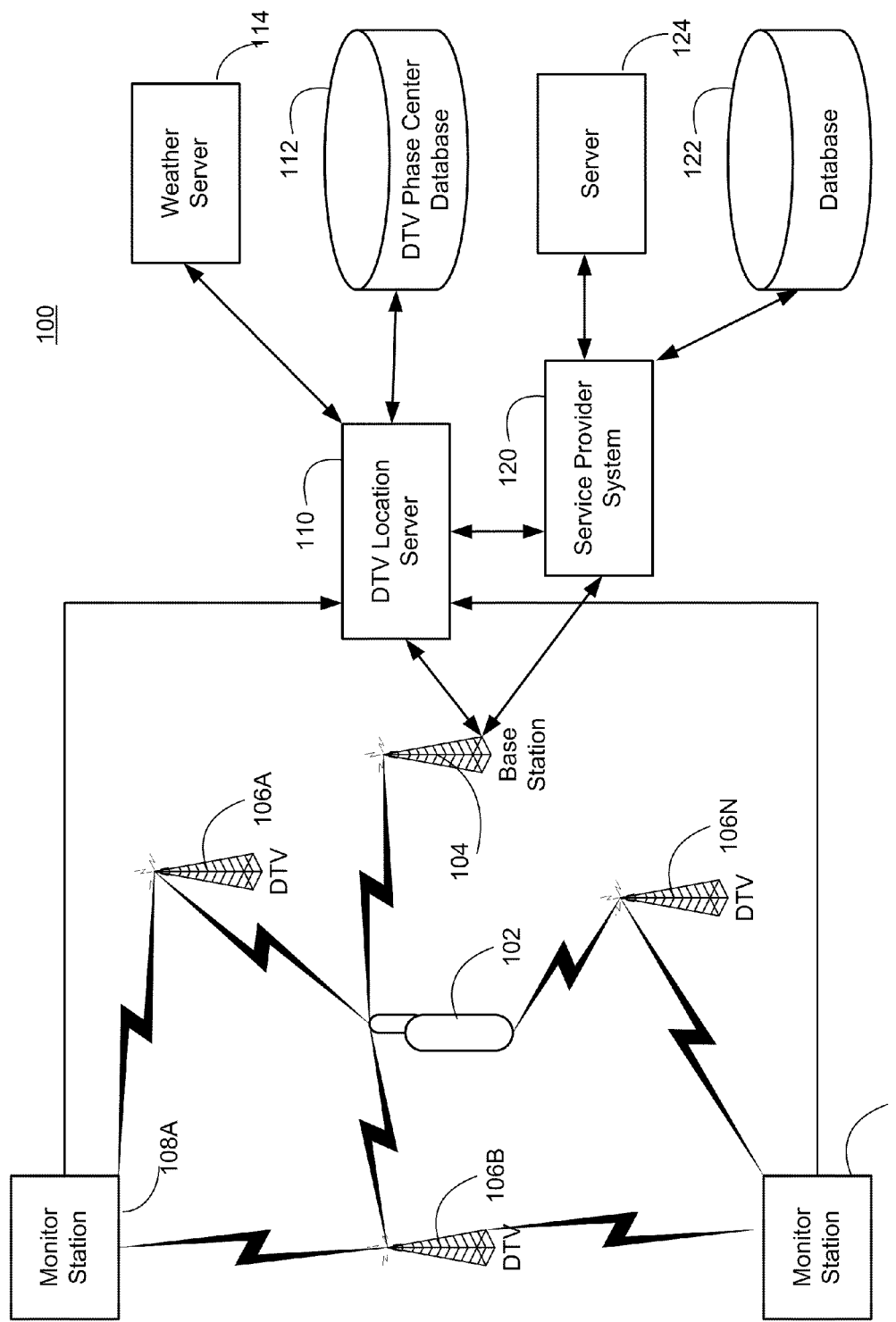
FIG. 1 depicts a system suitable for implementing the present invention.

FIG. 1 depicts a system 100 suitable for implementing the present invention. The system 100 includes a device 102 operated by a user, DTV transmitters 106A-106N, monitor stations 108A-108N, DTV location server 110, and service provider system 120. The DTV transmitters 106 broadcast DTV signals, including to device 102 and to the monitor stations 108. The DTV location server 110 is linked to the user device 102 (via base station 104 in this example) and to the monitor stations 108. The service provider system 120 is linked to the DTV location server 110 and to the user device 102 (also via base station 104 in this example).

Figure 2:
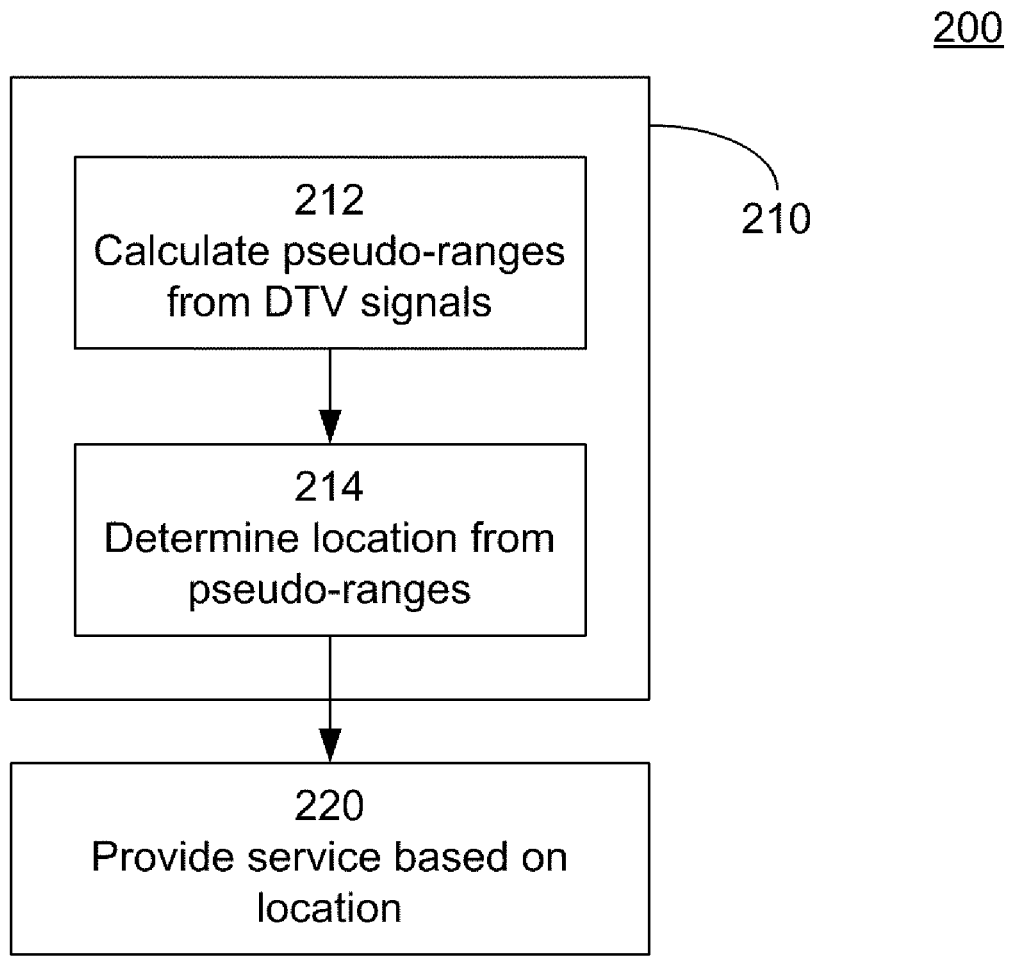
FIG. 2 is a flow diagram illustrating a method according to the present invention.

FIGS. 2-3 are flow diagrams illustrating methods according to the present invention. Generally speaking, as shown in FIG. 2, the location of device 102 is determined 210 using DTV signals which are received by the user device 102. A service which depends on this location is provided 220.

In the example of FIG. 1, the DTV transmitters 106, monitor stations 108 and DTV location server 110 are involved in determining 210 the location of the device 102. In one implementation (also shown in FIG. 2), the broadcast DTV signals received by device 102 are used to calculate 212 pseudo-ranges between the user device 102 and the DTV transmitters 106. The pseudo-ranges, in turn, are used to determine 214 the location of the device 102. In the implementation shown, the pseudo-ranges are based on the time of flight between the DTV transmitters 106 and the user device 102, as determined by the received DTV signals. The monitor stations 108 track clock skew between the clocks for the DTV transmitters 106. The server 110 calculates the location for user device 102, using the time-of-flight measurements from user device 102 and the clock skew information from the monitor stations 108. The server 110 also accesses weather server 114 in order to make corrections due to weather conditions, and DTV phase center database 112 in order to retrieve the known locations of the DTV transmitters 106. Further details on various implementations are given below in FIGS. 7-34.

In the example of FIG. 1, the service is provided 220 by the service provider system 120. The service itself depends on the location of the device. In certain applications, the service is provided 220 to the user of the device 102. In others, it is provided to a third party. In the implementation shown in FIG. 1, the service provider system 120 is linked to the DTV location server 110, from which the service provider system 120 accesses the device location. The service provider system 120 may access other databases 122, servers 124, etc. in order to perform its function, as is the case with the DTV location server 110 and user device 102.

Example Allocations of Tasks

It should be understood that FIG. 1 and the corresponding allocation of functionality between the user device 102, DTV location server 110 and service provider system 120 is merely an example. FIGS. 3A-3D illustrate some other example allocations. In these flow diagrams, the user device 102, DTV location server 110 and service provider system 120 are each represented by one column and the location of an activity in a particular column indicates that the corresponding device performs that activity.

Figure 3A:
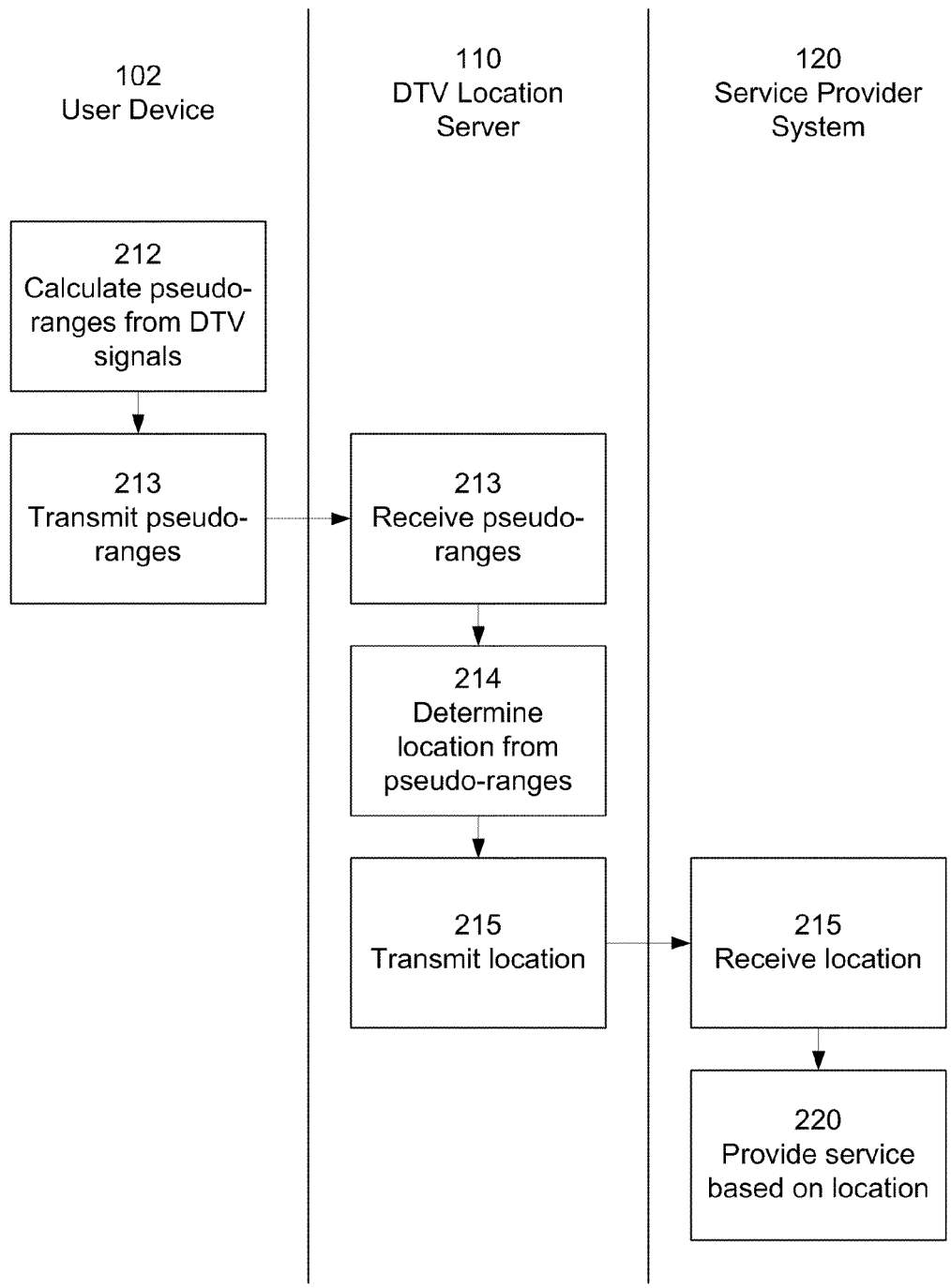
FIGS. 3A-3D are flow diagrams illustrating various allocations of the steps shown in FIG. 2.

FIG. 3A shows the allocation discussed above. In this example, the user device 102 calculates 212 the pseudo-ranges, which are then transmitted 213 to the DTV location server 110. From the pseudo-ranges, the DTV location server 110 determines 214 the location of the device 102 and transmits 215 the location to the service provider system 120. The service provider system provides 220 the service. One advantage of this approach is that each entity can specialize in the function which it performs. For example, if the device 102 is limited in computation power or data storage because it is intended to be mobile, complex calculations or large amounts of data may be shifted to the DTV location server 110 or service provider system 120. The approach of FIG. 3A also offers modularity, as different entities can be inserted into the different roles. For example, the service provider system 120 may be changed to provide different types of services but all taking advantage of a common DTV location server 110. In one variation, the same entity plays the role of both DTV location server 110 and service provider system 120.

The handoffs between the different entities can be based on other information. For example, rather than calculating 212 the pseudo-ranges, the user device 102 could transmit some other intermediate calculation, such as a partially processed correlation. Similarly, the handoff between the DTV location server 110 and service provider system 120 could be based on some other information. However, for convenience, these two handoffs will always be discussed in terms of transmitting pseudo-ranges and the location of device 102, although it is to be understood that the handoffs may be implemented based on other intermediate stages.

Figure 3B:
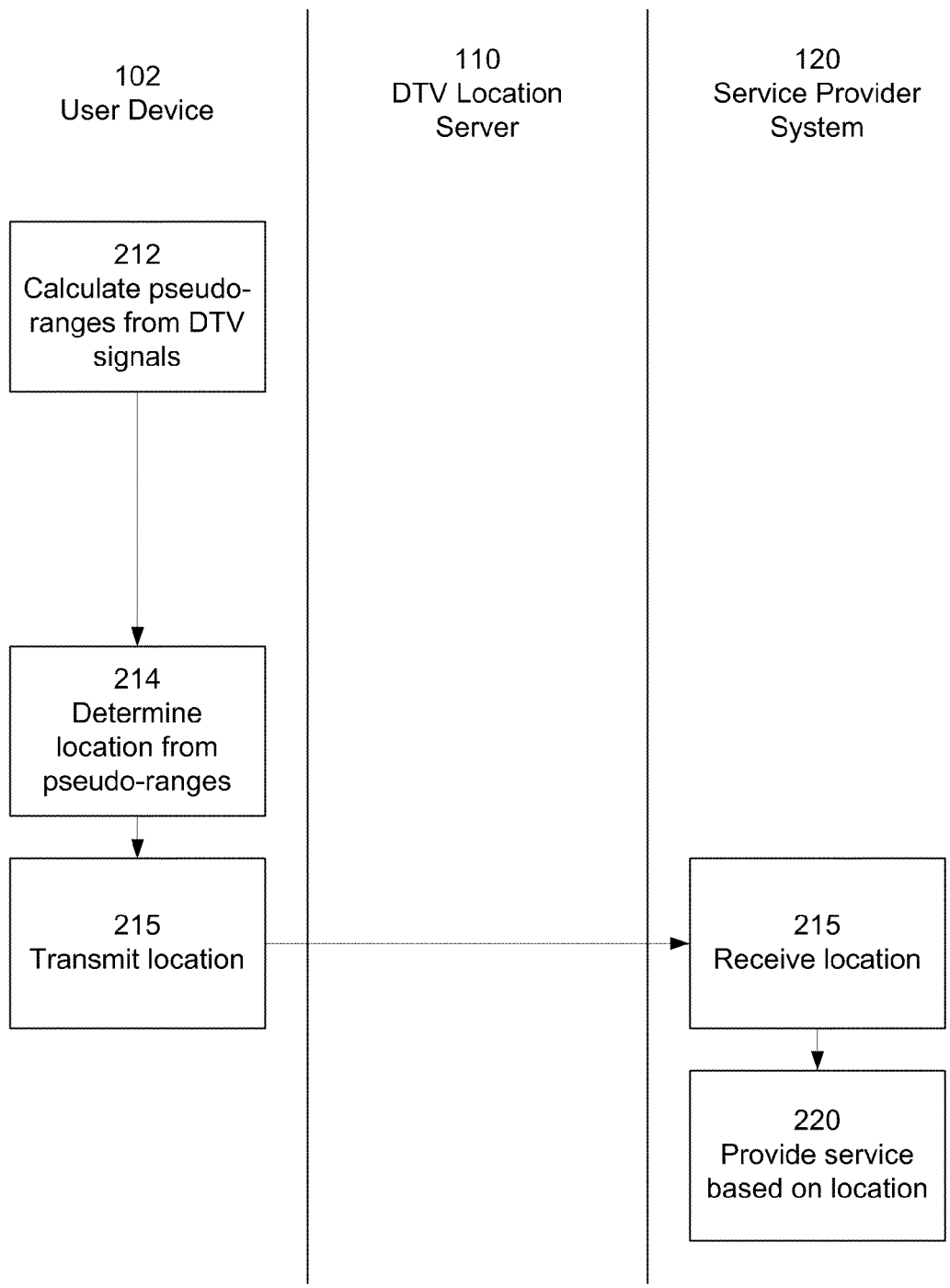

In FIG. 3B, the user device 102 calculates its own location. In other words, the device 102 both calculates 212 the pseudo-ranges from the received DTV signals and determines 214 its own location based on the pseudo-ranges. The device 102 transmits 215 its location to the service provider system 120, which provides 220 the service. There is no need for a separate DTV location server 110. Thus, one advantage of this approach is that there are fewer entities to coordinate.

Figure 3C:
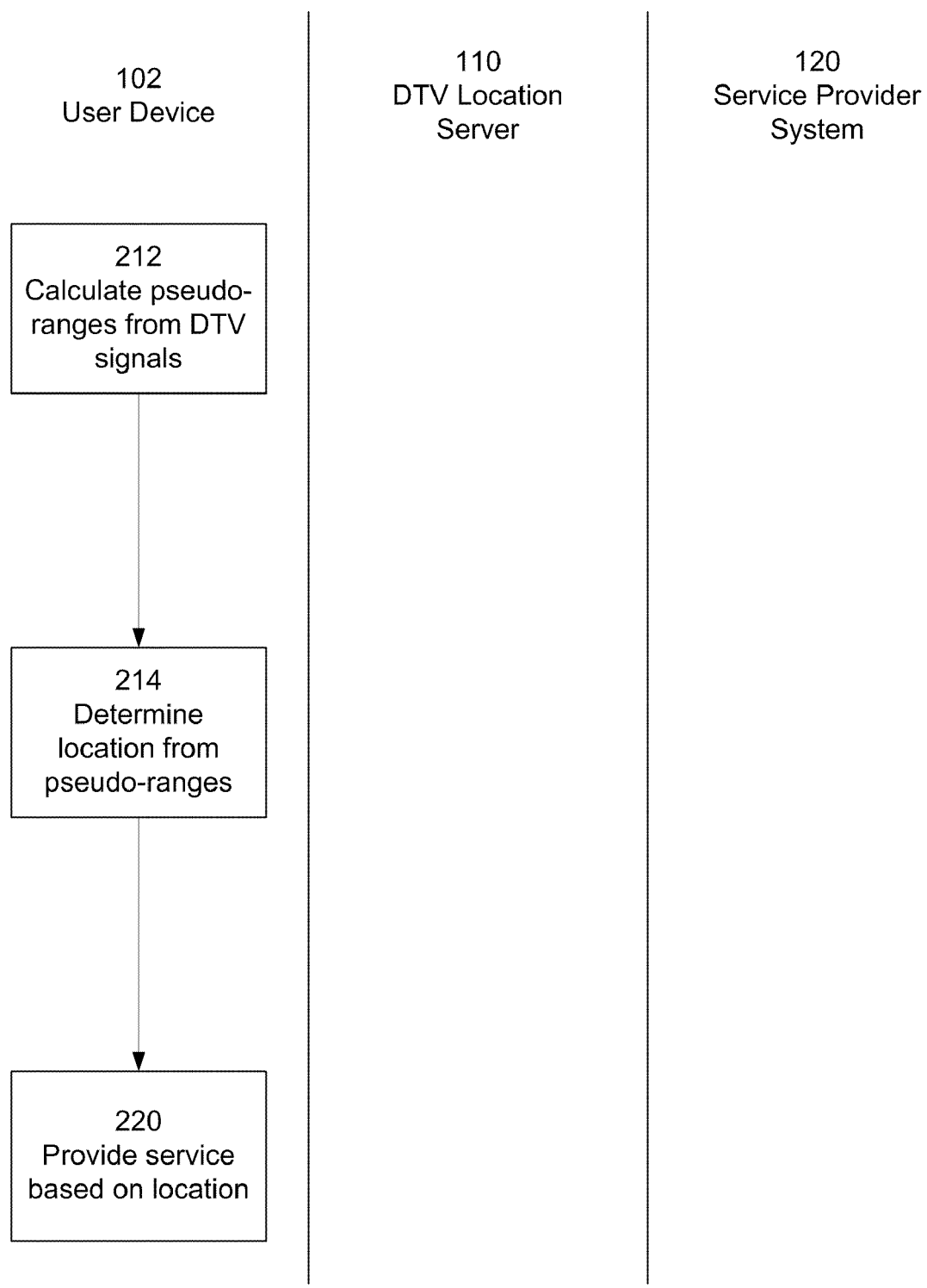

In FIG. 3C, the user device 102 performs all functions. The device 102 calculates 212 the pseudo-ranges from the received DTV signals, determines 214 its location based on the pseudo-ranges and also provides 220 the service, typically either to itself or to its user. There is no separate DTV location server 110 or service provider system 120. This approach is self-contained. It does not rely on external entities nor does it require the corresponding communications links. Thus, one advantage of this approach is its inherently mobile nature.

Figure 3D:
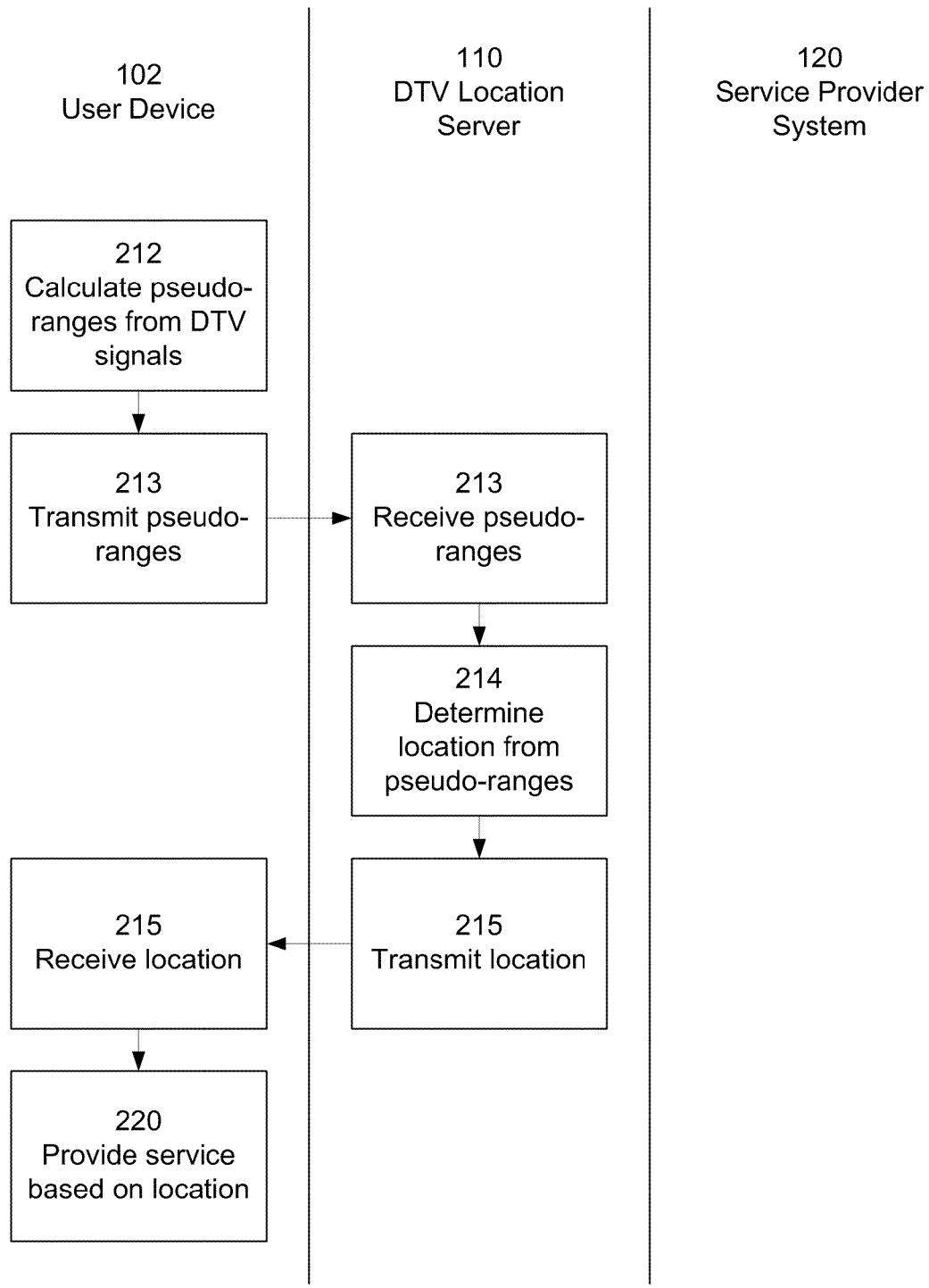

FIG. 3D is a variant of FIG. 3C, in which the location calculation is performed by an external DTV location server 110. This permits more robust and/or accurate calculation of the device location but still maintains some of the mobility of the approach of FIG. 3C.

To summarize some of the possible variations, the calculation of the device location can be performed entirely by the device 102 or by/in conjunction with an external system (which is referred to as the DTV location server 110 above). Once the location is determined, the service itself can be provided by the device 102, the DTV location server 110 or a separate service provider system 120. As a final variant, the service can be provided to the device 102, its user, or a third party. Other variations will be apparent. The selection of which entities perform which functions depends in part on the nature of the service to be provided.

Advantages of DTV Positioning

Regardless of how the various functions are allocated, all approaches determine the location of device 102 based on DTV signals. This approach has many advantages. To begin with, DTV signals have excellent coverage. In the United States, the use of DTV signals is mandated by the Federal Communication Commission. By the end of 2000, more than 166 DTV transmitters were in operation and the FCC has set a goal that by 2006 all television broadcasting will be on recently assigned digital channels. Similar coverage is expected in Europe and Japan.

Compared to GPS, DTV signals also have a power advantage of more than 40 dB, and substantially superior geometry to that which a satellite system could provide, thereby permitting position location even in the presence of blockage and also indoors where reception of GPS signals is typically very poor. The DTV signal has roughly six to eight times the bandwidth of GPS, thereby minimizing the effects of multipath. Due to the high power and the nature of the components within the DTV signal used for ranging (e.g., low duty factor for ATSC DTV signal and sparse frequency components for ETSI DTV signals), the processing requirements are minimal. Implementations of the present invention accommodate far cheaper, lower-speed, and lower-power devices than a GPS technique would require. In addition, the range between DTV transmitters and users changes very slowly compared to GPS. Therefore, the DTV signal is not significantly affected by Doppler effects. This permits the signal to be integrated for a long period of time, resulting in very efficient signal acquisition.

Compared to conventional cellular telephone systems, the frequency of the DTV signal is substantially lower and so has better propagation characteristics. For example, the DTV signal experiences greater diffraction than cellular signals, and so is less affected by hills and has a larger horizon. Also, the signal has better propagation characteristics through buildings and automobiles. When used to locate cellular telephones, unlike the terrestrial Angle-of-Arrival/Time-of-Arrival positioning systems, implementations of the present invention require no change to the hardware of the cellular base station, and can achieve accuracies on the order of 1 meter. The technique is independent of the air interface, whether GSM (global system mobile), AMPS (advanced mobile phone service), TDMA (time-division multiple access), CDMA, or the like. A wide range of UHF (ultra-high frequency) frequencies has been allocated to DTV transmitters. Consequently, there is redundancy built into the system that protects against deep fades on particular frequencies due to absorption, multipath and other attenuating effects.

Figure 4A:
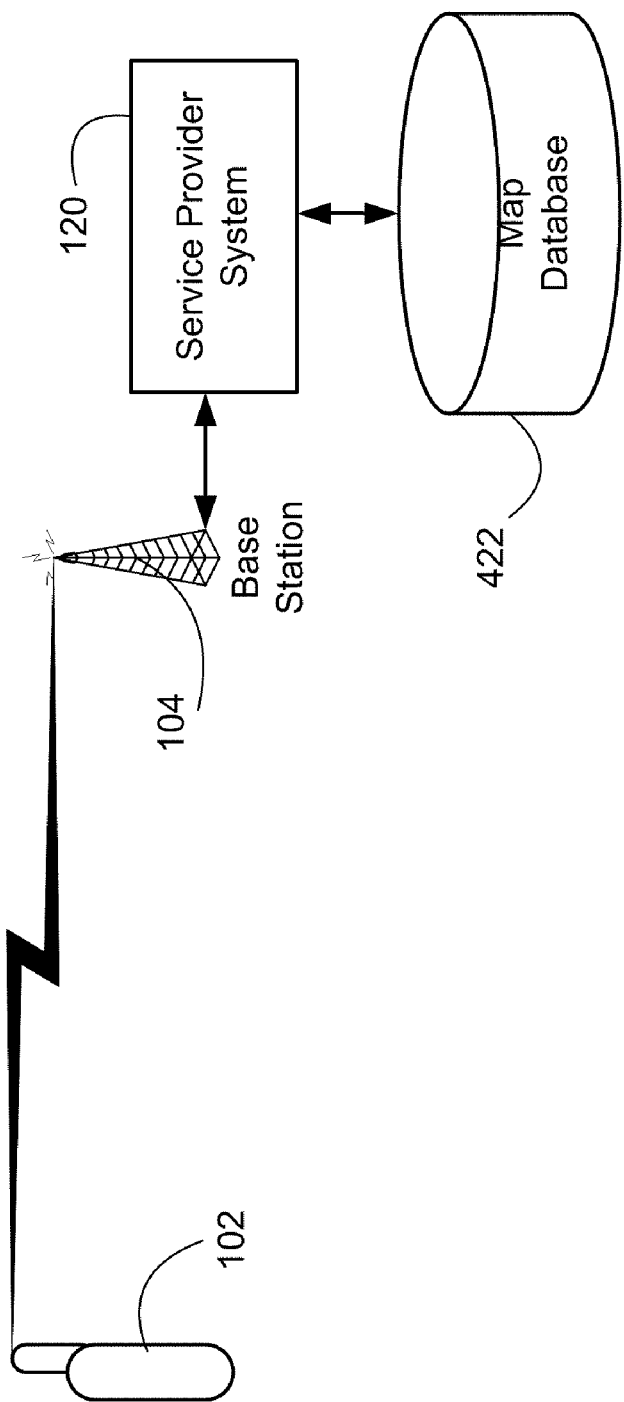
FIGS. 4A-4C depict systems for providing services related to navigation.
Figure 4B:
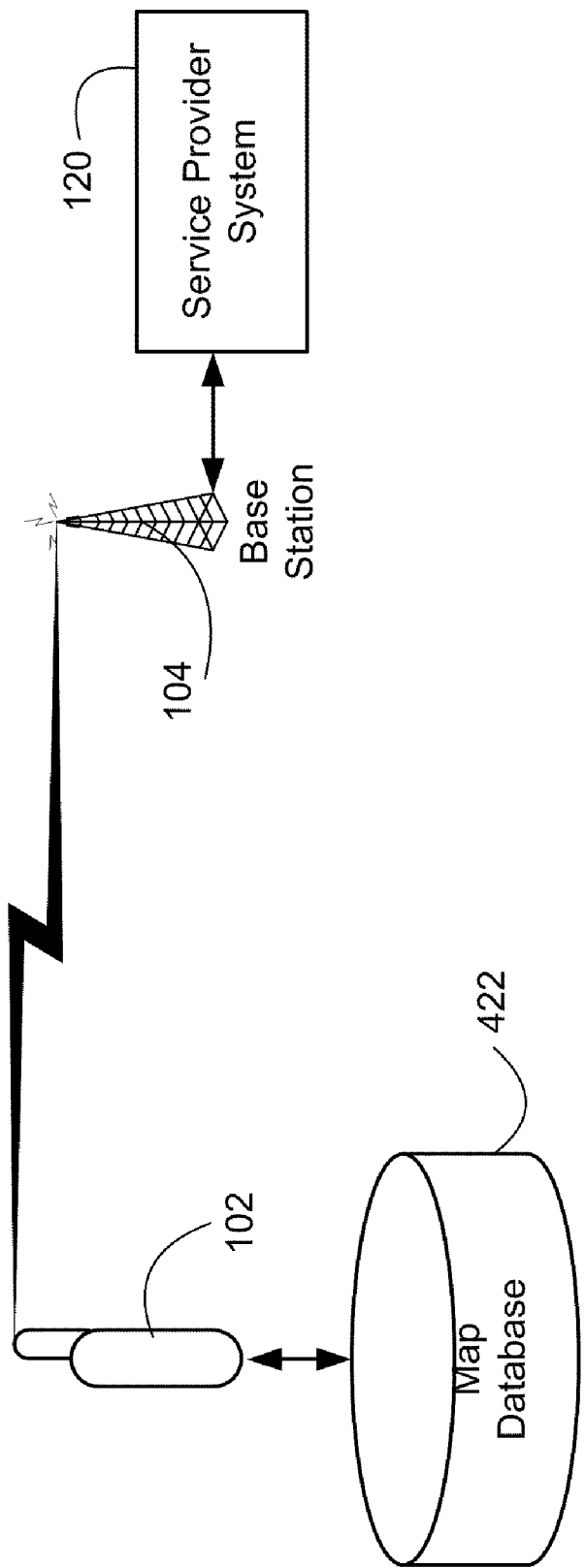
Figure 4C:
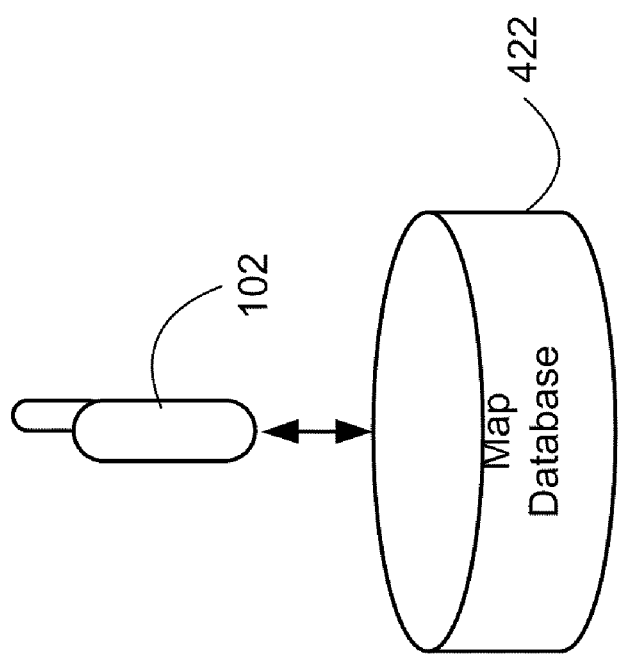
Figure 5:
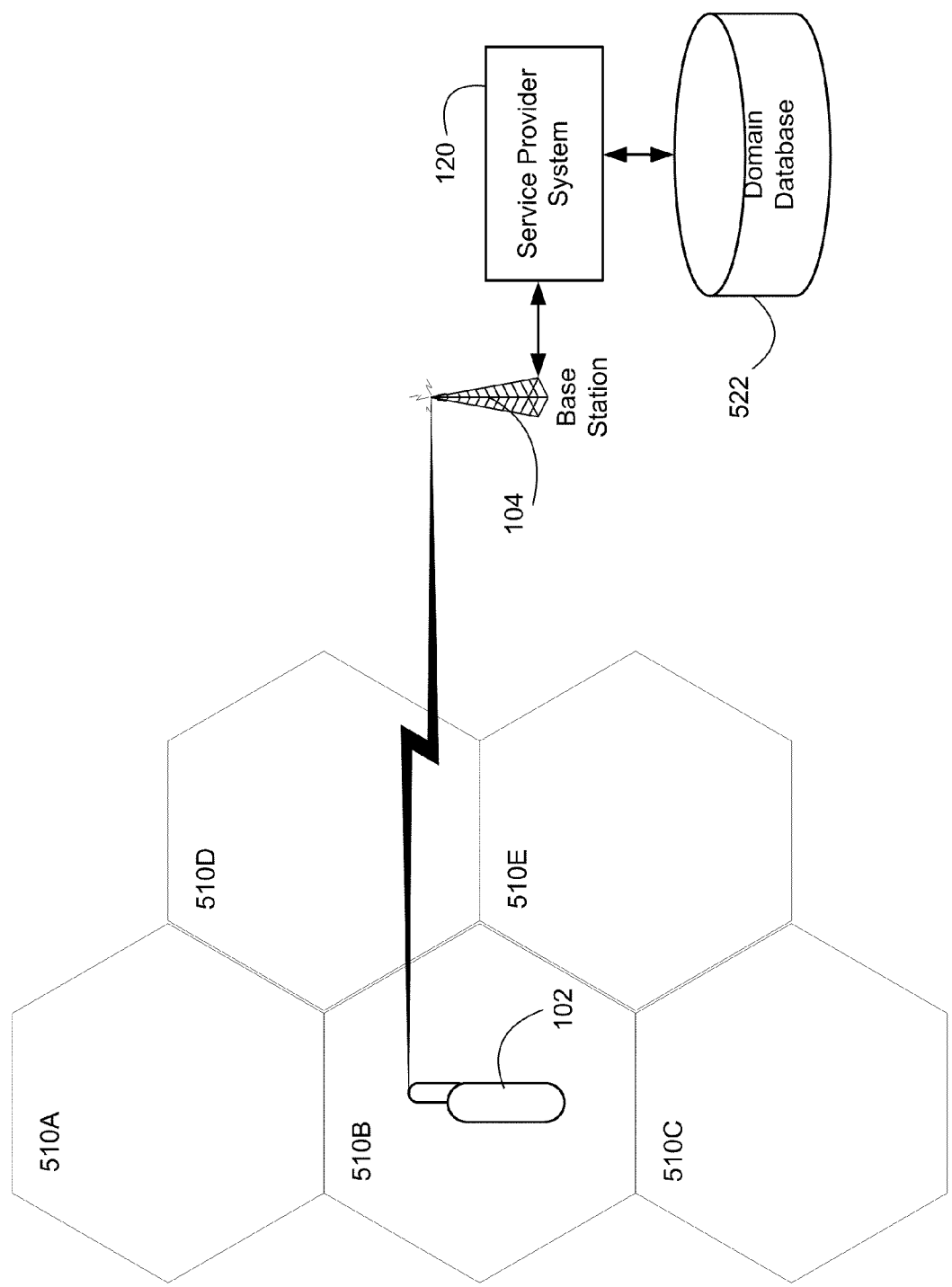
FIG. 5 depicts a system in which a service depends on the geographic domain in which a device is located.
Figure 6:
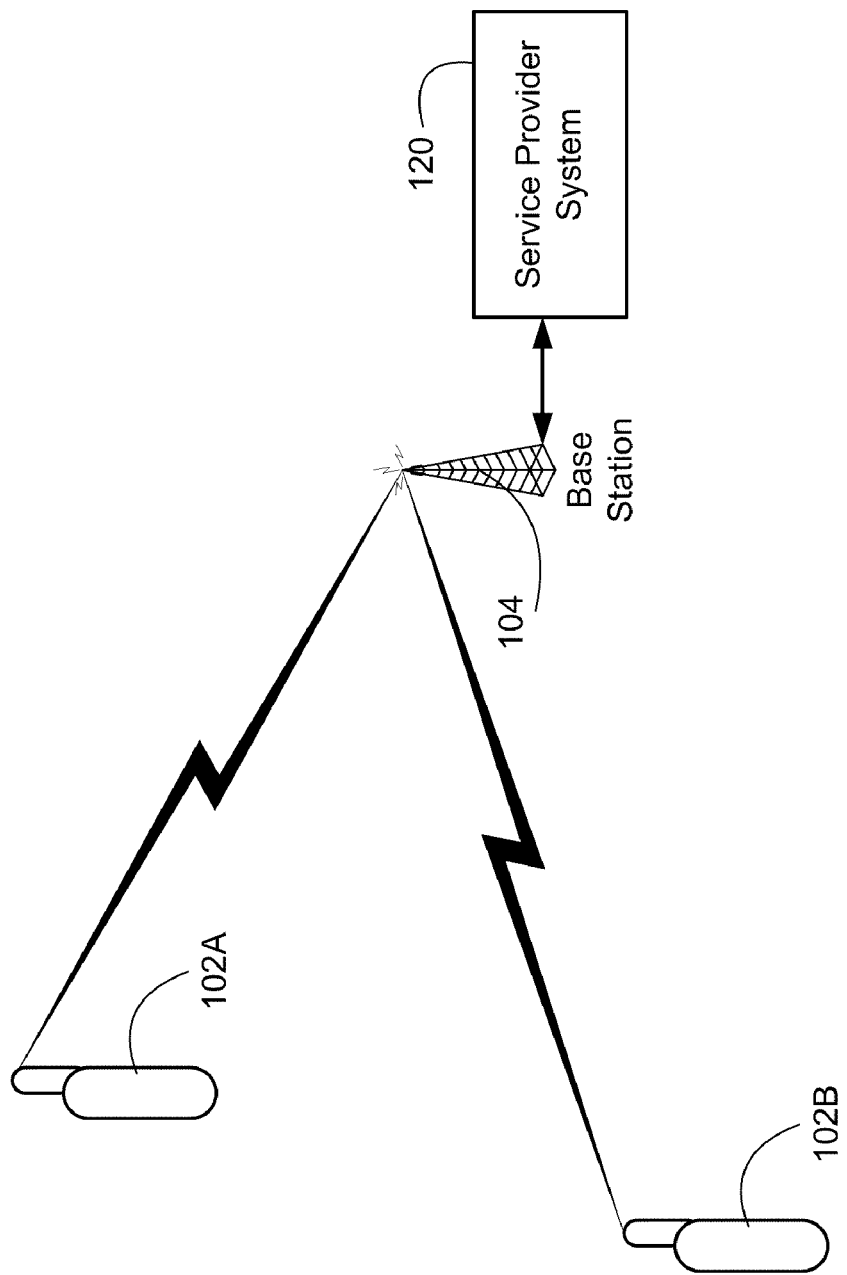
FIG. 6 depicts a system with multiple user devices.

FIGS. 4-6 depict example implementations for different example services. In these figures, the position location portion of the system has been omitted for clarity, but is generally as described previously. The figures show various implementations of the service provider portion of the system. Each implementation is introduced in the context of a specific service but has applicability to a much broader range of services. For example, FIGS. 4A-4C are introduced in the context of navigation services to show how certain data and functions may be allocated between the user device 102 and service provider system 120, but the various allocations of data and functions shown in these figures are applicable to other services as well.

Navigation Services

FIGS. 4A-4C depict example implementations for providing services related to navigation. These systems include a map database 422. In FIG. 4A, the service provider system 120 accesses the map database 422 and transmits relevant information to the user device 102 in order to render the navigation service. In FIG. 4B, the service provider system 120 assists in providing the navigation service, but the user device 102 accesses the map database 422 directly. In FIG. 4C, the user device 102 provides the navigation service without the use of a service provider system 120. In an alternate embodiment, map data is split between two databases, one accessed by the service provider system 120 and the other by the user device 102.

The map databases 422 are used to provide information for the navigation services. In one implementation, the navigation information provided is a map of the local vicinity around the device 102. This map may be updated as the location of the device 102 is updated. In FIG. 4A, the service provider system 120 accesses the location of the user device 102, which location is determined as described above. The system 120 retrieves the relevant map data from the database 422 based on the location of the device 102 and transmits the map data to the device for display. In an alternate embodiment, the service provider system renders the map data into a viewable map image and transmits the image to the device 102, which receives and displays the map.

In FIG. 4B, the service provider system 120 assists in providing navigation services but the map database 422 is accessed by the device 102. For example, the service provider system 120 might identify which map data is relevant (e.g., U.S. Geological Survey grid no. xxx) and send a key code for this map data to the user device 102. The user device 102 then retrieves the map data from database 422 based on the key code. In an alternate embodiment, the map database is accessed by the user device 102 but controlled by a third party. The service provider system transmits a key code to the user device 102 which authorizes the device to access the relevant portion of the database.

In FIG. 4C, there is no service provider system 120. The user device 102 determines the relevant map data based on its location, retrieves the map data from the database 422, and renders the map image for display. For example, such a system may be contained in a car, with the software and map database stored on a CD or DVD. The location of device 102 may be determined by the user device 102 itself and/or by a separate DTV location server 110, as described previously.

In another implementation, the navigation information includes directions from/to the device location to/from some other point of interest. Gas, food, lodging, medical, and police are common points of interest that a user may wish to locate. Entertainment, historical sites, parks and recreational areas, shops and malls and transportation centers are further examples of points of interest. Analogous to the example of rendering a map, the calculation of the directions may be performed by the user device 102, the service provider system 120, or between the two. For example, the user might request directions, and the service provider system 120 calculates and transmits the directions to the user in response to the request.

Navigation services may be provided in a variety of contexts. In one example, the user device 102 is attached to or integrated as part of a vehicle with the navigation services intended as an aid to piloting the vehicle. Examples include maps of highways and streets for cars and other motor vehicles, topographic or trail guidance for off-road vehicles, and navigation aids for airplanes in flight or for watercraft (if in range of DTV signals). As another example, the user device 102 is carried by an individual and provides personal navigation assistance to the individual. Examples include both urban settings (e.g., finding one's way around a city) and rural settings (e.g., hiking), military applications (e.g., guidance for soldiers in the field), and in the context of games (e.g., paintball, capture the flag, or war games). The DTV-based navigation services can also be used in addition to other types of navigation services (e.g., GPS-based).

Tracking Services

Another general class of services which may be provided is tracking services. In this class of services, the location of the device 102 is tracked. If the device 102 is valuable, then tracking the device 102 per se may be a valuable service. However, the device 102 may also be attached to an object, in which case tracking the device 102 is equivalent to tracking the object. Examples of objects which might benefit from tracking include vehicles (including cars and trucks), airplanes, freight containers, rail cars, inventory, capital equipment, rental equipment, and people (e.g., if a child were wearing a device).

In one implementation, the device is tracked in real-time and the tracking service is provided to a third party. For example, a company might wish to track various objects (e.g., inventory, containers) as part of its internal operations or to reduce theft and loss. The tracking information might be provided to the owner of the object, an insurer of the object or law enforcement for similar reasons. If multiple objects are tracked, the tracking data from the objects can be collected at one location (e.g., a central database) and conventional tracking software may be used to analyze and present the tracking data in an efficient manner.

In another example, rather than tracking the current location of the device, the history of the location of the device is recorded for later use. One example is a "black-box" application. If the black box is self-contained, the device determines its own location and stores the history of its location locally within the device without relying on external entities (such as the DTV location server 110 or service provider system 120).

Device Configuration Services

In another general class of services, a configuration for the device 102 is adjusted based on its location. One example is cellular phone service. In this example, the device 102 is a cell phone but also includes DTV location circuitry. The DTV location circuitry (possibly with the assistance of a DTV location server 110) determines the cell phone's location. Adjustments are then made to the cell phone, taking into account the phone's location.

The optimal data rate, type of coding/modulation, antenna configuration or other reception parameters for the cell phone may vary with location. Once the cell phone's location is determined, any of these parameters may be adjusted to account for the location. If the location has heavy cell phone traffic, strong multipath components, and strong obstacles in the communications path, a more robust communications channel (e.g., lower data rate and stronger error encoding) may be warranted, thus improving the quality of the transmissions to the user's device 102. If the multipath characteristics for a given location are known, filter coefficients for processing the received cell phone signal and antenna configuration may be altered to account for the multipath.

FIG. 5 shows an example in which the adjustments depend on geographic domain. More specifically, a geographic area is divided into different domains 510 and the adjustment to the cell phone depends on the geographic domain in which the device 102 is located. In FIG. 5, the service provider system 120 determines the relevant domain by comparing the device's location with the domains stored in the domain database 522. The domains 510 preferably are defined in a way that allows an efficient determination of which particular domain 510 contains a specific location. For example, domains can be defined by the geographic coordinates of their boundaries. The domains 510 shown in FIG. 5 are all identical in size and shape but this is not required. The domains can be of different shapes and sizes. The domain boundaries and the number of domains may vary over time.

In one implementation, the domains 510 correspond to the cells in the coverage area. Each cell is served by a different base station. Thus, knowing in which cell the device 102 is located permits optimization of the device 102 for that particular base station. For example, when the device 102 crosses from one cell to another, its antenna might be oriented towards the base station for the new cell. As another example, if the base stations can use different coding or modulation techniques, the device 102 can be configured to take advantage of this. As a final example, each cell may offer different types of services or quality of service (e.g., local, local long distance, long distance, etc.). Thus, knowing in which cell it is located permits the user device 102 to configure itself to take advantage of the different services or quality of service.

The domains 510 do not have to correspond to cells. For example, in the case of compensation for multipath effects, each domain 510 may represent a geographic area with a particular multipath characteristic. Domain 510A may be dominated by reflection off a nearby tall building. Domain 510B may be characterized by many reflections off multiple surfaces. Domain 510C may be characterized by relatively weak multipath effects. The cell phone is configured to compensate for the multipath effects which characterize its current domain.

The approach of adjusting the configuration of device 102 is not limited to cell phones. Devices which provide Internet access or other types of wireless communications channels (e.g., wireless modems) would also benefit from this approach, to name just a few examples. In addition, the device 102 need not be mobile. In one example, the device 102 is a television which determines its own location and then configures itself for optimal reception of the local broadcast channels.

The adjustments can also be determined entirely by the device 102 (e.g., as in FIG. 4C), entirely by a separate service provider system 120 (e.g., as in FIG. 4A), or between the two, depending on the requirements of the specific application. In some applications, the adjustments occur automatically without an explicit request by the user of the device (e.g., to improve cell phone reception or to auto-configure a television). In other applications, the user must initiate the adjustment (e.g., by pressing a button on the television to run the auto-configuration).

Physical Services

Physical services may also be enabled or enhanced by knowing the location of the device 102. As one example, knowing the location of the device permits delivery of the physical service to that specific location. Emergency roadside assistance, emergency 911 service, and food delivery are examples of these types of services. In the E-911 example, the location of the device 102 requesting E-911 is determined based on DTV signals. The appropriate E-911 unit(s) are then dispatched to the device location.

As with the previous classes of services, physical services may be rendered in a number of ways. In one approach, when the service provider system 120 receives a request for a physical service, the service provider itself may travel to the device location and perform the physical service. In an alternate approach, the service provider itself does not perform the physical service. Instead, it contacts a local service provider, which provides the service. For example, referring to FIG. 5, there may be local service providers which service each of the domains 510. Once the service provider system 120 determines in which domain the device is located, it then contacts the corresponding local service provider to provide the service. In the context of emergency roadside assistance, the service provider could be a central automobile club which uses a network of local towing companies to provide the roadside assistance. In another alternative, the service provider system 120 transmits a key code to the device, which authorizes provision of the physical service. For example, the user could present the key code to a local towing company to have his car towed.

As a final example, the quality of service may vary from domain to domain. For example, if the service is meal delivery, urban domains may be promised faster delivery than rural domains.

Localized Information Services

In another class of services, information is provided to the user of the device 102 and the information is localized according to the location of the device. Examples include local news, local traffic reports, and information (e.g., description, hours of operation, advertisements, promotions, coupons) about commercial establishments or points of interest which are in a local vicinity of the device.

In the architecture of FIG. 4A, the service provider system 120 determines the localized information, for example pulling it from a central database. The information is transmitted to the device 102, which displays it to the user. For example, in the case of local news, the central database may include news from many different municipalities. The service provider system 120 determines in which municipality the device is located and transmits the local news for that municipality to the device. Alternately, the service provider system 120 may transmit a key code to the device 102 instead. The key code enables the device 102 to retrieve the local news from a different source, for instance a third party which maintains a news database. In this example, the news is localized based on municipality, which follows the domain-based model shown in FIG. 5. Each municipality is a separate domain 510 and the local news provided to the user depends on in which municipality the user is located.

Another example is a virtual tour guide. In this application, a tour of a point of interest is given via the device 102. For example, if the user is touring a zoo, the device might provide information describing the penguin exhibit when the user is located in the vicinity of the penguin exhibit, and so on. If the user is touring a historic battlefield, the device might provide information describing the events which occurred in the general location of the device. As the device moves, the information changes to describe the new location. The information can take many forms: video, graphics and audio being a few. In a related service, the user is offered "electronic postcards" of the point of interest, which he may purchase. The device offers the postcards based on its current location. For example, when the device is located in the vicinity of the Hoover Dam, it offers images of the Hoover Dam rather than images of Disneyland.

In another example, the device 102 is used to provide safety or relief information. In the event of an emergency affecting the location of the device, information concerning the emergency is provided to the user. For example, if an earthquake occurs and the device is located in the earthquake zone, details about the earthquake and relief efforts, or instructions on how to respond to the earthquake may be provided.

In certain applications, the user requests the localized information. For example, the user might request and pay for local news, similar to purchasing a newspaper. In other applications, the localized information is unsolicited. For example, if the user is walking past a store, the device might generate a coupon for the store. In the event of an emergency, the user might automatically receive information about safety procedures and relief efforts. In one implementation, the user can select from among different options with respect to unsolicited information. One possible option is that the user device 102 is continuously tracked and continuously receives unsolicited information. Another option is that all unsolicited information is refused. A third option is that the user receives information only when he so requests.

The user could also receive information based on a previously registered profile. For example, the user might indicate a preference for ice cream and a dislike for cookies. As the user strolls around town, he receives information about local ice cream parlors but not about local cookie vendors.

As with many of the classes of services, the provision of localized information also applies to stationary devices. In one application, the device 102 is integrated into a television set which now can determine its own location. The television programming broadcast to the television set includes different choices for advertisements. The television set selects the advertisements which are tailored for its location.

Additional Examples of Services

FIG. 6 depicts a system in which the service provided is video gaming. In this example, two users with corresponding wireless gaming devices 102A-102B are playing a video game with/against each other. The video game is displayed locally, for example on a cell phone, PDA, or other display device coupled to the wireless gaming device. The users' movements in the video game depend on their locations in the real world. The service provider system 120 determines the users' locations according to the location of the wireless gaming devices, which have been determined using DTV signals, and updates the video game accordingly. Video games for one player or more than two players can also be implemented in this fashion.

In another application, the location of the device 102 is used as an aid in surveying. For example, a surveyor could carry the device 102 with him at a site and then record the locations at various points around the site.

In a final example, the device 102 is used to alert the user when certain other individuals are close by. For example, the user might indicate in his profile that he is interested in meeting other individuals with an interest in Civil War memorabilia. The user's profile is stored at the service provider system 120. As the user strolls around town, the service provider system 120 tracks the location of the device, as well as the locations of devices of other users. If any of the other users are nearby and also indicate an interest in Civil War memorabilia, the service provider system 120 alerts the users so that they may meet each other if they so desire. Different criteria, including for dating and matchmaking, may be used.

It should be understood that the implementations and services discussed above are examples. It is not practical or feasible to list all possible types of services or systems for providing services. For example, the user may access the rest of the system via any number of devices 102. Examples include portable computers, PDAs, mobile phones, cars and other vehicles, and any object, which could include a chip or software implementing DTV position location. Examples of user interfaces include conventional monitor and keyboard, touch screen display and voice recognition and synthesis. The user devices 102 may be implemented in a distributed fashion. For example, antenna, user interface, microprocessor, power supply, and local storage can be located at different locations, with local communications accomplished via cables, short range radio (e.g., BlueTooth), infrared or other means.

Similarly, the DTV location server 110 and service provider system 120 may implement their functions using many different devices. In one implementation, DTV location server 110 is implemented as a general-purpose computer (or group of computers) executing software designed to perform the operations described herein. In another implementation, DTV location server is implemented as an ASIC (application-specific integrated circuit). The service provider system 120 may be similarly implemented.

The choice of user device 102, DTV location server 110 and service provider system 120 depends on the nature of the service to be provided. It also depends on the nature of the communications links between the user device 102, DTV location server 110 and service provider system 120.

These communications links may take many different forms. In FIG. 1, the link between user device 102 and DTV location server 110 is shown as an air link to a base station 104 and a more permanent link (e.g., a land line) from base station 104 to DTV location server 110. In one example, the user device 102 is a wireless telephone and base station 104 is a wireless telephone base station. In one implementation, base station 104 is part of a mobile MAN (metropolitan area network) or WAN (wide area network). The link between user device 102 and service provider system 120 is similarly depicted. Satellite communications (e.g., LEO, MEO, GEO) are one alternative which is well-suited for mobile endpoint(s). Land lines (e.g., fiber optic, cable, electrical) and microwave links are alternatives which are well-suited for non-mobile endpoints (e.g., between the DTV location server 110 and service provider system 120 in the implementation of FIG. 1). The different communications links can be either one-way or two-way, depending on the application.

As another example, the actions required to implement a service may be allocated between the user device 102, DTV location server 110 and service provider system 120 in many ways. The user device 102 may perform some, all or none of these actions locally. Similarly, the service provider system 120's role may vary from minor to major. Actions may also be allocated in various ways between the DTV location server 110 and service provider system 120. For example, the service provider system 120 may communicate with user device 102 via the DTV location server 110, instead of directly as shown in FIG. 1. The reverse is also possible. In fact, although the user device 102, DTV location server 110 and service provider system 120 are shown as separate in FIG. 1, this is not required.

The manner in which the service is requested and the manner in which it is delivered can also vary. For example, the user can explicitly request the service before it is provided. Alternately, it can be requested implicitly, automatically, or by others on behalf of the user. It may not be requested at all. Instead, the service provider system 120 might "push" the service to the user. With respect to delivery, the service provider system 120 enables provision of the service but may or may not actually provide the service. If the service provider system 120 does not provide the service, it might arrange for a third party to provide the service or it might forward the request to the relevant party. Alternately, the service provider system 120 might send an authorization code to the user, thus enabling the user to obtain the service.

As some final examples, the services which may be provided are not limited to those discussed above. Another service is the purchase of good or services, including for example movie tickets, restaurant reservations, consumer goods, guided tours and local tour books. Additional services include the transmission of information from local commercial establishments (e.g., show times for theaters, menus from restaurants, etc.) or localized information, such as local news, traffic and weather. Table 1 below lists rough data rates suggested for certain types of information using current technology and quality standards. Data rates are not restricted to those shown in the table. In the table, voice with data refers to information stream which includes voice traffic along with text information and or text messaging. This would include speech recognition applications and text messages that accompany standard voice applications.

TABLE 1

| Type of Data to be Transferred | Data Rate(s) for Low Quality Transmission | Data Rate(s) for Moderate Quality Transmission |
| --- | --- | --- |
| Text | 50 bps | 150 bps-500 bps |
| Voice | 3 Kbps | 9.6 Kbps-14 Kbps |
| Voice with Text | 3 Kbps | 28.8 Kbps |
| Audio | 16 Kbps | 256 Kbps |
| Internet | 28.8 Kbps | 128 Kbps |
| Video | 100 Kbps | 2 Mbps |
| HDTV | 1 Mbps-3 Mbps | 19 Mbps |

As a final point, it is not a requirement that position location be based solely on DTV techniques. In alternate embodiments, the DTV position location technologies are used in conjunction with or as a supplement to other positioning techniques, including for example those based on GPS, analog TV, CDMA Network, TDMA network, and E-OTD.

General Position Location

Figure 7:
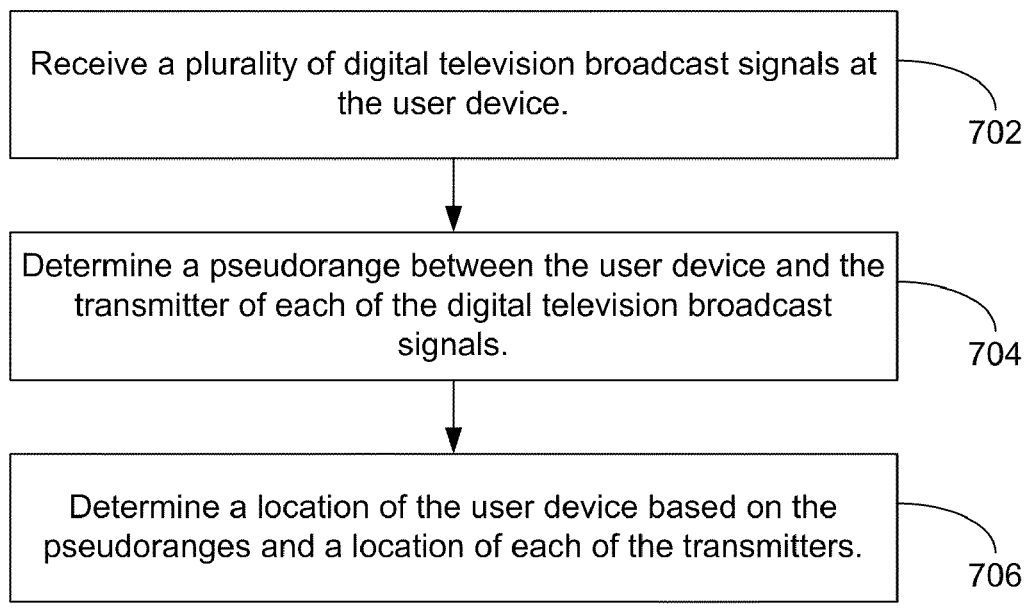
FIG. 7 illustrates a method for determining the device's location.

FIG. 7 illustrates a method for determining the user's location. The user device 102 receives DTV signals from a plurality of DTV transmitters 106A and 106B through 106N (step 702).

Various methods can be used to select which DTV channels to use in position location. In one implementation, a DTV location server 110 informs the user device 102 of the best DTV channels to monitor. In one implementation, user device 102 exchanges messages with DTV location server 110 by way of base station 104. In one implementation user device 102 selects DTV channels to monitor based on the identity of base station 104 and a stored table correlating base stations and DTV channels. In another implementation, user device 102 can accept a location input from the user that gives a general indication of the area, such as the name of the nearest city; and uses this information to select DTV channels for processing. In one implementation, user device 102 scans available DTV channels to assemble a fingerprint of the location based on power levels of the available DTV channels. User device 102 compares this fingerprint to a stored table that matches known fingerprints with known locations to select DTV channels for processing.

User device 102 determines a pseudo-range between the user device 102 and each DTV transmitter 106 (step 704). Each pseudo-range represents the time difference (or equivalent distance) between a time of transmission from a transmitter 108 of a component of the DTV broadcast signal and a time of reception at the user device 102 of the component, as well as a clock offset at the user device.

User device 102 transmits the pseudo-ranges to DTV location server 110. In one implementation, DTV location server 110 is implemented within or near base station 104.

The DTV signals are also received by a plurality of monitor units 108A through 108N. Each monitor unit can be implemented as a small unit including a transceiver and processor, and can be mounted in a convenient location such as a utility pole, DTV transmitters 106, or base stations 104. In one implementation, monitor units are implemented on satellites.

Each monitor unit 108 measures, for each of the DTV transmitters 106 from which it receives DTV signals, a time offset between the local clock of that DTV transmitter and a reference clock. In one implementation the reference clock is derived from GPS signals. The use of a reference clock permits the determination of the time offset for each DTV transmitter 106 when multiple monitor units 108 are used, since each monitor unit 108 can determine the time offset with respect to the reference clock. Thus, offsets in the local clocks of the monitor units 108 do not affect these determinations.

In another implementation, no external time reference is needed. According to this implementation, a single monitor unit receives DTV signals from all of the same DTV transmitters as does user device 102. In effect, the local clock of the single monitor unit functions as the time reference.

In one implementation, each time offset is modeled as a fixed offset. In another implementation each time offset is modeled as a second order polynomial fit of the form $$\text{Offset} = a + b(t-T) + c(t-T)^2 \quad (1)$$

that can be described by a, b, c, and T. In either implementation, each measured time offset is transmitted periodically to the DTV location server using the Internet, a secured modem connection or the like. In one implementation, the location of each monitor unit 108 is determined using GPS receivers.

DTV location server 110 receives information describing the phase center (i.e., the location) of each DTV transmitter 106 from a database 112. In one implementation, the phase center of each DTV transmitter 106 is measured by using monitor units 108 at different locations to measure the phase center directly. In another implementation, the phase center of each DTV transmitter 106 is measured by surveying the antenna phase center.

In one implementation, DTV location server 110 receives weather information describing the air temperature, atmospheric pressure, and humidity in the vicinity of user device 102 from a weather server 114. The weather information is available from the Internet and other sources such as NOAA. DTV location server 110 determines tropospheric propagation velocity from the weather information using techniques such as those disclosed in B. Parkinson and J. Spilker, Jr., Global Positioning System—Theory and Applications, AIAA, Washington, D.C., 1996, Vol. 1, Chapter 17 Tropospheric Effects on GPS by J. Spilker, Jr., which is incorporated herein by reference.

DTV location server 110 can also receive from base station 104 information which identifies a general geographic location of user device 102. For example, the information can identify a cell or cell sector within which a cellular telephone is located. This information is used for ambiguity resolution, as described below.

Figure 8:
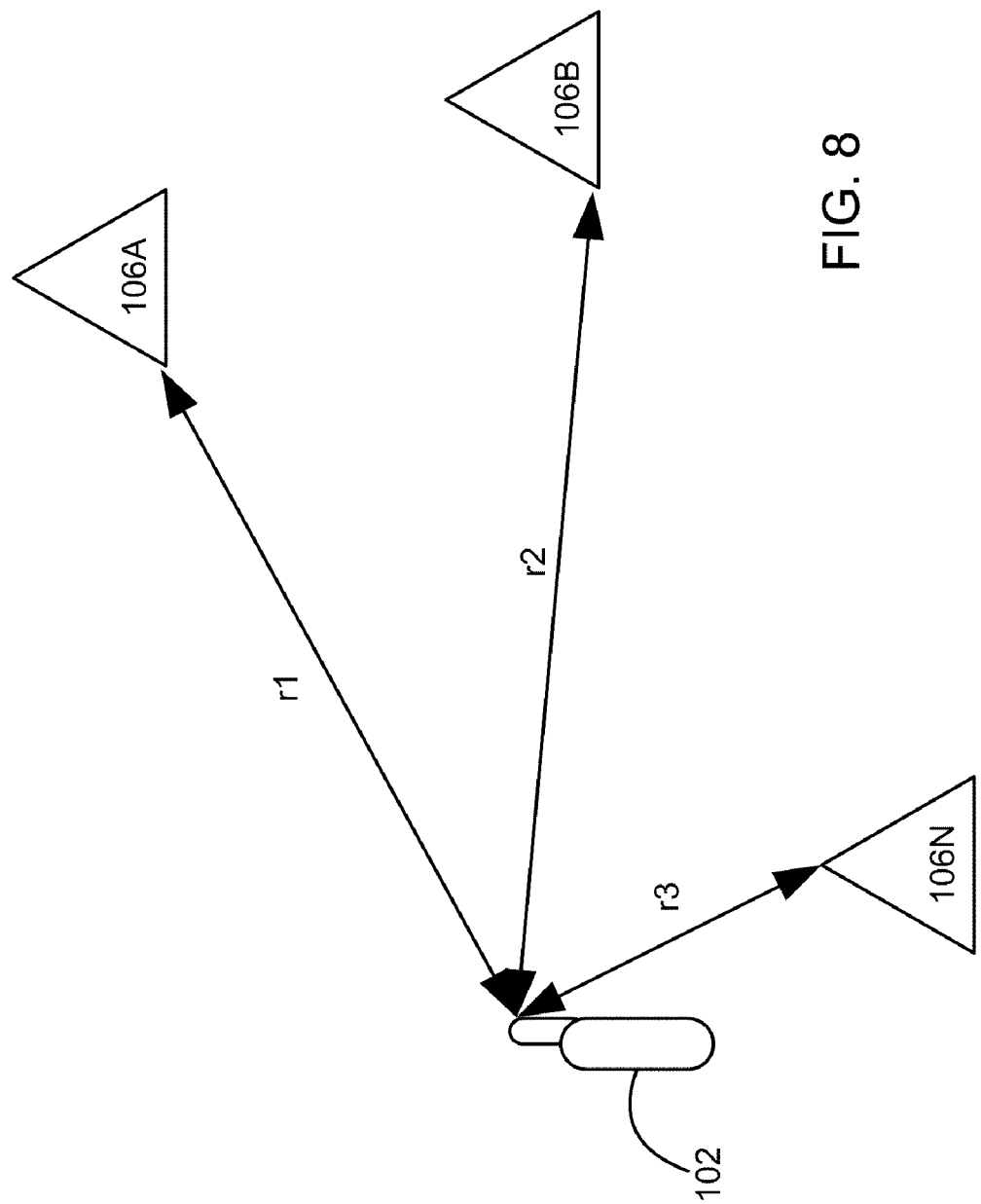
FIG. 8 depicts the geometry of a position determination using three DTV transmitters.

DTV location server 110 determines a location of the user device 102 based on the pseudo-ranges and a location of each of the transmitters (step 706). FIG. 8 depicts the geometry of a location determination using three DTV transmitters 106. DTV transmitter 106A is located at position (x1, y1). The range between user device 102 and DTV transmitter 106A is r1. DTV 106B transmitter is located at position (x2, y2). The range between user device 102 and DTV transmitter 106B is r2. DTV transmitter 106N is located at position (x3, y3). The range between user device 102 and DTV transmitter 106N is r3.

DTV location server 110 may adjust the value of each pseudo-range according to the tropospheric propagation velocity and the time offset for the corresponding DTV transmitter 106. DTV location server 110 uses the phase center information from database 112 to determine the location of each DTV transmitter 106.

User device 102 makes three or more pseudo-range measurements to solve for three unknowns, namely the position (x, y) and clock offset T of user device 102. In other implementations, the techniques disclosed herein are used to determine location in three dimensions such as longitude, latitude, and altitude, and can include factors such as the altitude of the DTV transmitters.

The three pseudo-range measurements pr1, pr2 and pr3 are given by $$pr1 = r1 + T \quad (2)$$

$$pr2 = r2 + T \quad (3)$$

$$pr3 = r3 + T \quad (4)$$

The three ranges can be expressed as $$r1 = |X - X1| \quad (5)$$

$$r2 = |X - X2| \quad (6)$$

$$r3 = |X - X3| \quad (7)$$

where X represents the two-dimensional vector position (x, y) of the user device 102, X1 represents the two-dimensional vector position (x1, y1) of DTV transmitter 106A, X2 represents the two-dimensional vector position (x2, y2) of DTV transmitter 106B, and X3 represents the two-dimensional vector position (x3, y3) of DTV transmitter 106N. These relationships produce three equations in which to solve for the three unknowns x, y, and T. DTV locations server 110 solves these equations according to conventional well-known methods. The location of user device 102 is used in providing the service to the user. For example, the user's location may be transmitted to the service provider system 120, or the system 120 may retrieve the user's location from the DTV location server 110. Either way, the service provider system 120 accesses the user's location.

In another implementation, user device 102 does not compute pseudo-ranges, but rather takes measurements of the DTV signals that are sufficient to compute pseudo-range, and transmits these measurements to DTV location server 110. DTV location server 110 then computes the pseudo-ranges based on the measurements, and computes the user's location based on the pseudo-ranges, as described above.

In another implementation, the position of user device 102 is computed by user device 102. In this implementation, all of the necessary information is transmitted to user device 102. This information can be transmitted to user device by DTV location server 110, base station 104, one or more DTV transmitters 106, or any combination thereof. User device 102 then measures the pseudo-ranges and solves the simultaneous equations as described above. This implementation is now described.

User device 102 receives the time offset between the local clock of each DTV transmitter and a reference clock. User device 102 also receives information describing the phase center of each DTV transmitter 106 from a database 112.

User device 102 receives the tropospheric propagation velocity computed by DTV locations server 110. In another implementation, user device 102 receives weather information describing the air temperature, atmospheric pressure, and humidity in the vicinity of user device 102 from a weather server 114 and determines tropospheric propagation velocity from the weather information using conventional techniques.

User device 102 can also receive from base station 104 information which identifies the rough location of user device 102. For example, the information can identify a cell or cell sector within which a cellular telephone is located. This information is used for ambiguity resolution, as described below.

User device 102 receives DTV signals from a plurality of DTV transmitters 106 and determines a pseudo-range between the user device 102 and each DTV transmitter 106. User device 102 then determines its location based on the pseudo-ranges and the phase centers of the transmitters.

In any of these of the implementations, should only two DTV transmitters be available, the location of user device 102 can be determined using the two DTV transmitters and the offset T computed during a previous position determination. The values of T can be stored or maintained according to conventional methods.

In one implementation, base station 104 determines the clock offset of user device 102. In this implementation, only two DTV transmitters are required for position determination. Base station 104 transmits the clock offset T to DTV location server 110, which then determines the position of user device 102 from the pseudo-range computed for each of the DTV transmitters.

In another implementation, when only one or two DTV transmitters are available for position determination, GPS is used to augment the position determination.

Figure 9:
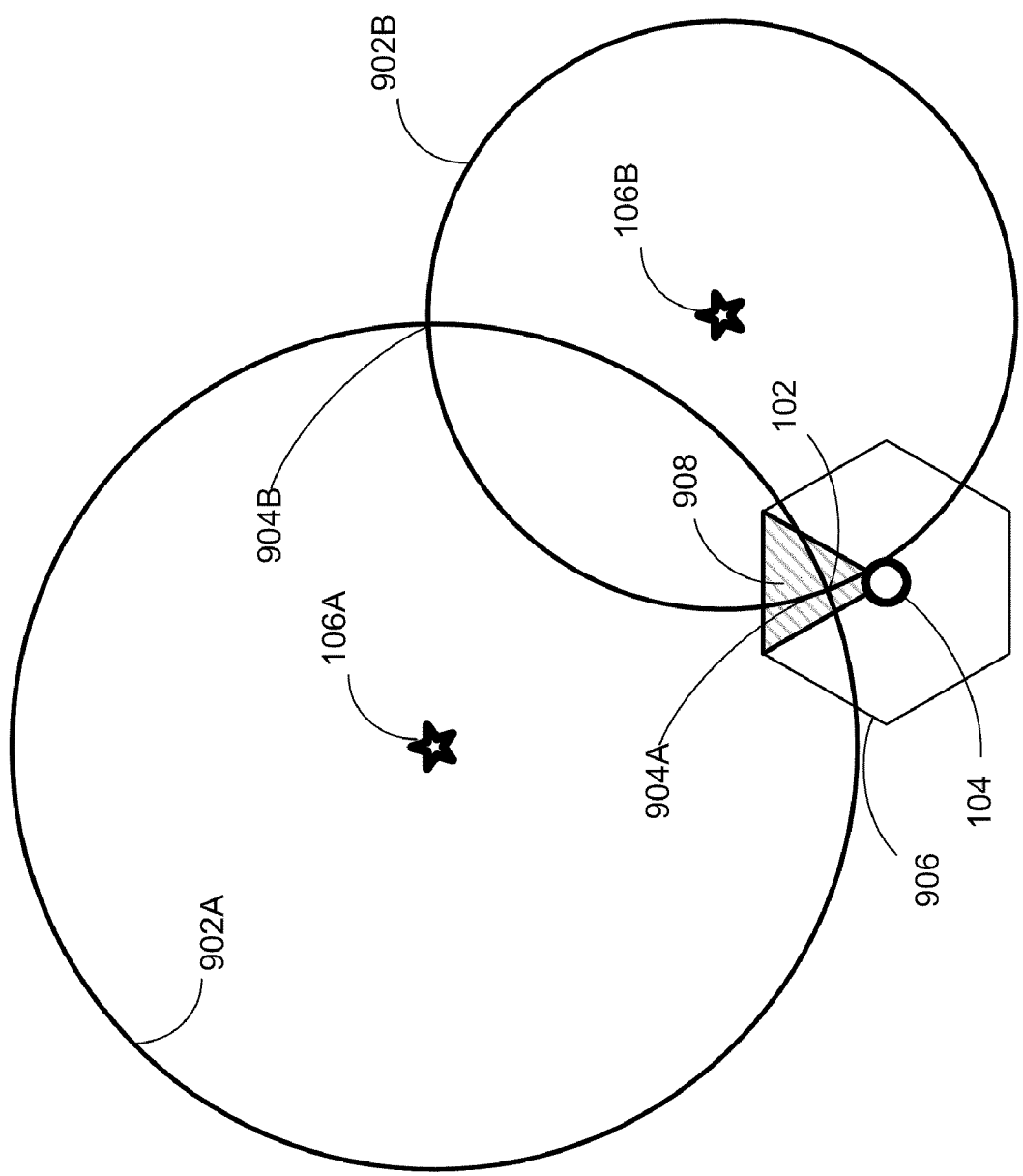
FIG. 9 illustrates a simple example of a position location calculation for a device receiving DTV signals from two separate DTV transmitters.

FIG. 9 illustrates a simple example of a position location calculation for a user device 102 receiving DTV signals from two separate DTV antennas 106A and 106B. Circles of constant range 902A and 902B are drawn about each of transmit antennas 106A and 106B, respectively. The position for a user device, including correction for the user device clock offset, is then at one of the intersections 904A and 904B of the two circles 902A and 902B. The ambiguity is resolved by noting that base station 104 can determine in which sector 908 of its footprint (that is, its coverage area) 906 the user device is located. Of course if there are more than two DTV transmitters in view, the ambiguity can be resolved by taking the intersection of three circles.

In one implementation, user device 102 can accept an input from the user that gives a general indication of the area, such as the name of the nearest city. In one implementation, user device 102 scans available DTV channels to assemble a fingerprint of the location. User device 102 compares this fingerprint to a stored table that matches known fingerprints with known locations to identify the current location of user device 102.

Figure 10:
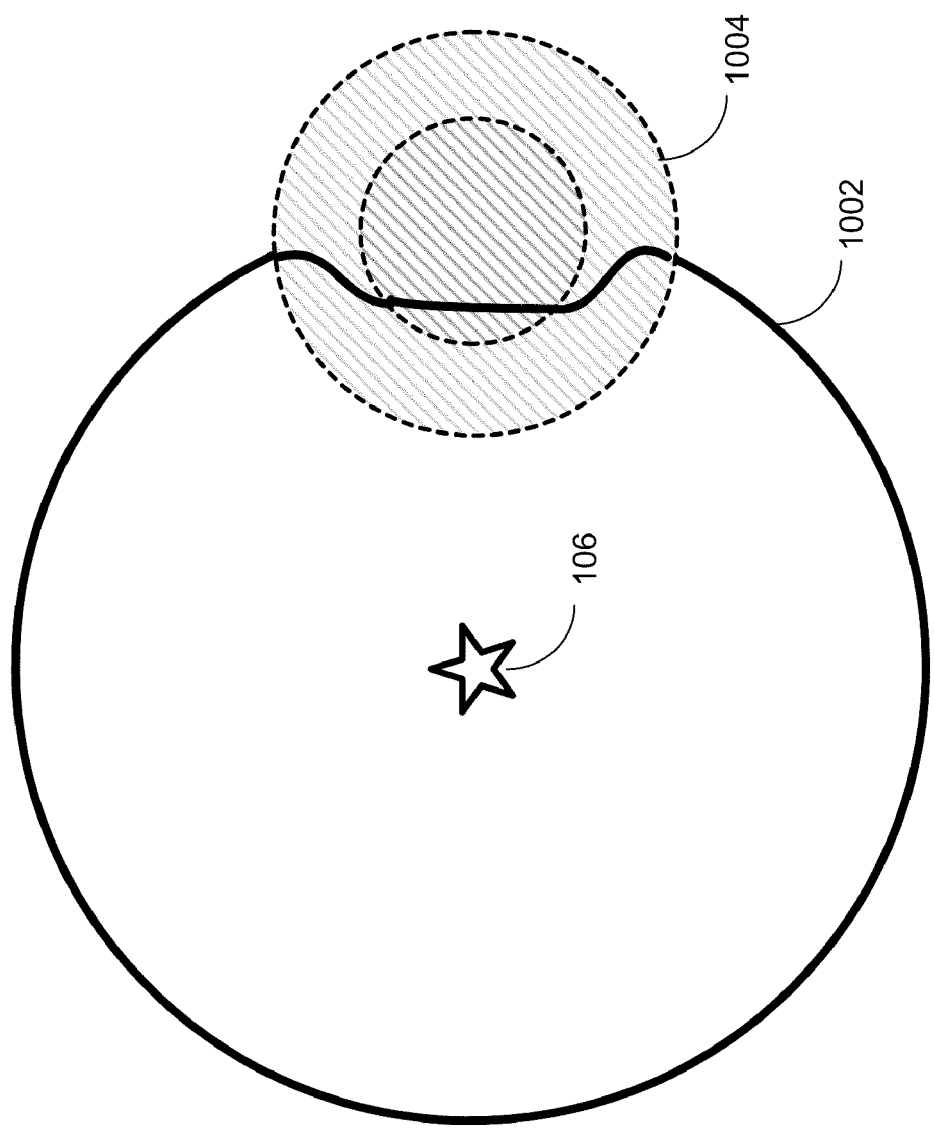
FIG. 10 depicts the effects of a single hill on a circle of constant range for a DTV transmitter that is located at the same altitude as the surrounding land.

In one implementation the position location calculation includes the effects of ground elevation. Thus in terrain with hills and valleys relative to the phase center of the DTV antenna 106 the circles of constant range are distorted. FIG. 10 depicts the effects of a single hill 1004 on a circle of constant range 1002 for a DTV transmitter 106 that is located at the same altitude as the surrounding land.

The computations of user position are easily made by a simple computer having as its database a terrain topographic map which allows the computations to include the effect of user altitude on the surface of the earth, the geoid. This calculation has the effect of distorting the circles of constant range as shown in FIG. 10.

ATSC Position Location

FIGS. 11-23 illustrate various receivers for use with American Television Standards Committee (ATSC) DTV signals. DTV was first implemented in the United States in 1998. As of the end of 2000, 167 stations were on the air broadcasting the DTV signal. As of Feb. 28, 2001, approximately 1200 DTV construction permits had been acted on by the FCC. According to the FCC's objective, all television transmission will soon be digital, and analog signals will be eliminated. Public broadcasting stations must be digital by May 1, 2002 in order to retain their licenses. Private stations must be digital by May 1, 2003. Over 1600 DTV transmitters are expected in the United States.

These new DTV signals permit multiple standard definition TV signals or even high definition signals to be transmitted in the assigned 6 MHz channel. These new American Television Standards Committee (ATSC) DTV signals are completely different from the analog NTSC TV signals, are transmitted on new 6 MHz frequency channels, and have completely new capabilities.

The inventors have recognized that the ATSC signal can be used for position location, and have developed techniques for doing so. These techniques are usable in the vicinity of ATSC DTV transmitters with a range from the transmitter much wider than the typical DTV reception range. Because of the high power of the DTV signals, these techniques can even be used indoors by handheld receivers.

In contrast to the digital pseudo-noise codes of GPS, the DTV signals are received from transmitters only a few miles distant, and the transmitters broadcast signals at levels up to the megawatt level. In addition the DTV antennas have significant antenna gain, on the order of 14 dB. Thus there is often sufficient power to permit DTV signal reception inside buildings.

Certain receiver implementations use only the DTV signal synchronization codes as opposed to demodulating and decoding the DTV 8-ary Vestigial Sideband Modulation (8VSB) data signal. Consequently, the DTV signal can be correlated for a period roughly a million times longer than the period of single data symbol. Thus the ability to track signals indoors at substantial range from the DTV tower is greatly expanded. Furthermore, through the use of digital signal processing it is possible to implement these new tracking techniques in a single semiconductor chip.

Figure 11:
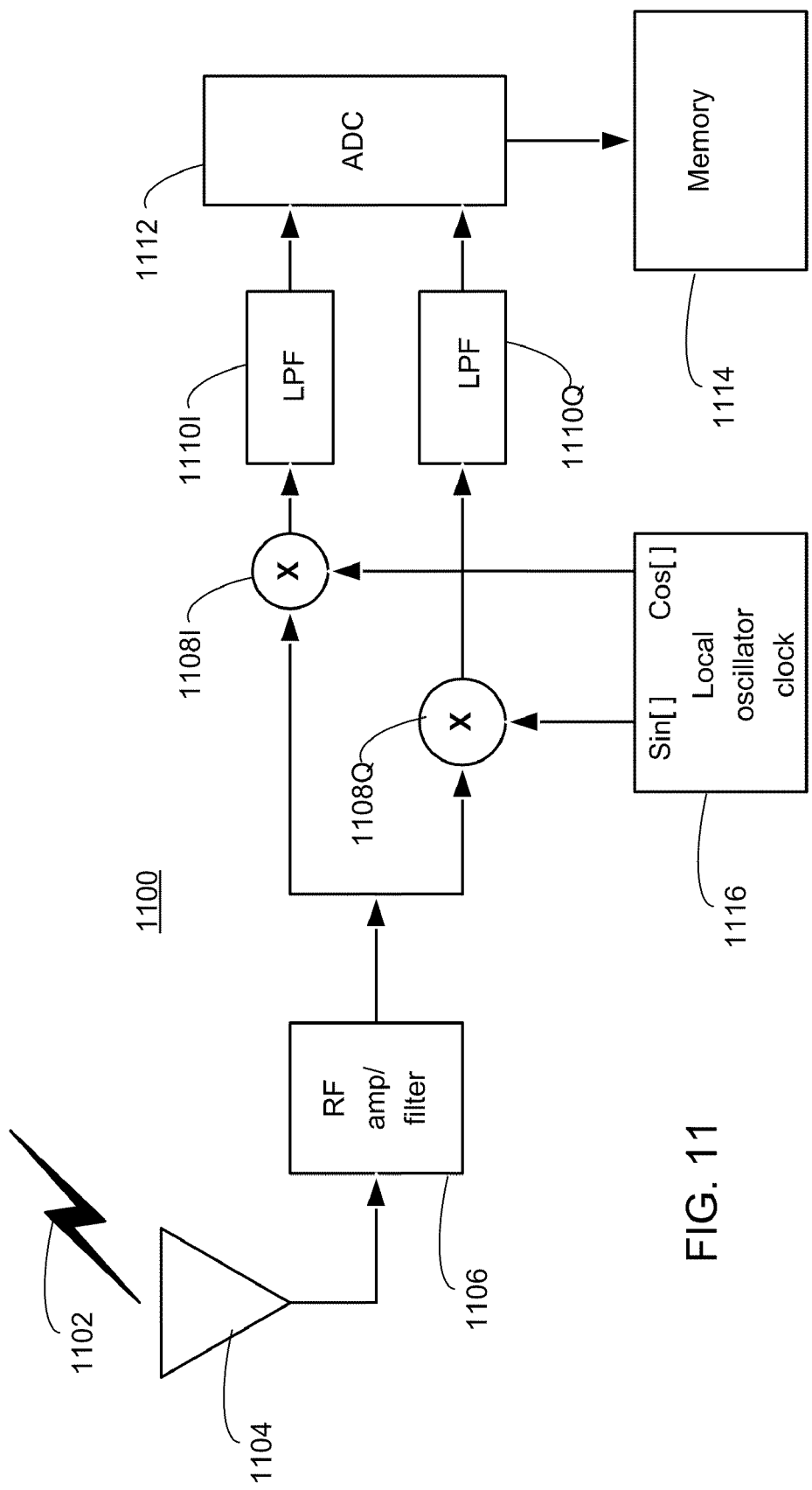
FIG. 11 depicts an implementation of a sampler for use in taking samples of received DTV signals.

FIG. 11 depicts an implementation 1100 of a sampler for use in taking samples of received DTV signals. In one implementation, sampler 1100 is implemented within user device 102. In another implementation, sampler 1100 is implemented within monitor units 108. The sampling rate should be sufficiently high to obtain an accurate representation of the DTV signal, as would be apparent to one skilled in the art.

Sampler 1100 receives a DTV signal 1102 at an antenna 1104. A radio frequency (RF) amp/filter 1106 amplifies and filters the received DTV signal. A local oscillator clock 1116 and mixers 1108I and 1108Q downconvert the signal to produce in-phase (I) and quadrature (Q) samples, respectively. The I and Q samples are respectively filtered by low-pass filters (LPF) 1110I and 1110Q. An analog-to-digital converter (ADC) 1112 converts the I and Q samples to digital form. The digital I and Q samples are stored in a memory 1114.

Figure 12:
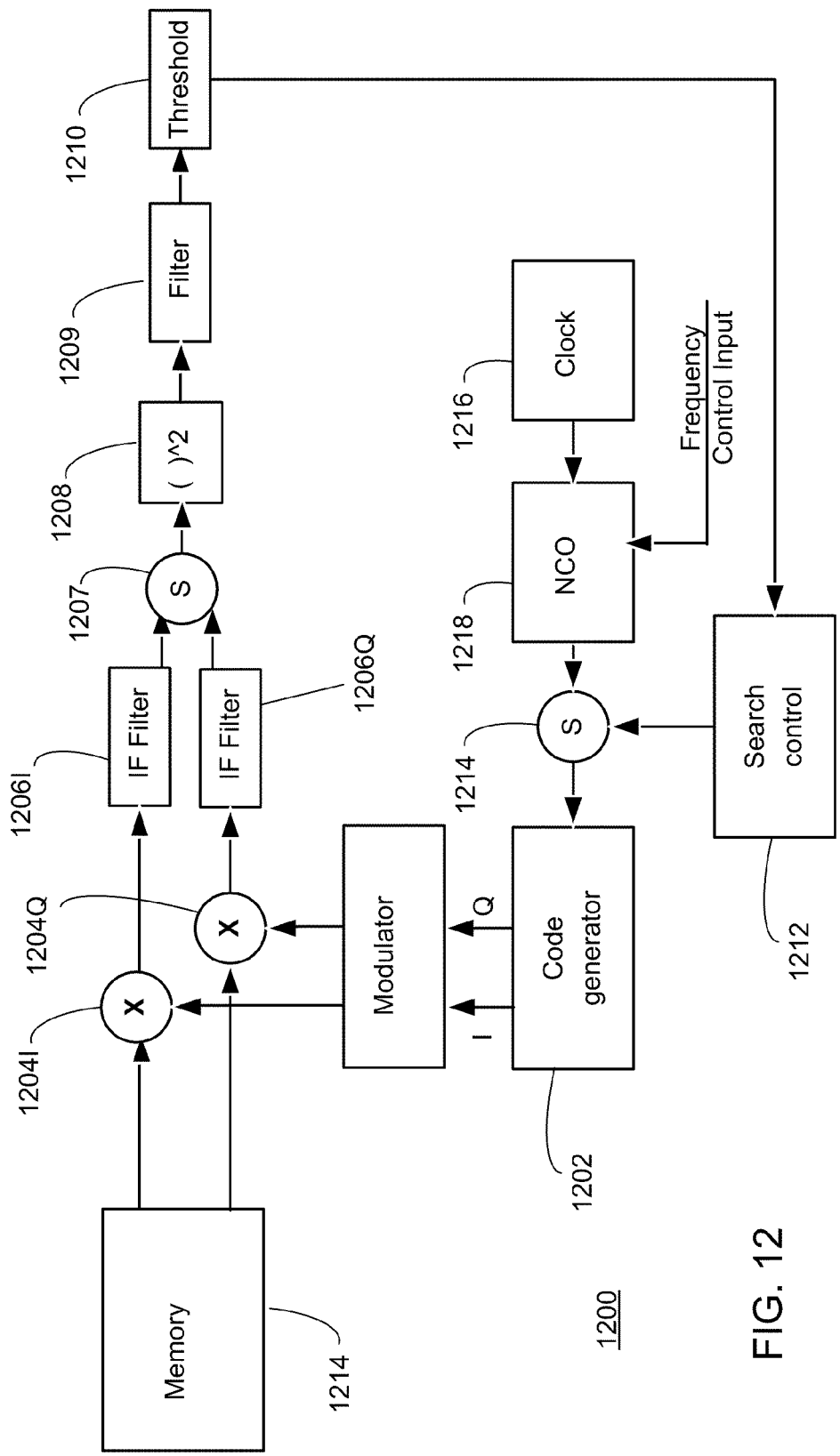
FIG. 12 depicts an implementation of a noncoherent correlator for use in searching for the correlation peak of the DTV signal samples produced by the sampler of FIG. 11.

FIG. 12 depicts an implementation 1200 of a noncoherent correlator for use in searching for the correlation peak of the DTV signal samples produced by sampler 1100. In one implementation, correlator 1200 is implemented within user device 102. In another implementation, correlator 1200 is implemented within monitor units 108.

Correlator 1200 retrieves the I and Q samples of a DTV signal from memory 1114. Correlator 1200 processes the samples at intermediate frequency (IF). Other implementations process the samples in analog or digital form, and can operate at intermediate frequency (IF) or at baseband.

A code generator 1202 generates a code sequence. In one implementation, the code sequence is a raised cosine waveform. The code sequence can be any known digital sequence in the ATSC frame. In one implementation, the code is a synchronization code. In one implementation, the synchronization code is a Field Synchronization Segment within an ATSC data frame. In another implementation, the synchronization code is a Synchronization Segment within a Data Segment within an ATSC data frame. In still another implementation, the synchronization code includes both the Field Synchronization Segment within an ATSC data frame and the Synchronization Segments within the Data Segments within an ATSC data frame. Other components of the DTV signal, such as pilot, symbol clock, or carrier, can be used for position location. However, the use of such signals, which have a high repetition rate, produces inherent ambiguities. Techniques for resolving such ambiguities are well-known in the art. One such technique is disclosed in M. Rabinowitz, Ph.D. Thesis: A Differential Carrier Phase Navigation System Combining GPS with Low-Earth Orbit Satellites for Rapid Resolution of Integer Cycle Ambiguities, 2000, Department of Electrical Engineering, Stanford University, pages 129-76, which is incorporated herein by reference.

Mixers 1204I and 1204Q respectively combine the I and Q samples with the code generated by code generator 1202. The outputs of mixers 1204I and 1204Q are respectively filtered by filters 1206I and 1206Q and provided to summer 1207. The sum is provided to square law device 1208. Filter 1209 performs an envelope detection for non-coherent correlation, according to conventional methods. Comparator 1210 compares the correlation output to a predetermined threshold. If the correlation output falls below the threshold, search control 1212 causes summer 1214 to add additional pulses to the clocking waveform produced by clock 1216, thereby advancing the code generator by one symbol time, and the process repeats. In a preferred embodiment, the clocking waveform has a nominal clock rate of 10.76 MHz, matching the clock rate or symbol rate the received DTV signals.

When the correlation output first exceeds the threshold, the process is done. The time offset that produced the correlation output is used as the pseudo-range for that DTV transmitter 106.

In receiver correlators and matched filters there are two important sources of receiver degradation. The user device local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) 1218 adjusts the clock frequency of the receiver to match that of the incoming received signal clock frequency and compensate for drifts and frequency offsets of the local oscillator in user device 102. Increased accuracy of the clock frequency permits longer integration times and better performance of the receiver correlator. The frequency control input of NCO 1218 can be derived from several possible sources, a receiver symbol clock rate synchronizer, tracking of the ATSC pilot carrier, or other clock rate discriminator techniques installed in NCO 1218.

Figure 13:
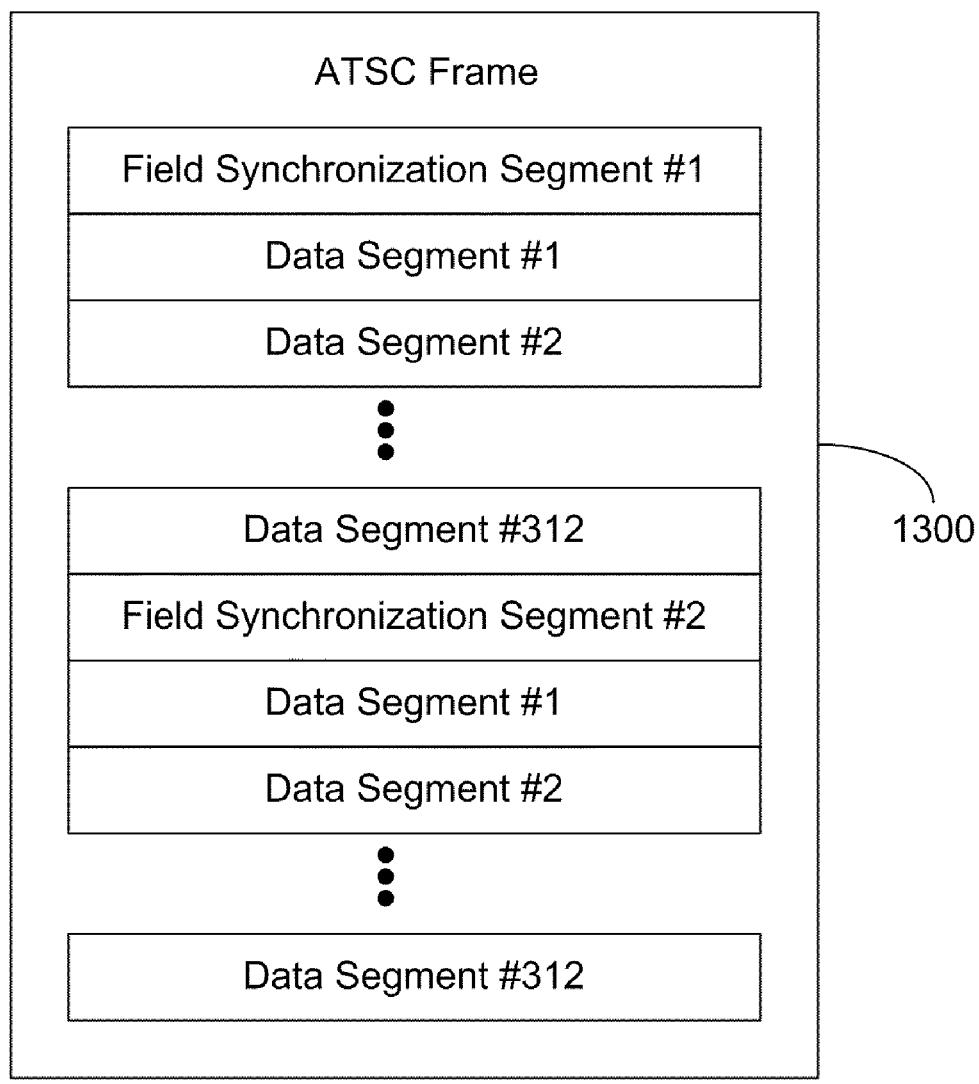
FIG. 13 illustrates the structure of the ATSC frame.

The current ATSC signal is described in "ATSC Digital Television Standard and Amendment No. 1," Mar. 16, 2000, by the Advanced Television Systems Committee. The ATSC signal uses 8-ary Vestigial Sideband Modulation (8VSB). The symbol rate of the ATSC signal is 10.762237 MHz, which is derived from a 27.000000 MHz clock. The structure 1300 of the ATSC frame is illustrated in FIG. 13. The frame 1300 consists of a total of 626 segments, each with 832 symbols, for a total of 520832 symbols. There are two field synchronization segments in each frame. Following each field synchronization segment are 312 data segments. Each segment begins with 4 symbols that are used for synchronization purposes.

The structure 1400 of the field synchronization segment is illustrated in FIG. 14. The two field synchronization segments 1400 in a frame 1300 differ only to the extent that the middle set of 63 symbols are inverted in the second field synchronization segment.

The structure 1500 of the data segment is illustrated in FIG. 15. The first four symbols of data segment 1500 (which are −1, 1, 1, −1) are used for segment synchronization. The other 828 symbols in data segment 1500 carry data. Since the modulation scheme is 8VSB, each symbol carries 3 bits of coded data. A rate 2/3 coding scheme is used.

Implementations of the invention can be extended to use future enhancements to DTV signals. For example, the ATSC signal specification allows for a high rate 16VSB signal. However, the 16VSB signal has the same field synch pattern as the 8VSB signal. Therefore, a single implementation of the present invention can be designed to work equally well with both the 8VSB and the 16VSB signal.

Figure 16:
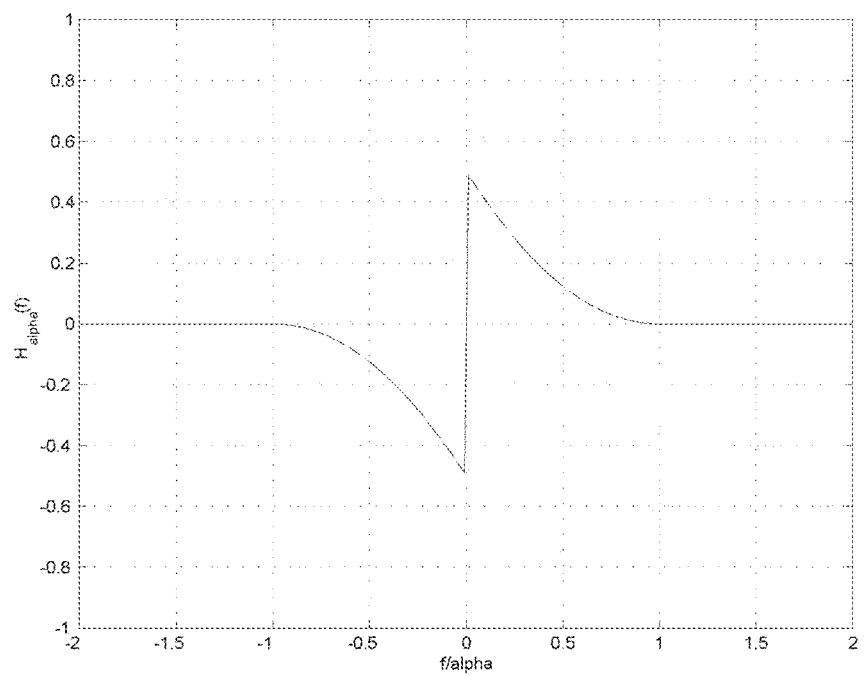
FIG. 16 shows a plot of the gain function for a filter used in producing an ATSC DTV signal.

The 8VSB signal is constructed by filtering. The in-phase segment of the symbol pulse has a raised-cosine characteristic, as described in J. G. Proakis, Digital Communications, McGraw-Hill, 3$^{rd}$ edition, 1995. The pulse can be described as $$p(t) = \mathrm{sinc}\left(\frac{\pi t}{T}\right) \frac{\cos\left(\frac{\pi \beta t}{T}\right)}{1 - \frac{4\beta^2 t^2}{T^2}} \tag{8}$$

where T is the symbol period $$T = \frac{1}{10.76 \times 10^6} \tag{9}$$

and β=0.05762. This signal has a frequency characteristic $$P(f) = \begin{cases} T; & 0 \leq |f| < \frac{1-\beta}{2T} \\ \frac{T}{2}\left\{1 + \cos\left[\frac{\pi T}{\beta}\left(|f| - \frac{1-\beta}{2T}\right)\right]\right\}; & \frac{1-\beta}{2T} \leq |f| \leq \frac{1+\beta}{2T} \\ 0; & |f| > \frac{1+\beta}{2T} \end{cases} \tag{10}$$

from which it is clear that the one-sided bandwidth of the signal is (1+β)10.762237 MHz=5.38 MHz+0.31 MHz. In order to create a VSB signal from this in-phase pulse, the signal is filtered so that only a small portion of the lower sideband remains. This filtering can be described as:

$$P_v(f) = P(f)(U(f) - H_\alpha(f)) \tag{11}$$

where $$U(f) = \begin{cases} 1, f \geq 0 \\ 0, f < 0 \end{cases} \tag{12}$$

where $H_\alpha(f)$ is a filter designed to leave a vestigial remainder of the lower sideband. A plot of the gain function for $H_\alpha(f)$ is shown in FIG. 16. The filter satisfies the characteristics $H_\alpha(-f)=-H_\alpha(f)$ and $H_\alpha(f)=0$, $f>\alpha$.

The response U(f)P(f) can be represented as $$U(f)P(f) = \frac{1}{2}\left(P(f) + j\breve{P}(f)\right) \quad (13)$$

where $\breve{P}(f) = -j\,\text{sgn}(f)P(f)$ is the Hilbert transform of P(f). The VSB pulse may be represented as $$P_v(f) = \frac{1}{2}X(f) + \frac{j}{2}\left(\breve{X}(f) + 2X(f)H_\alpha(f)\right) \quad (14)$$

and the baseband pulse signal $$P_v(t) = \frac{1}{2}x(t) + \frac{j}{2}\left(\breve{x}(t) + x_\alpha(t)\right) = p_{vi}(t) + jp_{vq}(t) \quad (15)$$

where $p_{vi}(t)$ is the in-phase component, $p_{vq}(t)$ is the quadrature component, and $$x_\alpha(t) = 2\int_{-\infty}^{\infty} X(f)H_\alpha(f)e^{j2\pi ft}\,df \quad (16)$$

Before the data is transmitted, the ATSC signal also embeds a carrier signal, which has −11.5 dB less power than the data signal. This carrier aids in coherent demodulation of the signal. Consequently, the transmitted signal can be represented as:

$$s(t) = \sum_n C_n\{p_{vi}(t - nT)\cos(\omega t) - p_{vq}(t - nT)\sin(\omega t)\} + A\sin(\omega t) \quad (17)$$

where $C_n$ is the 8-level data signal.

Figure 17:
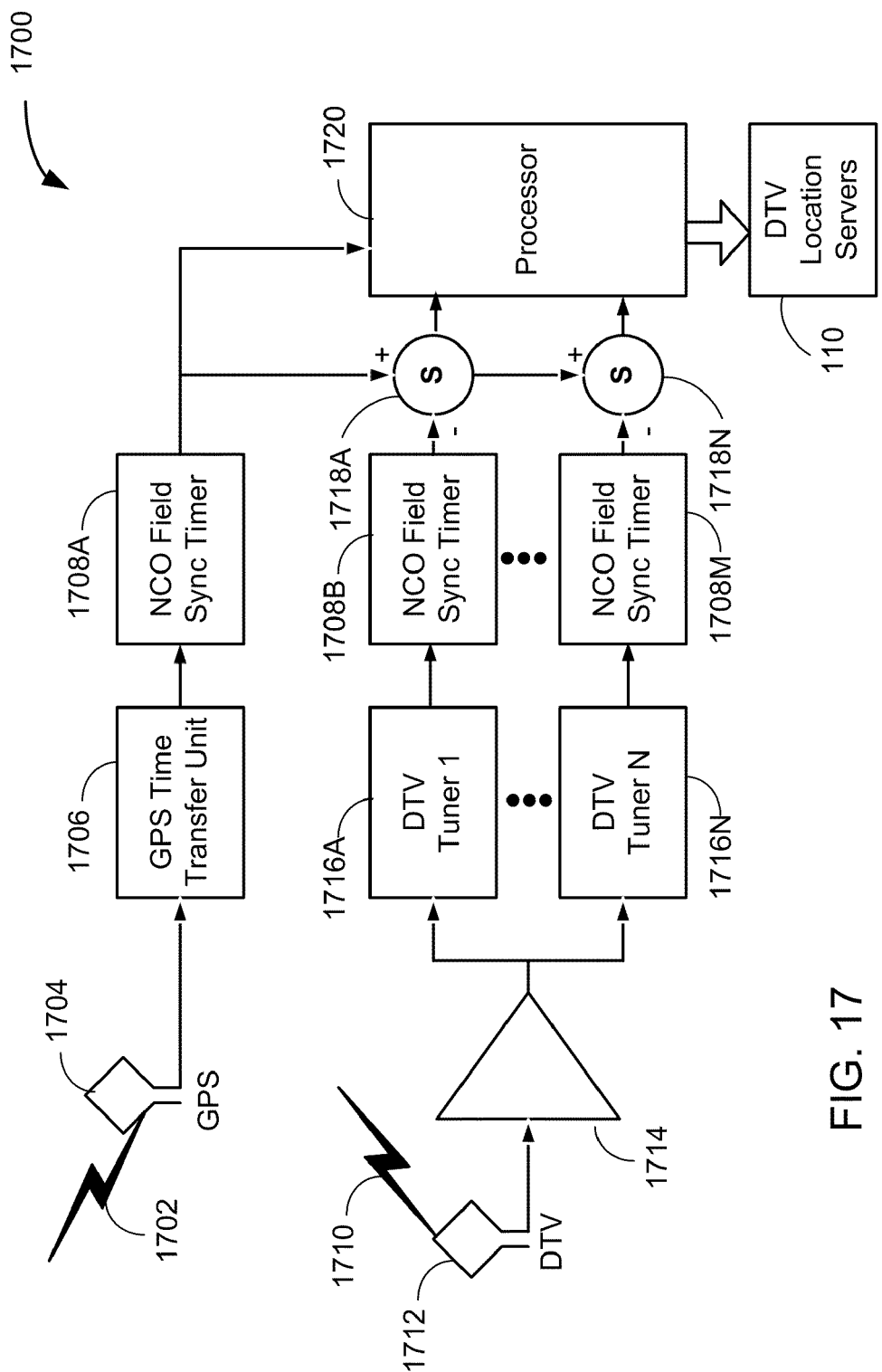
FIG. 17 depicts an implementation of a monitor unit.

FIG. 17 depicts an implementation 1700 of monitor unit 108. An antenna 1704 receives GPS signals 1702. A GPS time transfer unit 1706 develops a master clock signal based on the GPS signals. In order to determine the offset of the DTV transmitter clocks, a NCO (numerically controlled oscillator) field synchronization timer 1708A develops a master synchronization signal based on the master clock signal. The master synchronization signal can include one or both of the ATSC segment synchronization signal and the ATSC field synchronization signal. In one implementation, the NCO field synchronization timers 1708A in all of the monitor units 108 are synchronized to a base date and time. In implementations where a single monitor unit 108 receives DTV signals from all of the same DTV transmitters that user device 102 does, it is not necessary to synchronize that monitor unit 108 with any other monitor unit for the purposes of determining the position of user device 102. Such synchronization is also unnecessary if all of the monitor stations 108, or all of the DTV transmitters, are synchronized to a common clock.

A DTV antenna 1712 receives a plurality of DTV signals 1710. In another implementation, multiple DTV antennas are used. An amplifier 1714 amplifies the DTV signals. One or more DTV tuners 1716A through 1716N each tunes to a DTV channel in the received DTV signals to produce a DTV channel signal. Each of a plurality of NCO field synchronization timers 1708B through 1708M receives one of the DTV channel signals. Each of NCO field synchronization timers 1708B through 1708M extracts a channel synchronization signal from a DTV channel signal. The channel synchronization signal can include one or both of the ATSC segment synchronization signal and the ATSC field synchronization signal. Note that the pilot signal and symbol clock signal within the DTV signal can be used as acquisition aids.

Each of a plurality of summers 1718A through 1718N generates a clock offset between the master synchronization signal and one of the channel synchronization signals. Processor 1720 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself.

One thorough approach to mitigating the effects of multipath is to sample an entire autocorrelation function, rather than to use only early and late samples as in a hardware setup. Multipath effects can be mitigated by selecting the earliest correlation peak.

In the case that position can be computed with a brief delay, a simple approach is to use a software receiver, which samples a sequence of the filtered signal, and then processes the sample in firmware on a DSP.

Figure 18:
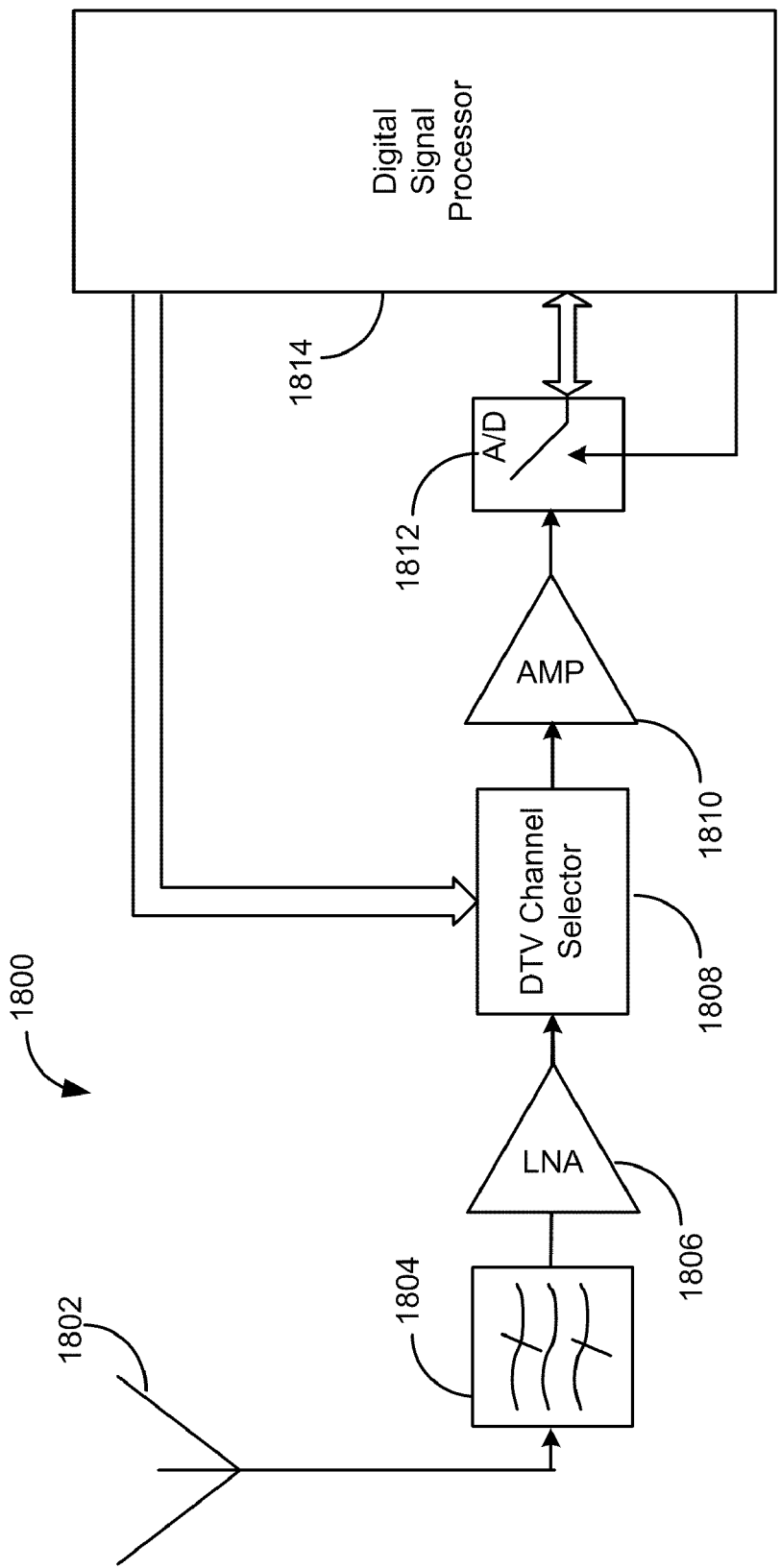
FIG. 18 illustrates one implementation for tracking in software.

FIG. 18 illustrates one implementation 1800 for tracking in software. An antenna 1802 receives a DTV signal. Antenna 1802 can be a magnetic dipole or any other type of antenna capable of receiving DTV signals. A bandpass filter 1804 passes the entire DTV signal spectrum to an LNA 1806. In one implementation, filter 1804 is a tunable bandpass filter that passes the spectrum for a particular DTV channel under the control of a digital signal processor (DSP) 1814.

A low-noise amplifier (LNA) 1806 amplifies and passes the selected signal to a DTV channel selector 1808. DTV channel selector 1808 selects a particular DTV channel under the control of DSP 1814, and filters and downconverts the selected channel signal from UHF (ultra-high frequency) to IF (intermediate frequency) according to conventional methods. An amplifier (AMP) 1810 amplifies the selected IF channel signal. An analog-to-digital converter and sampler (A/D) 1812 produces digital samples of the DTV channel signal s(t) and passes these samples to DSP 1814.

Now the processing of the DTV channel signal by DSP 1814 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max}=0$

Create a complex code signal $$s_{code}(t)=\Sigma \overline{C}_n\{p_{vi}(t-nT)+jp_{vq}(t-nT)\}$$

where $\overline{C}_n$ is zero for all symbols corresponding to data signals and non-zero for all symbols corresponding to synchronization signals.

For $$\omega = \omega_{in} - \omega_{offset} \text{ to } \omega_{in} + \omega_{offset} \text{ step } 0.5\frac{\pi}{T_i}$$

Create a complex mixing signal $$s_{mix}(t)=\cos(\omega t)+j\sin(\omega t), t=[0 \ldots T_i]$$

Combine the incident signal s(t) and the mixing signal $s_{mix}(t)$ $$s_{comb}(t)=s(t)s_{mix}(t)$$

Compute the correlation function $R(\tau)=s_{code}*s_{comb}(\tau)$

If $\max_\tau |R(\tau)|>R_{max}$, then $R_{max}\leftarrow\max_\tau|R(\tau)|, R_{store}(\tau)=R(\tau)$ Next $\omega$ Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\tau$ that produces the maximum correlation output is used as the pseudo-range.

A technique for generating the non-coherent correlation in software is now described. This approach emulates the hardware receivers of FIGS. 11 and 12. Note that while the I and Q channels are treated separately in the block diagrams, the I and Q components may be combined to generate the mixing signal in software. Since the non-coherent correlator uses envelope detection, it is not necessary to search over a range of intermediate frequencies. The process implements the pseudocode listed below.

Create the in-phase and quadrature code signals $c_i(t)=\Sigma \overline{C}_n p_{vi}(t-nT_i)$, $c_q(t)=\Sigma\overline{C}_n p_{vq}(t-nT_i)$ where the sum is over n, $\overline{C}_n$ is zero for all symbols corresponding to data signals and non-zero for all symbols corresponding to synchronization signals. Note that $c_i$ has autocorrelation $R_i$, $c_q$ has autocorrelation $R_q$, and that their cross-correlation is $R_{iq}$.

For $\tau=0$ to $T_{per}$ step $T_{samp}$ where $T_{per}$ is the period of the code being used, and $T_{samp}$ is the sample interval Create a reference code mixing signal $$s_{mix}(t)=c_i(t+\tau)\cos(\omega t+\upsilon t+\phi)+c_q(t+\tau)\sin(\omega t+\upsilon t+\phi)$$

where $\omega$ is the nominal IF frequency of the incident signal, $\upsilon$ is the frequency offset of the mixing signal relative to the incident signal, and $\phi$ is the phase offset of the mixing signal from the incident signal.

Combine the incident signal s(t) and the reference code mixing signal $s_{mix}(t)$.

$$s_{comb}(t)=s(t)s_{mix}(t)$$

Low-pass filter $s_{comb}(t)$ to generate $s_{filt}(t)$ such that the expected value of $s_{filt}(t)$ is given by $E[s_{filt}(t)]=2R_i(\tau)\cos(\upsilon t+\phi)+2R_{iq}(\tau)\sin(\upsilon t+\phi)$ where we have used that fact that $R_i(\tau)=-R_q(\tau)$ Perform envelope detection on $s_{filt}(t)$ (for example, by squaring and filtering) to generate the non-coherent correlation: $z(\tau)=2[R_i(\tau)^2+R_{iq}(\tau)^2]$ Next $\tau$ The time offset $\tau$ that produces the maximum correlation output is used as the pseudo-range.

Figure 19:
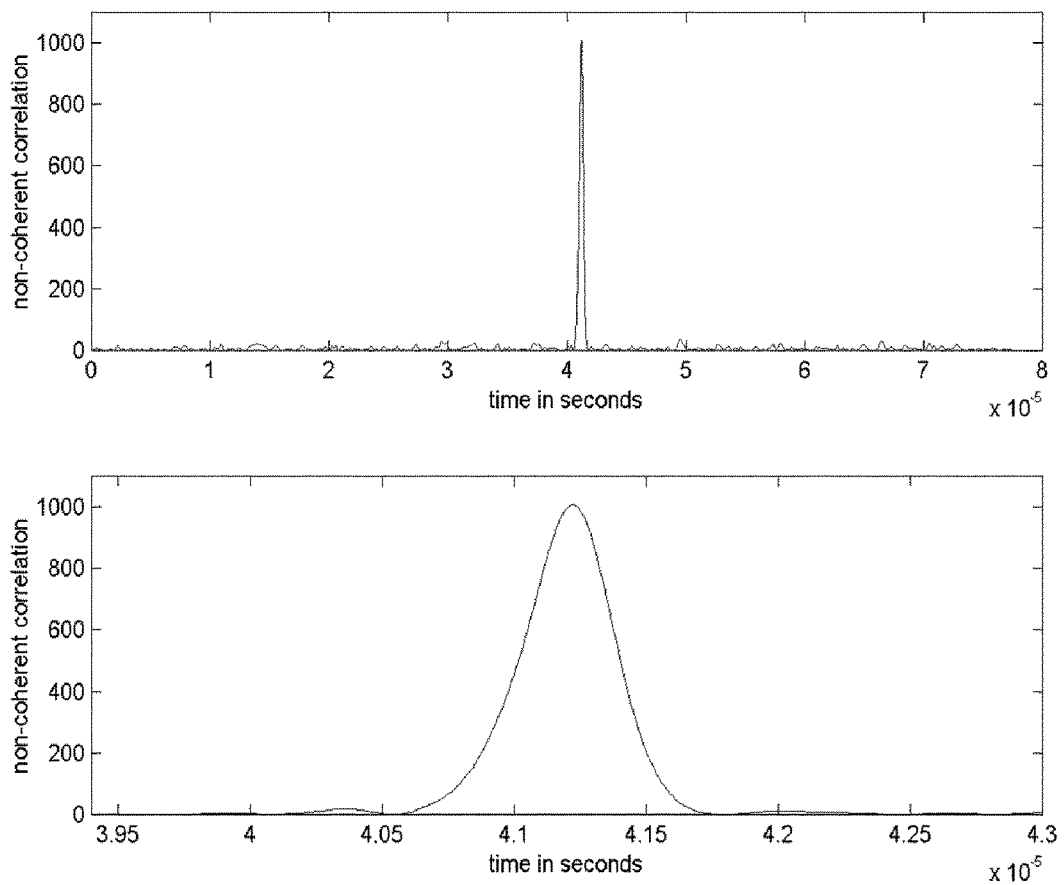
FIG. 19 shows a plot of the output of the non-coherent correlator.

Notice that the non-coherent correlation $z(\tau)$ makes use of the signal power in both the in-phase and quadrature components. However, as a result of this, the effective bandwidth of the signal that generates the non-coherent correlation is halved. The output of the non-coherent correlator is illustrated in FIG. 19. The upper plot shows the correlation peak for an interval of roughly $8\times10^{-5}$ seconds. The lower plot shows the effective 3 MHz bandwidth of the correlation peak.

Figure 20:
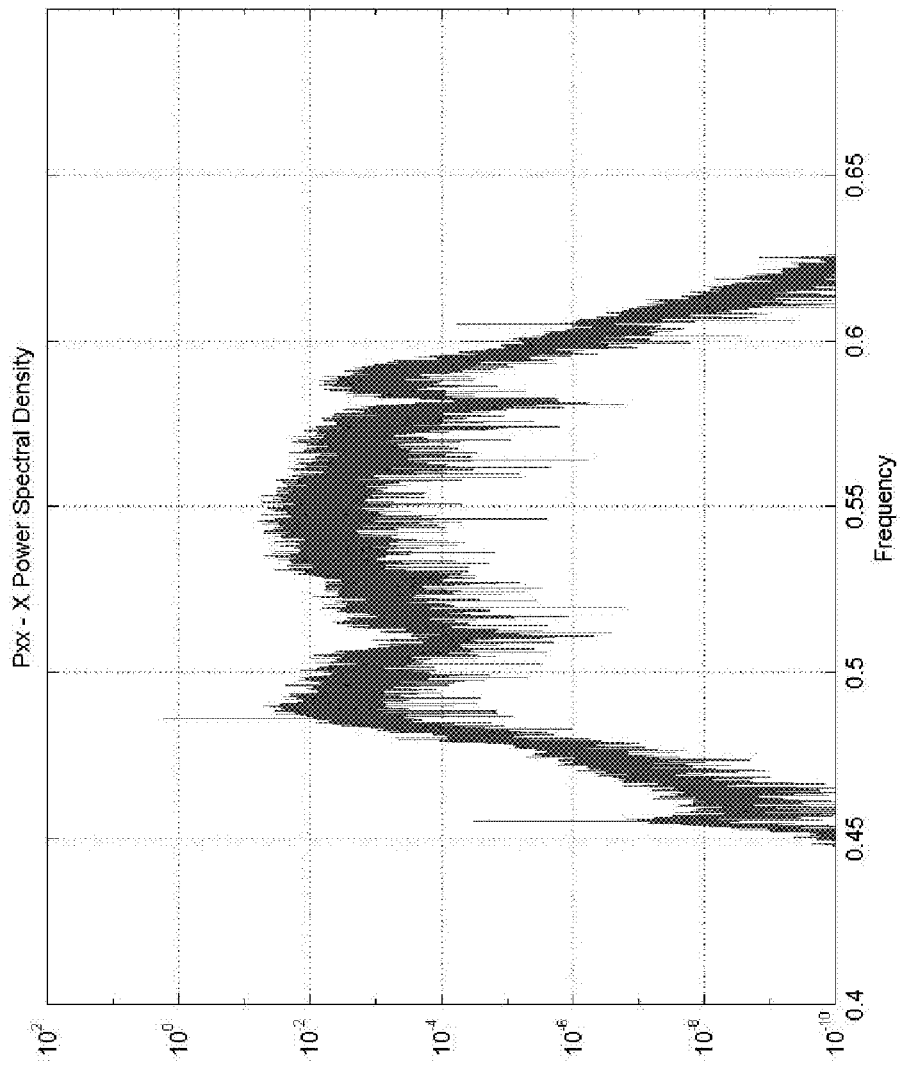
FIG. 20 displays an example spectrum for a 1 millisecond sample of the signal from a KICU channel 52 DTV broadcast from San Jose.

A technique similar to that described above for tracking in software was applied to DTV transmissions arising from San Jose, Calif. and received indoors in Palo Alto, Calif. This example is presented for illustration purposes and not to limit the scope of the present invention. FIG. 20 displays an example spectrum for a 1 millisecond sample of the signal from a KICU channel 52 DTV broadcast from San Jose. The signal was downconverted to a center frequency of 27 MHz, which corresponds to a digital frequency of 0.54 for a sampling rate of 100 mega-samples per second. The signal was digitally bandpass filtered to a bandwidth of 6 MHz.

Figure 21:
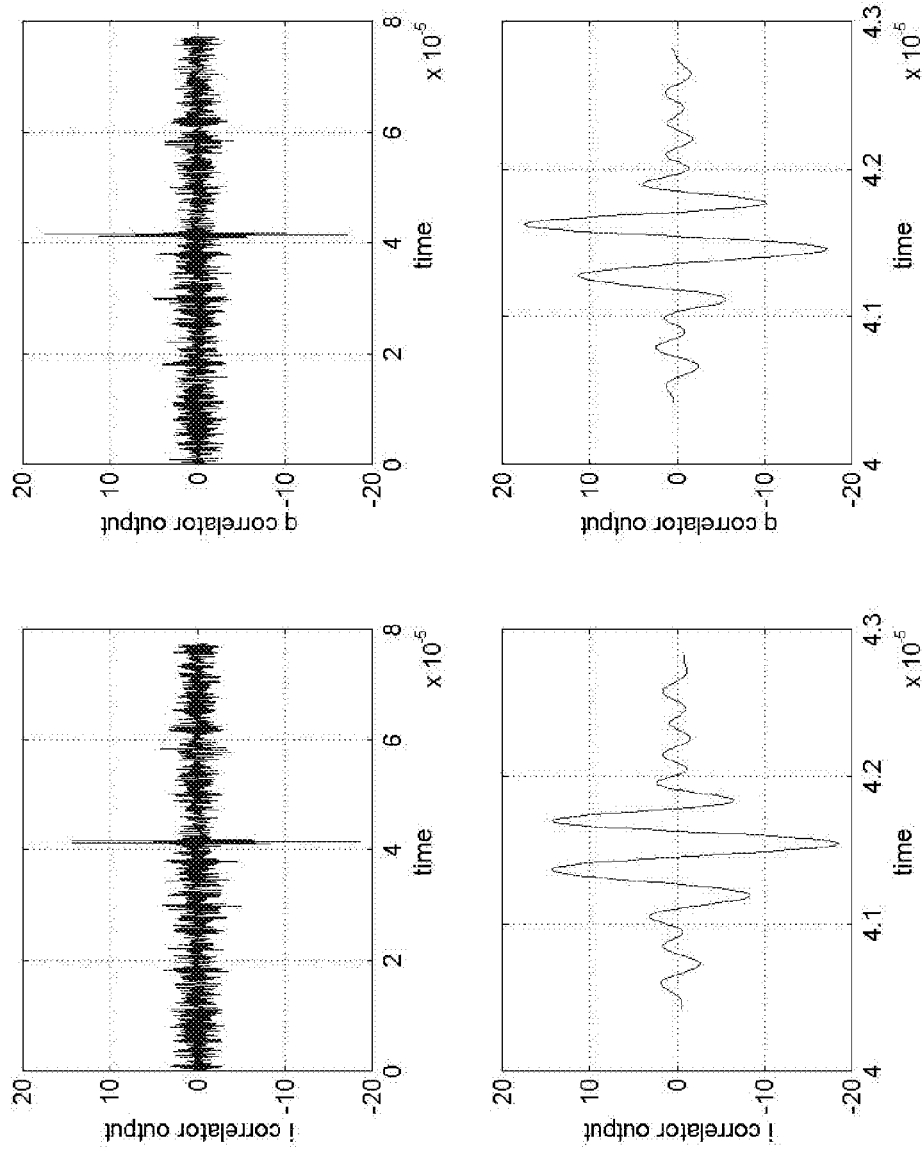
FIG. 21 shows the computed autocorrelation function for the in-phase and quadrature component of the resulting 6 MHz signal.

The computed autocorrelation function for the in-phase and quadrature component of the resulting 6 MHz signal is illustrated in FIG. 21. Note that this is the autocorrelation for only the 4 data synchronization symbols at the beginning of each segment.

Figure 22:
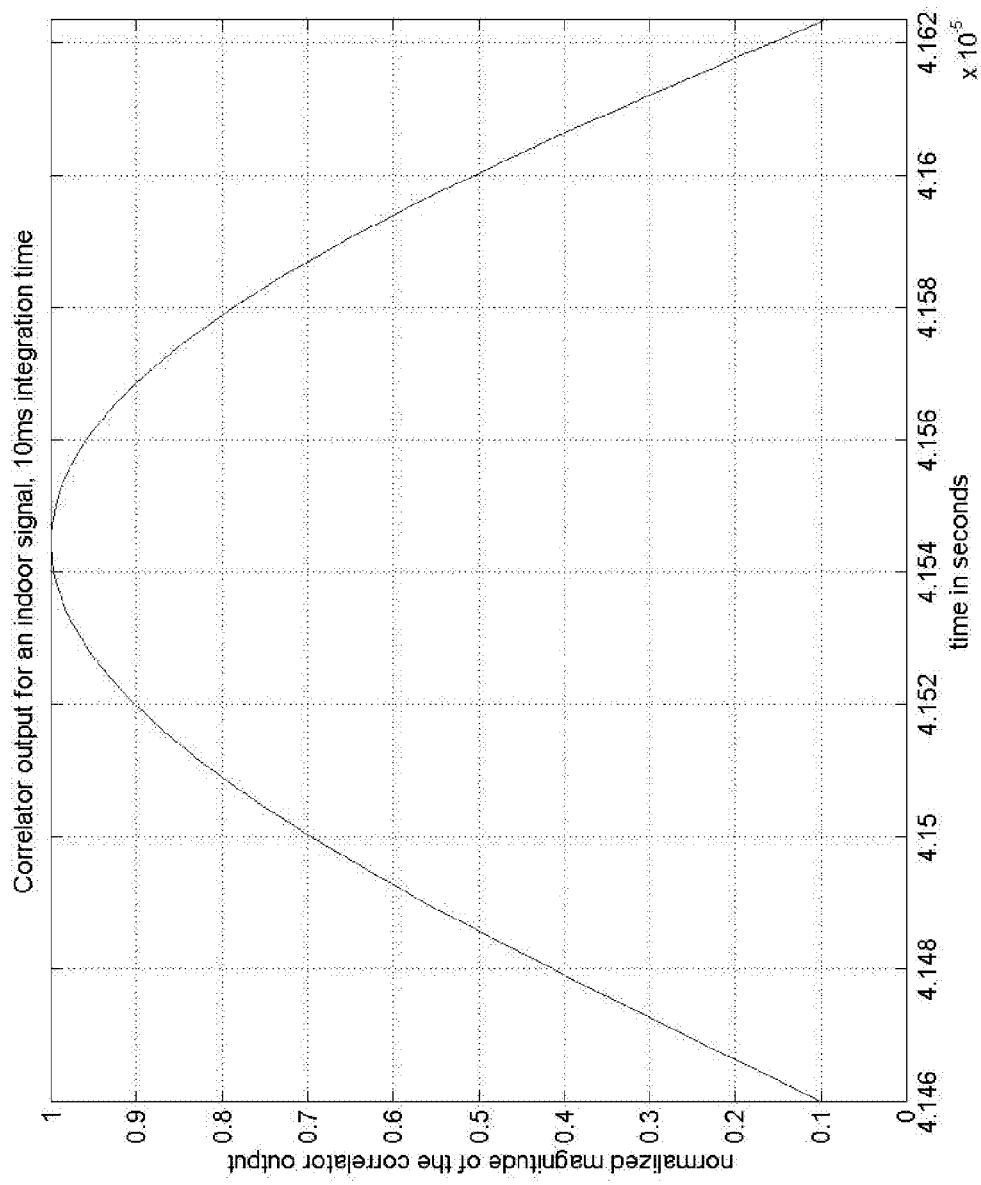
FIG. 22 shows the characteristics of the 6 MHz signal.

The characteristics of the 6 MHz signal are shown in FIG. 22. FIG. 22 displays a portion of the autocorrelation peak for the in-phase channel. From the smoothness of the curve, one can see that the signal-to-noise ratio is high. In addition, the curvature of the peak indicates the high signal bandwidth which makes this signal robust to multipath.

Figure 23:
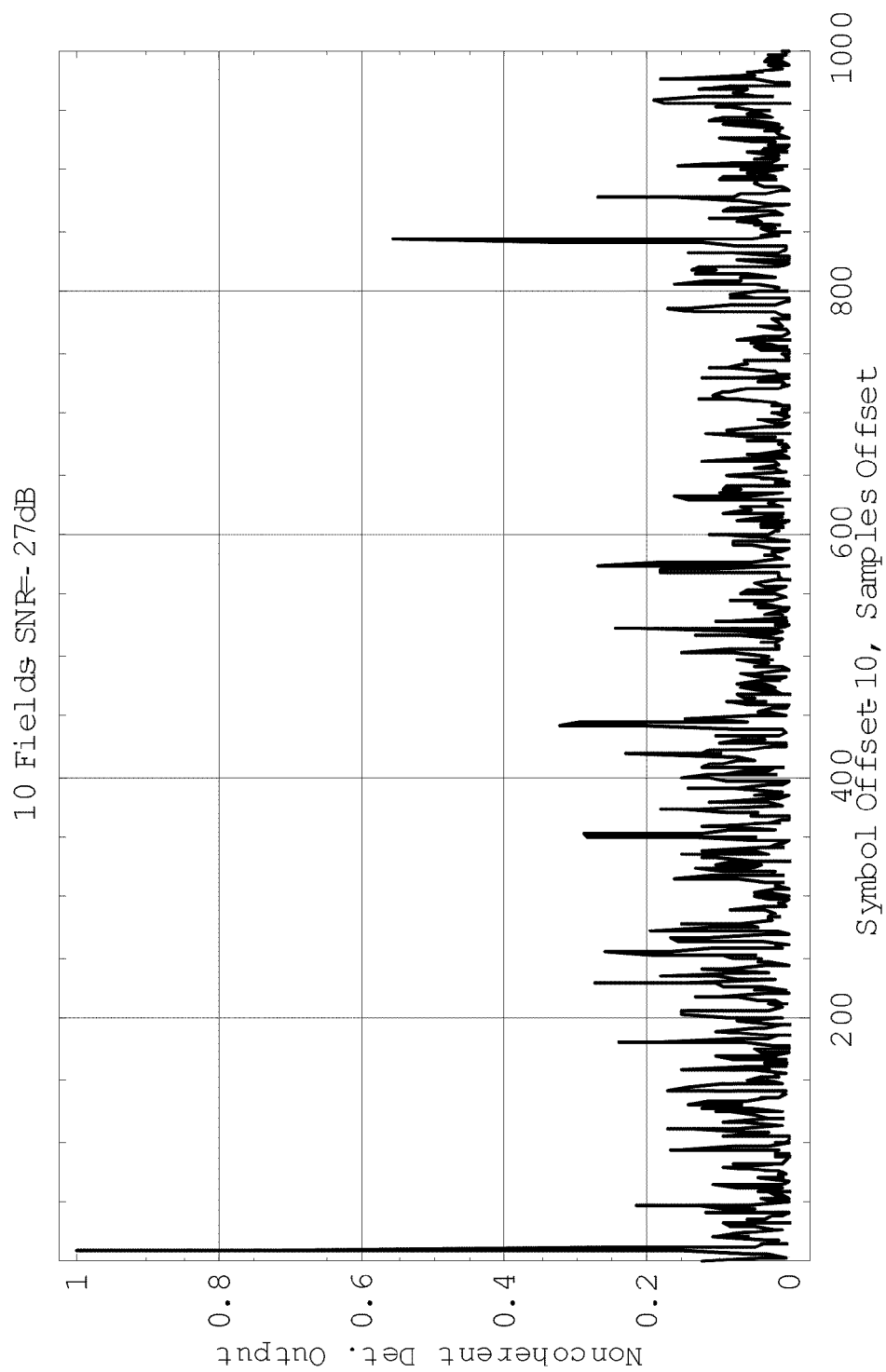
FIG. 23 depicts the results of a simulation of the operation of the correlator of FIG. 12.

FIG. 23 depicts the results of a simulation of the operation of correlator 1200. The simulation was conducted using Mathematica software produced by Wolfram Research. The simulation input is the digital I and Q samples stored in a memory 1114 by sampler 1100.

FIG. 23 shows the noncoherent correlation result for symbol-synchronous sampling at a 10.76 MHz complex sample rate and an integration time of 242 milliseconds or 10 fields. The simulation is a worst case where the samples are offset by ½ symbol or 0.05 microseconds.

The simulation also includes Gaussian noise and a signal-to-noise ratio (SNR) in the 6 MHz bandwidth of −27 dB. With a phase offset of the sampling this result degrades by 2 dB but clearly the performance would still be excellent. Normal DTV reception requires a SNR of approximately +18 dB. Correlator 1200 can recover tracking information at a SNR 18+27=45 dB below normal DTV. This result requires accurate correction of the sampling clock if a matched filter is employed. However, a time-gated delay lock loop (DLL) will automatically synchronize its clock to that of the received signal and produce the same result.

ETSI Position Location

FIGS. 24-34 illustrate various receivers for use with European Telecommunications Standards Institute (ETSI) DTV signals. ETSI has defined a terrestrial DTV signal for Europe, referred to herein as the Digital Video Broadcasting-Terrestrial (DVB-T) signal. These new DTV signals permit multiple standard definition TV signals or even high definition signals to be transmitted in the assigned 8 MHz channel. These new DVB-TDTV signals are completely different from the analog NTSC TV signals, are transmitted on new 8 MHz frequency channels, and have completely new capabilities.

The inventors have recognized that the DVB-T signal can be used for position location, and have developed techniques for doing so. These techniques are usable in the vicinity of DVB-T DTV transmitters with a range from the transmitter much wider than the typical DTV reception range. Because of the high power of the DTV signals, these techniques can even be used indoors by handheld receivers.

The techniques disclosed herein and with respect to the ATSC DTV signals previously can be applied to other DTV signals that include known sequences of data by simply modifying the correlator to accommodate the known sequence of data, as would be apparent to one skilled in the relevant arts. These techniques can also be applied to a range of other orthogonal frequency-division multiplexing (OFDM) signals such as satellite radio signals.

In contrast to the digital pseudo-noise codes of GPS, the DTV signals are received from transmitters only a few miles distant, and the transmitters broadcast signals at levels up to the megawatt level. In addition the DTV antennas have significant antenna gain, on the order of 14 dB. Thus there is often sufficient power to permit DTV signal reception inside buildings.

As described below, implementations of the present invention utilize a component of the DVB-T signal that is referred to as the "scattered pilot signal." The use of the scattered pilot signal is advantageous for several reasons. First, it permits position determination indoors, and at great distances from DTV transmitters. Conventional DTV receivers utilize only one data signal at a time, and so are limited in range from the DTV transmitter by the energy of a single signal. In contrast, implementations of the present invention utilize the energy of multiple scattered pilot signals simultaneously, thereby permitting operation at greater range from DTV transmitters than conventional DTV receivers. Further, the scattered pilots are not modulated by data. This is advantageous for two reasons. First, all of the power in the scattered pilots is available for position determination; none of the power is devoted to data. Second, the scattered pilots can be observed for long periods of time without suffering the degradation that data modulation would produce. Thus the ability to track signals indoors at substantial range from the DTV tower is greatly expanded. Furthermore, through the use of digital signal processing it is possible to implement these new tracking techniques in a single semiconductor chip.

Figure 24:
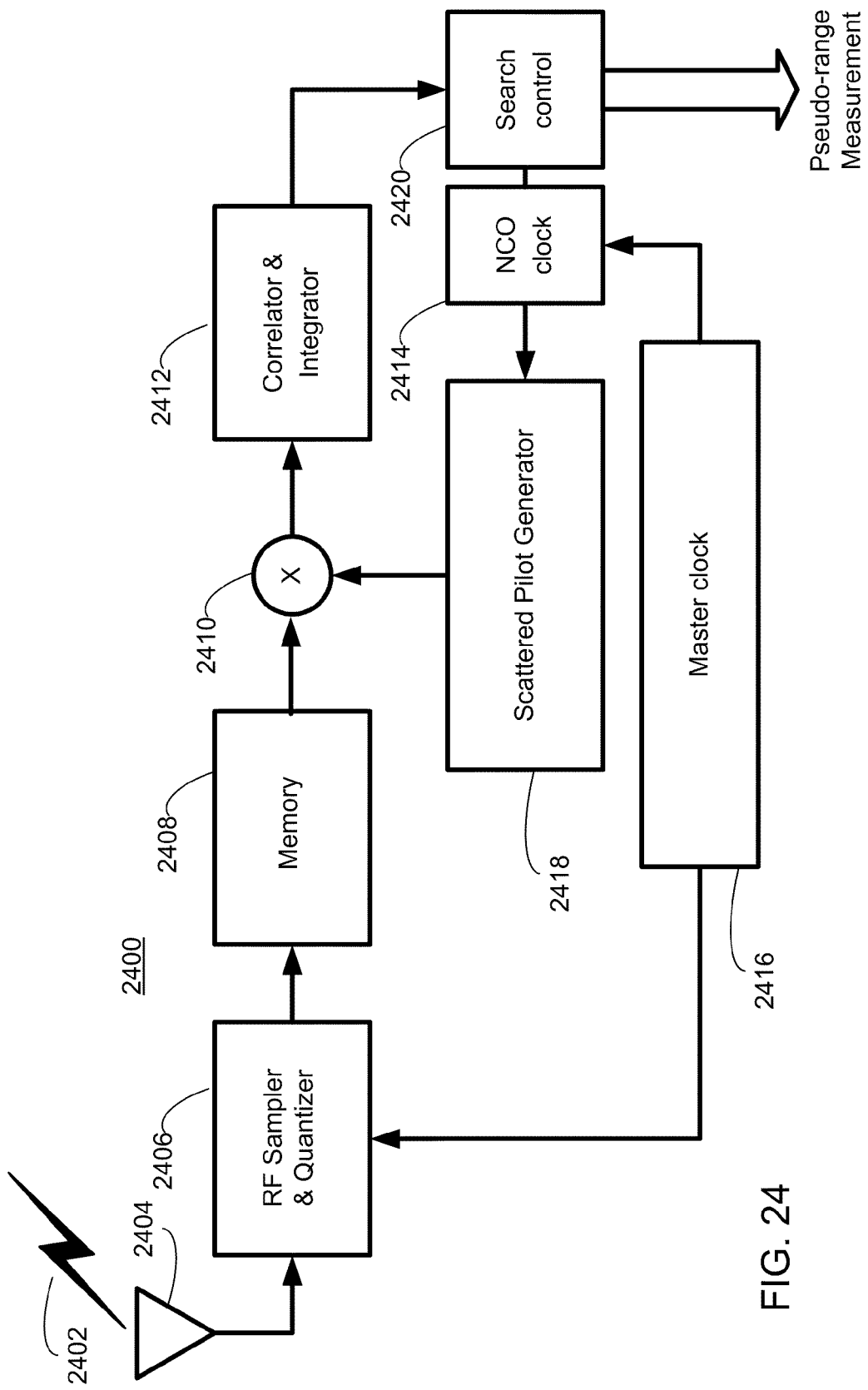
FIG. 24 depicts an implementation of a receiver for use in generating a pseudo-range measurement based on ETSI DTV signals.

FIG. 24 depicts an implementation 2400 of a receiver for use in generating a pseudo-range measurement. In one implementation, receiver 2400 is implemented within user device 102. In another implementation, receiver 2400 is implemented within monitor units 108.

RF Sampler & Quantizer 2406 sequentially tunes antenna 2404 to each of the digital TV signals 2402 in the area, RF amplifies, and downconverts the signal to IF or baseband. The wideband filtered signal with its 8 MHz bandwidth is then sampled and quantized by RF sampler and quantizer 2406. Then a segment of the quantized signal including four or more symbol intervals is stored in memory 2408. Preferably a substantially longer segment of perhaps 0.1 seconds or more in duration is used to improve the averaging time and to improve noise performance.

Mixer 2410 and correlator and integrator 2412 sequentially correlate the stored time segment of the signal with various time offset versions of the reference scattered pilot carrier generated by scattered pilot generator 2418. The reference signal is stepped in time by predetermined time steps to find the peak of the autocorrelation function. The step size is selected to produce a number of samples from the autocorrelation function that is sufficient to identify the autocorrelation peak. In one implementation, a large step size is initially used to obtain an estimate of the autocorrelation peak; then a smaller step size is used to refine that estimate. As shown below, implementations of the present invention use time samples spaced by $1/(1116*20,000)=244$ ns. A correlator search control 2420 searches for the major peak in the autocorrelation function and when found converts that measurement of pseudo-range to digitized form. Receiver 2400 then sequentially performs the same set of functions on the other digital TV signals 2402 available in the area from other DTV towers. It is not necessary to make multiple measurements from signals transmitted from the same DTV tower. The set of 3 or more pseudo-range measurements is then sent to DTV location server 110 by way of digital cellular or other wireless link.

Note that the position location operation at the subscriber handset or other device need only take place when the subscriber needs position location. For a subscriber walking slowly, in a slowly moving vehicle, or sitting in a building or field in an emergency, this location information need only be measured infrequently. Thus the battery or other power source can be very small.

Although receiver 2400 implements a cross-correlator with a sum of digital signals it will be clear to one skilled in the relevant arts that alternate implementations can simplify the circuitry by using FFT/DFT (fast Fourier transform/direct Fourier transform) processing for example. Furthermore, although receiver 2400 processes the samples at intermediate frequency (IF), other implementations process the samples in analog or digital form, and can operate at IF or at baseband. Still other implementations process the samples in the frequency domain.

Other signals within the DVB-T structure can also be used for position location. For example, a wide laning technique could be applied to the continuous pilot signals. However, such techniques as wide laning involve inherent resolution of cycle ambiguities. Techniques for resolving such ambiguities are well-known in the art. One such technique is disclosed in M. Rabinowitz, Ph.D. Thesis: A Differential Carrier Phase Navigation System Combining GPS with Low Earth Orbit Satellites for Rapid Resolution of Integer Cycle Ambiguities, 2000, Department of Electrical Engineering, Stanford University, pages 59-76, which is incorporated herein by reference.

In receiver correlators and matched filters there are two important sources of receiver degradation. The user device local oscillator is often of relatively poor stability in frequency. This instability affects two different receiver parameters. First, it causes a frequency offset in the receiver signal. Second, it causes the received bit pattern to slip relative to the symbol rate of the reference clock. Both of these effects can limit the integration time of the receiver and hence the processing gain of the receiver. The integration time can be increased by correcting the receiver reference clock. In one implementation a delay lock loop automatically corrects for the receiver clock.

In another implementation a NCO (numerically controlled oscillator) clock 2414 adjusts the clock frequency of the receiver to match that of the incoming received signal clock frequency and compensate for drifts and frequency offsets of the local oscillator in user device 102. Increased accuracy of the clock frequency permits longer integration times and better performance of the receiver correlator. The frequency control input of NCO clock 2414 can be derived from master clock 2416, a receiver symbol clock rate synchronizer, tracking of the DVB-T pilot carrier, or other clock rate discriminator techniques installed in NCO clock 2414.

The current DVB-T signal is described in a document entitled Digital Video Broadcasting (DVB); Framing structure, channel coding and modulation for digital terrestrial television, document number ETSI EN 300 744, V1.4.1 (2001-01). The DVB-T signal is a complex orthogonal frequency-division multiplexing (OFDM) signal that carries 188 Byte MPEG (Moving Picture Expert Group) packets using either 1512 or 6048 separate carriers. Most of these components carry the random-like data modulation of the video TV signals and are less useful for precision tracking at low signal levels. Note that for purposes of position location, the user device may be in locations where the entire information content of the DVB-T signal is not available.

However the DVB-T DTV signal has embedded in it additional components that can be used through the techniques described herein for position location. For example, the DVB-T DTV signal includes two types of periodic broadband pilot signals. The signal contains both a set of continuous pilot carriers and a set of scattered pilot carriers. The DVB-T signals have two modes: 2K and 8K. Some of the parameters of these two modes are described in Table 2 below. While implementations of the invention are described with reference to the 8K signals, the techniques described also apply to the 2K signals.

TABLE 2

| Parameter | 2K mode | 8K mode |
|---|---|---|
| Number of carriers K | 1705 | 6817 |
| Symbol Duration | 224 microseconds | 896 microseconds |
| Carrier spacing | 4464 Hz | 1116 Hz |
| Total spacing of signal | 7.61 MHz | 7.61 MHz |

In addition, while implementations of the invention are discussed with reference to the 8 MHz DVB-T signal, implementations can be used with signals of other bandwidths. Further, implementations of the invention can employ a subset of the bandwidth of the DVB-T signal. For example, an implementation of the invention can achieve satisfactory results using only 6 MHz of an 8 MHz DVB-T signal. Implementations of the invention can be extended to use future enhancements to the DVB-T signal.

Figure 25:
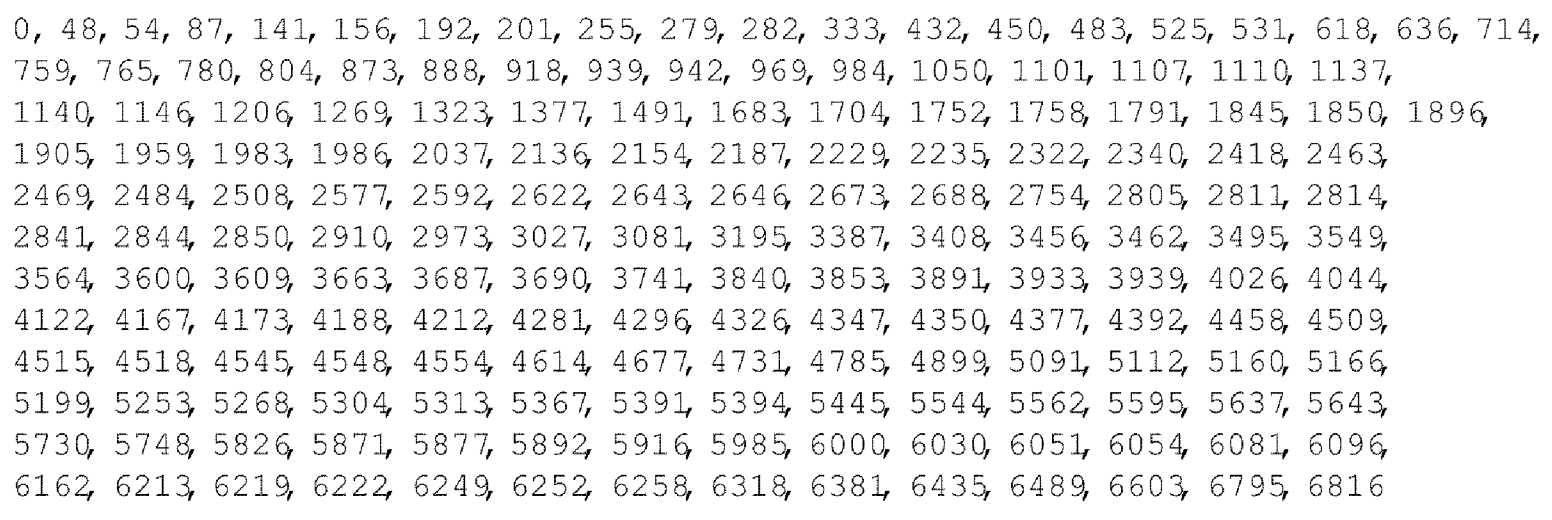
Figure 26:
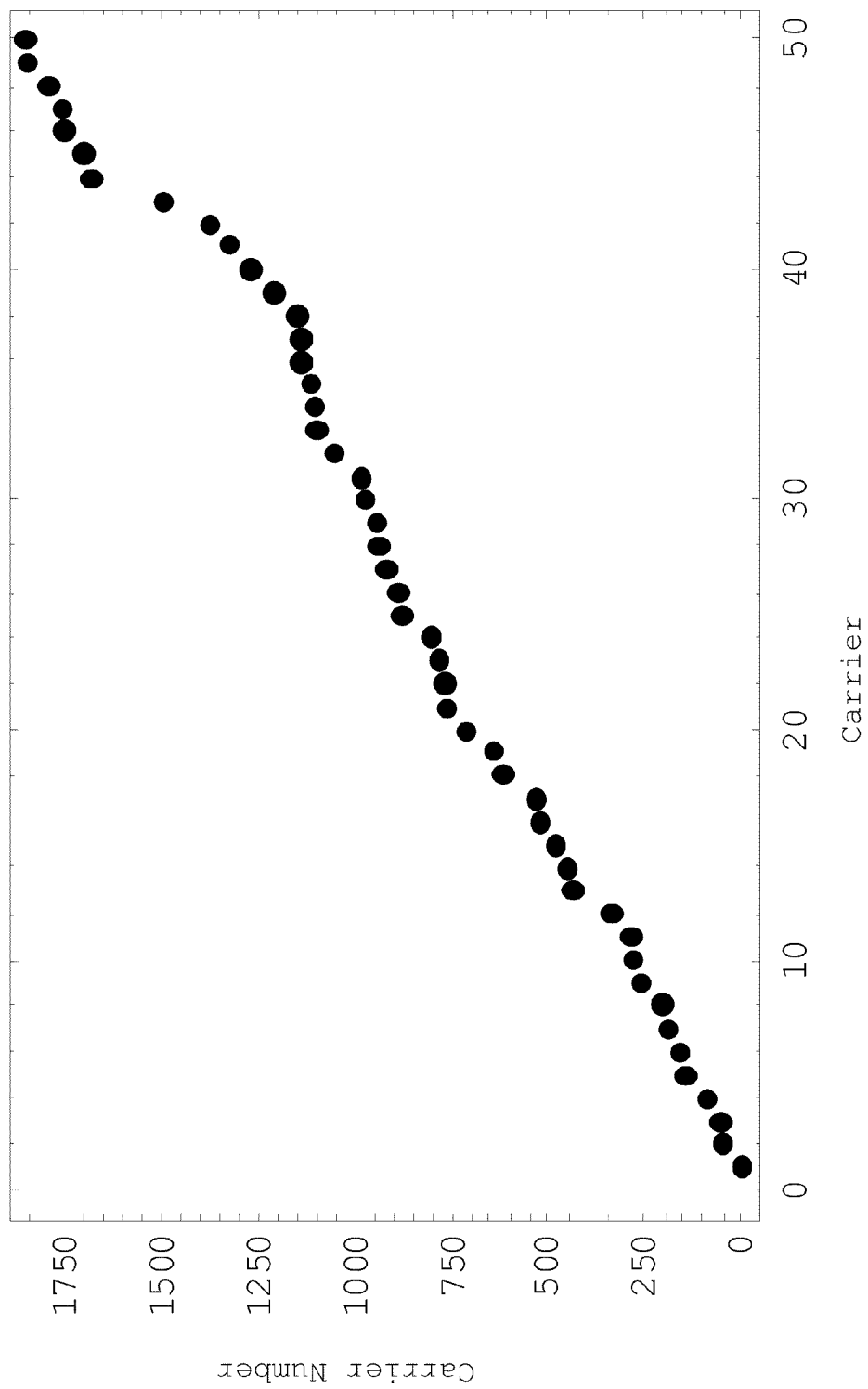
FIG. 26 depicts the first 50 carriers of the continuous pilot carriers.

The DVB-T continuous pilot signals in the 8K mode are a set of 177 carriers each having a constant reference binary±1 amplitude selected by a PN sequence described below. The carriers are spaced by 1116 Hz. The carrier numbers for the first 50 carrier frequencies are shown in FIG. 25. The frequency of a carrier can be found by taking the product of the carrier number and 1116 Hz. FIG. 26 depicts the first 50 carriers of the continuous pilot carriers. The vertical scale is the carrier number. The minimum frequency offset between any two continuous pilot carriers is 3×1116 Hz which determines the time ambiguity of these continuous carriers. This signal can be likened to a sidetone ranging signal commonly used in ranging measurements. However it differs in that the power is divided among 177 separate carriers. Instead however one can correlate the signal with a composite reference waveform of 177 carriers generated in FFT fashion. However this composite continuous pilot signal has a poor autocorrelation function with many significant spectral sidelobes as shown in FIG. 27.

Figure 27:
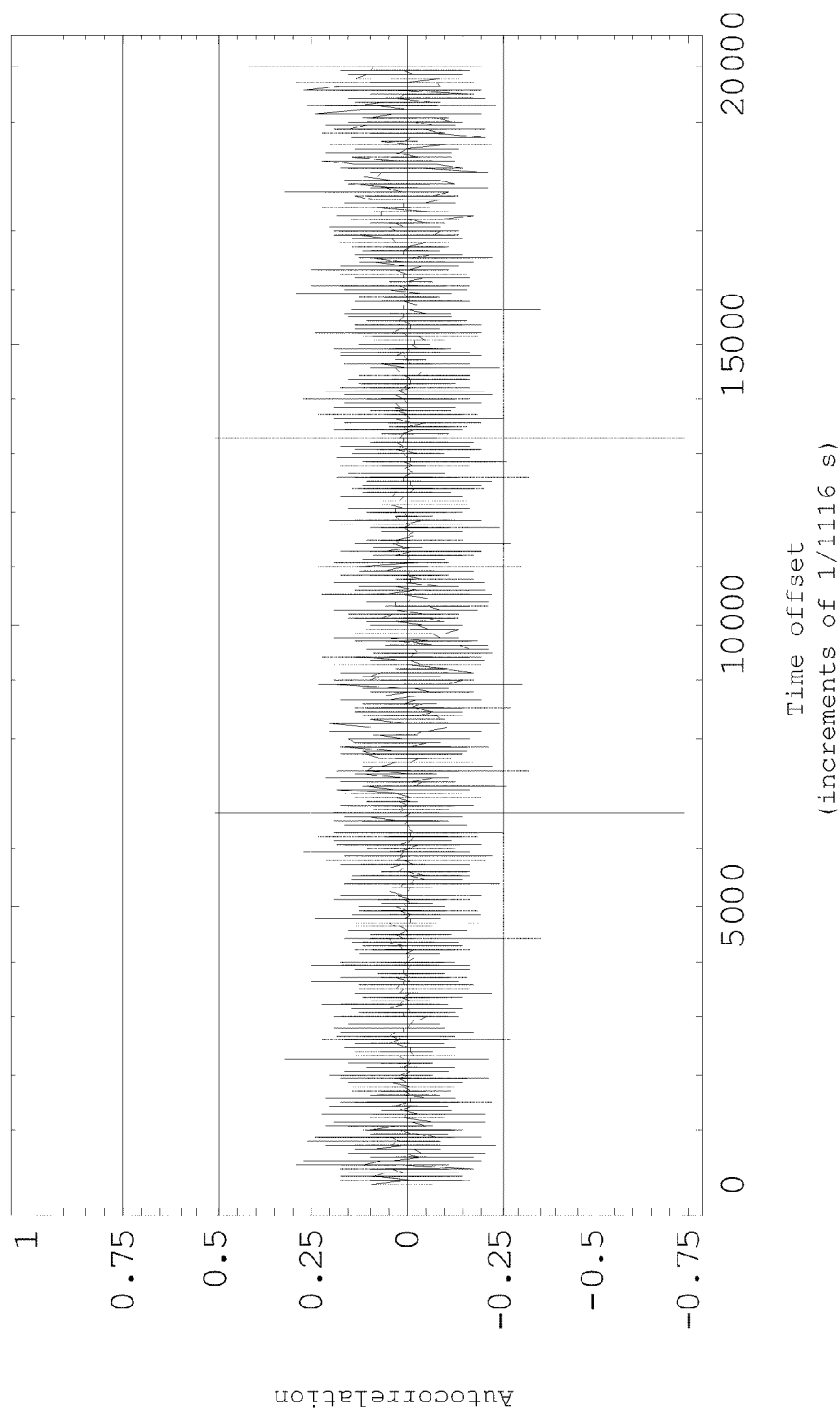
FIG. 27 depicts the autocorrelation function of the composite continuous pilot carriers with 177 parallel carriers in the 8K mode.

FIG. 27 depicts the autocorrelation function of the composite continuous pilot carriers with 177 parallel carriers in the 8K mode. The time increments are given on the horizontal scale in increments of $1/1116$ s. The signal was sampled at a rate of 1116×20,000 samples/s. However as can be seen, the sidelobe levels of this signal are quite high with many peaks above 0.2 in magnitude.

Figure 28:
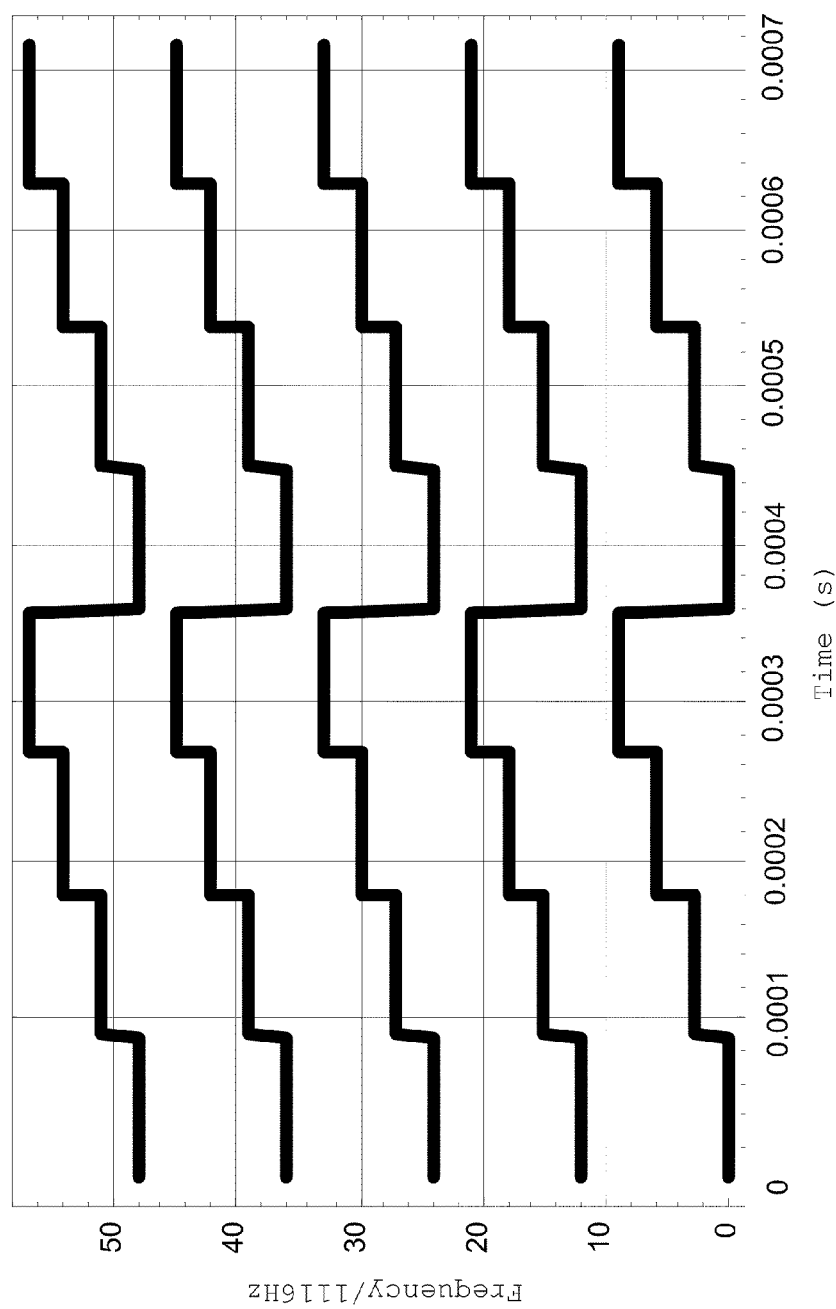
FIG. 28 depicts the frequency hopping of the first 5 scattered pilot carriers.

The 8K scattered pilot carriers are a set of 568 uniformly-spaced pilot carriers, each frequency hopped in a chirp-like fashion over 4 sequentially increasing frequencies. Thus each pilot begins at a frequency that is a multiple of 12×1116 Hz and remains at that frequency for the remainder of a symbol duration ($1/1116$ s). Then for the next symbol the pilot hops to a new frequency that is higher by 3×1116 Hz and has a new ±1 sign. The pilot repeats this increase for a total of 3 increments and then returns to its original frequency. The frequency hopping of the first 5 of these 568 scattered pilots is shown in FIG. 28. In each time increment the pilot carrier increases in frequency by 3 increments of 1116 Hz. Each of the 6816/12=568 scattered pilots is spaced by 12×1116=13,392 Hz. For the 2K mode there are 142 scattered pilots spaced by 53,568 Hz.

Each pilot carrier is given a ±1 sign amplitude as governed by a PN sequence of an 11 stage shift register with a polynomial $$x^{11}+x^2+1 \tag{18}$$

This PN sequence generates a sequence $$w[k]=\pm1 \tag{19}$$

where k is the frequency of the individual pilot carrier as given above. Thus each time a pilot carrier changes to a new frequency it also changes its sign according to w[k].

Thus the frequency of each of the scattered pilots can be expressed in terms of t and p as $$k[t,p]=3 \operatorname{Mod}[n[t],4]+12p \tag{20}$$

where p is the number of the pilot and n[t] is the quantized time interval $$n[t]=\lfloor 1116t \rfloor \tag{21}$$

Each signal component for each of the 568 values of p is $$s[t,p]=w[k[t,p]] \sin[2\pi k[t,p]\times 1116 t]] \tag{22}$$

The total scattered pilot signal is then the sum of 568 frequency hopped individual pilot carriers $$S_{total}[t] = \sum_{p=0}^{p=867} s[t, p] \tag{23}$$

Figure 29:
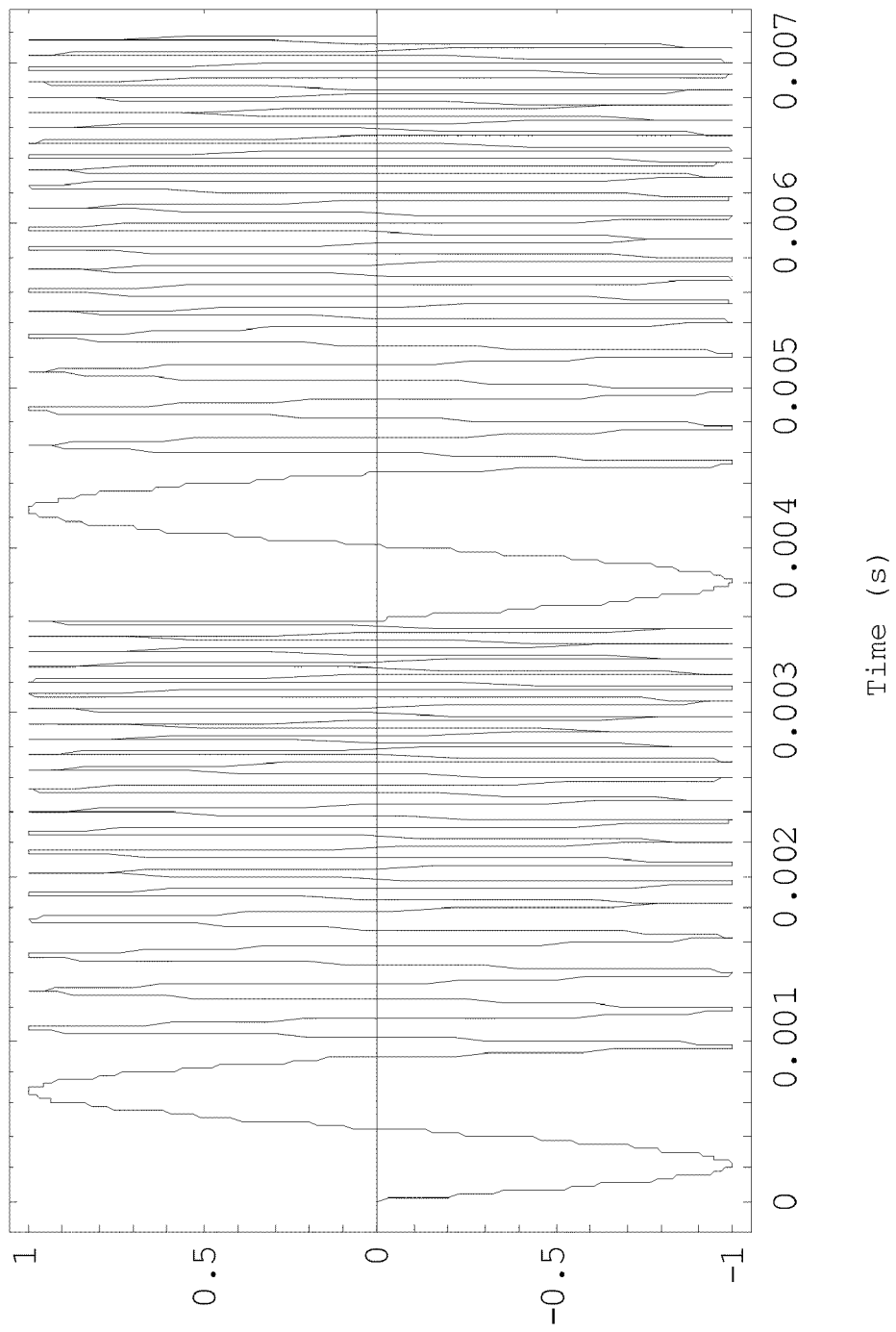
FIG. 29 depicts the waveform of one example carrier with no sign reversals over 8 time increments.

FIG. 29 depicts the waveform of one example carrier with no sign reversals over 8 time increments. Time is given in seconds. This scattered pilot carrier then has a total of 6816/12=568 carriers each of which hops sequentially over 4 frequencies for a total of 568×4=2272 total frequencies in a chirp-like fashion.

Figure 30:
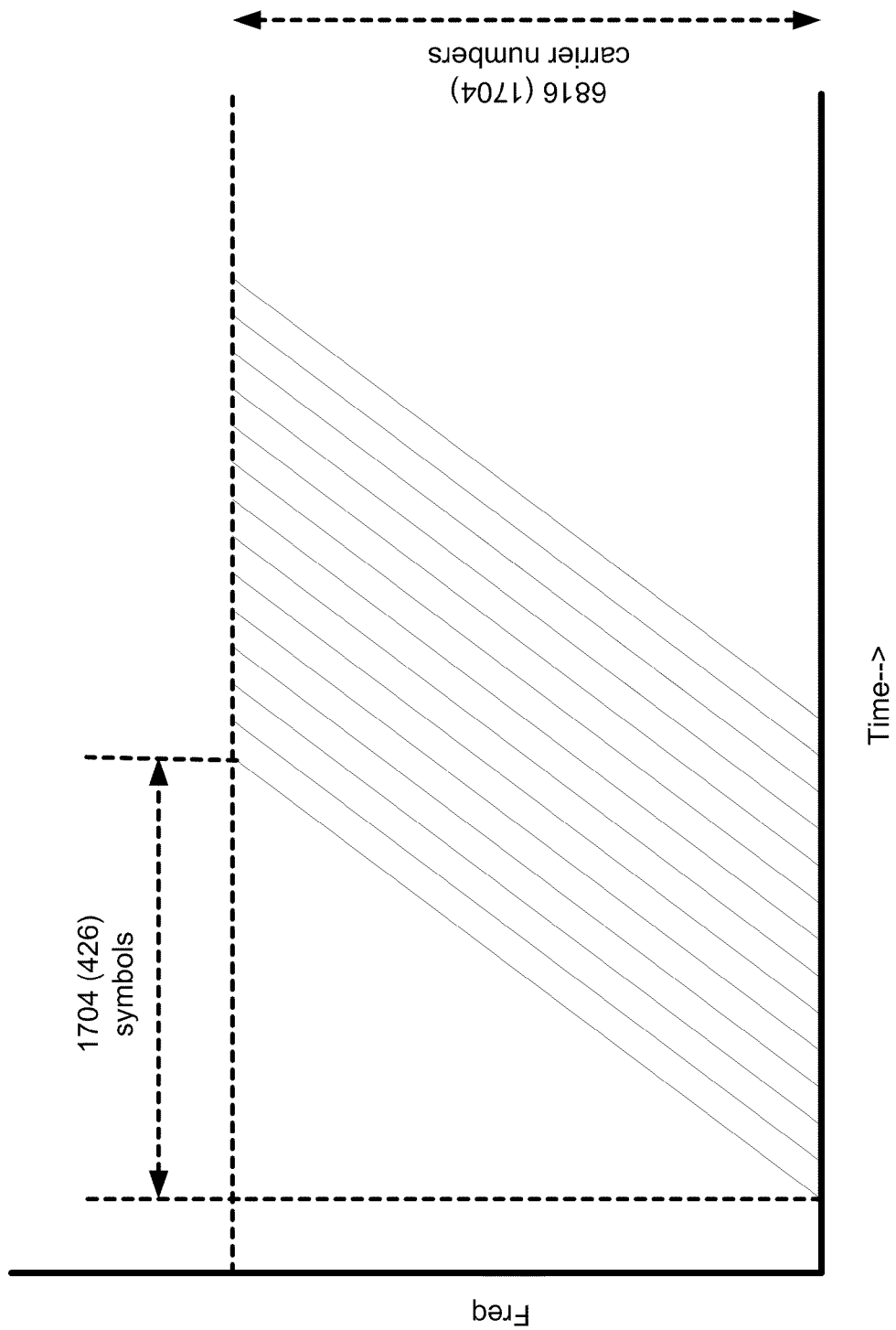
FIG. 30 is another view of the scattered pilot carriers.

FIG. 30 is another view of the scattered pilot carriers. In FIG. 30, the diagonal lines represent the 568 8K scattered pilot carriers chirping stepwise over the entire band of 7.61 MHz (6816 carrier numbers) in 6816/4=1704 symbol intervals. Thus at any one time instant there are 568 simultaneous chirp carriers. Each chirp carrier sweeps the entire 7.61 MHz frequency band in stepwise fashion. The numbers shown are for the 8K mode where the symbol duration is 896 microseconds (us). The corresponding numbers for the 2K mode are shown in parentheses where the symbol duration is 224 us.

Figure 31:
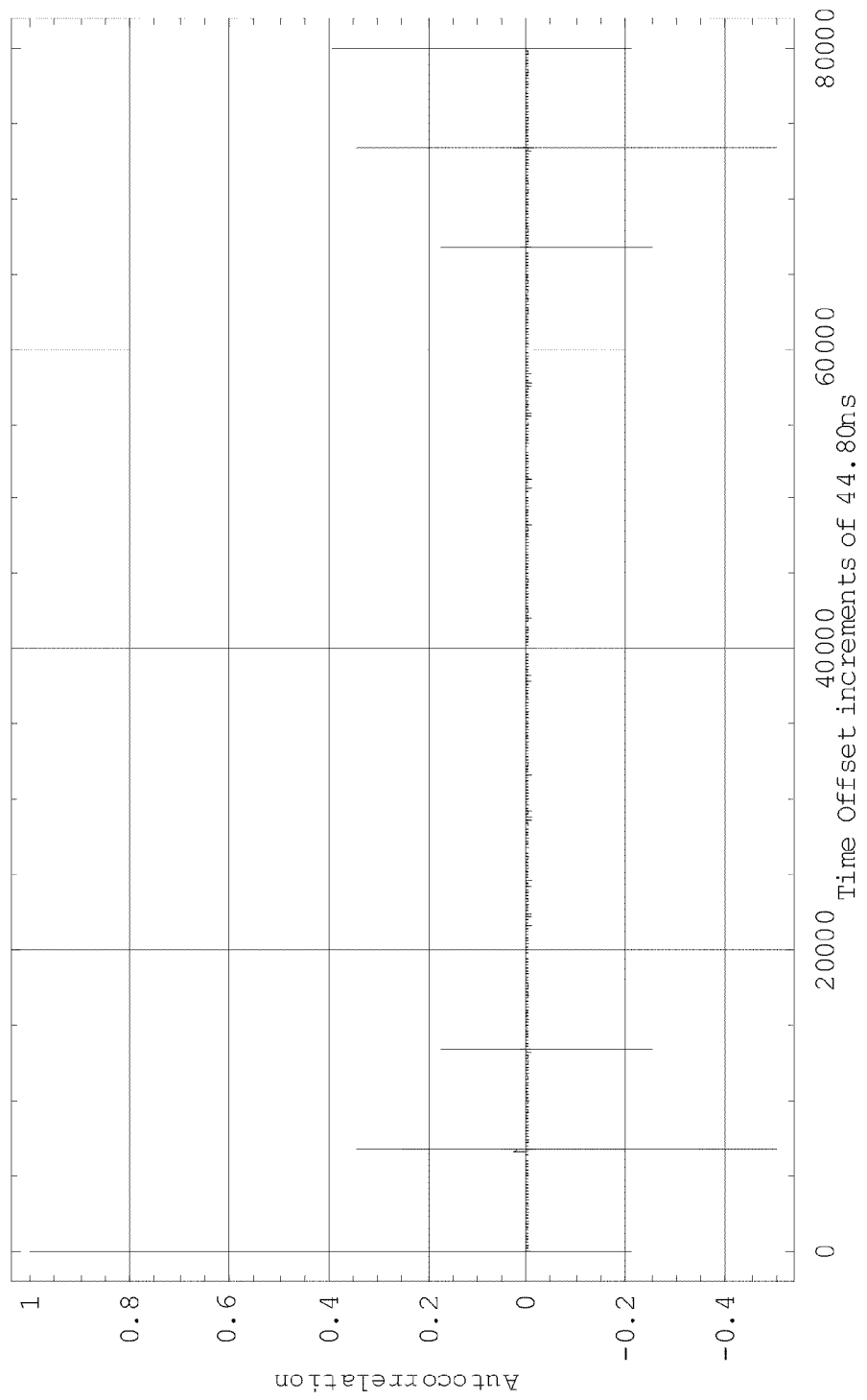
FIG. 31 depicts the autocorrelation function of the composite set of 568 frequency-hopped scattered pilot carriers.
Figure 32:
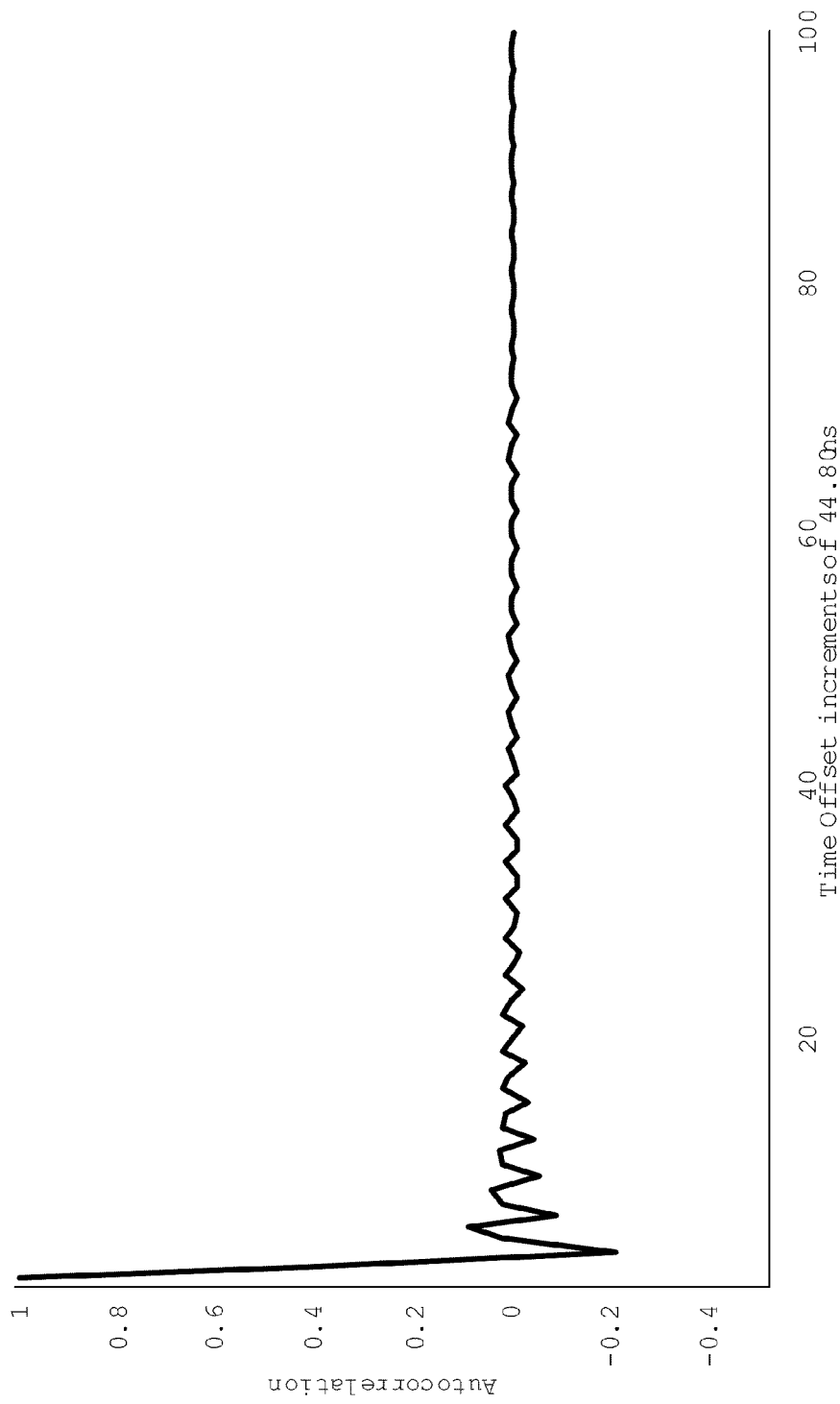
FIG. 32 shows the detailed fine structure of the scattered pilot composite signal observed over the first 100 time increments.
Figure 33:
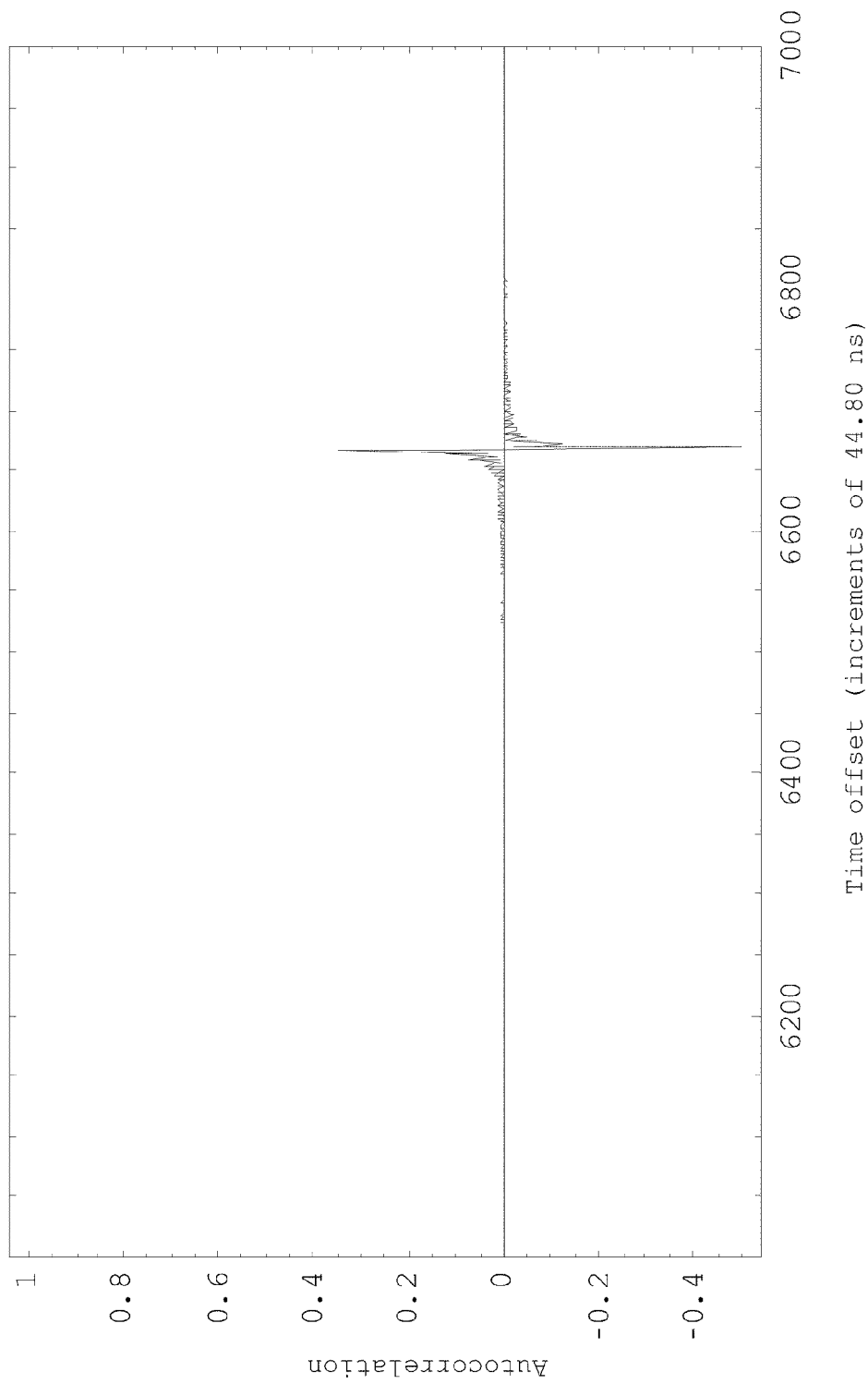
FIG. 33 shows the fine structure of the doublet sidelobe of the scattered pilot composite carrier.

This signal has a very good autocorrelation function as shown in FIGS. 31-33. FIG. 31 depicts the autocorrelation function of the composite set of 568 frequency-hopped scattered pilot carriers. The composite signal has been sampled at a rate 1116×20,000=22.32 MHz. Thus there are 80,000 samples over the 4-symbol time increment period of the scattered pilot carriers. Note the very low sidelobe cross-correlation of this signal with the exception of the 4 sidelobes which as shown below are doublets. FIGS. 32 and 33 show the detail over much smaller time increments.

FIG. 32 shows the detailed fine structure of the scattered pilot composite signal observed over the first 100 time increments. Note the low levels of the autocorrelation function outside of the peak.

FIG. 33 shows the fine structure of the doublet sidelobe of the scattered pilot composite carrier. Note again the very small values of the autocorrelation function of this signal outside of the main peak and the 4 sidelobe peaks.

Figure 34:
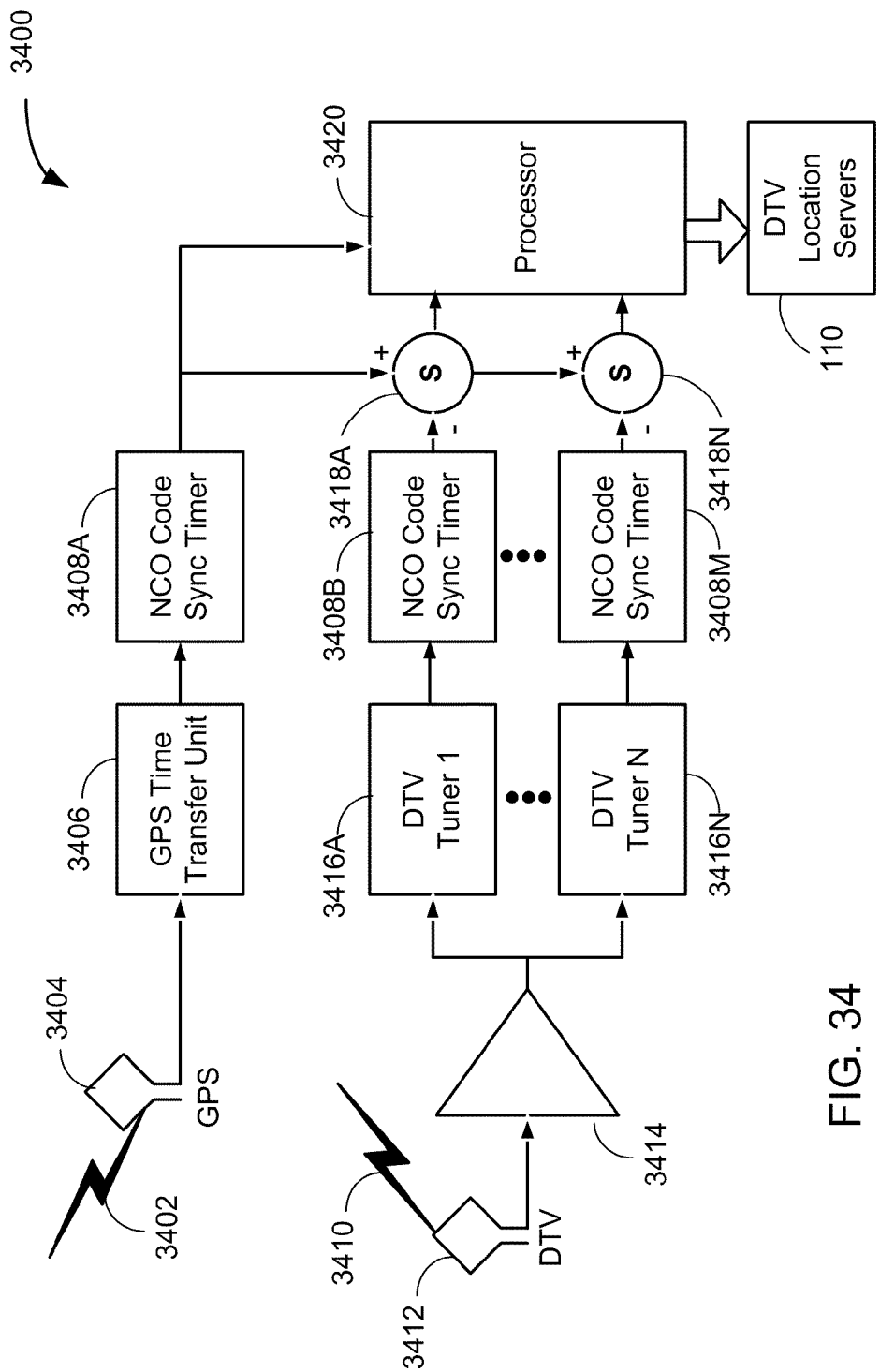
FIG. 34 depicts an implementation of a monitor unit.

FIG. 34 depicts an implementation 3400 of monitor unit 108. An antenna 3404 receives GPS signals 3402. A GPS time transfer unit 3406 develops a master clock signal based on the GPS signals. In order to determine the offset of the DTV transmitter clocks, a NCO (numerically controlled oscillator) code synchronization timer 3408A develops a master synchronization signal based on the master clock signal. The master synchronization signal can include the DVB-T scattered pilot carriers. In one implementation, the NCO field synchronization timers 3408A in all of the monitor units 108 are synchronized to a base date and time. In implementations where a single monitor unit 108 receives DTV signals from all of the same DTV transmitters that user device 102 does, it is not necessary to synchronize that monitor unit 108 with any other monitor unit for the purposes of determining the position of user device 102. Such synchronization is also unnecessary if all of the monitor stations 108, or all of the DTV transmitters, are synchronized to a common clock.

A DTV antenna 3412 receives a plurality of DTV signals 3410. In another implementation, multiple DTV antennas are used. An amplifier 3414 amplifies the DTV signals. One or more DTV tuners 3416A through 3416N each tunes to a DTV channel in the received DTV signals to produce a DTV channel signal. Each of a plurality of NCO code synchronization timers 3408B through 3408M receives one of the DTV channel signals. Each of NCO code synchronization timers 3408B through 3408M extracts a channel synchronization signal from a DTV channel signal. The channel synchronization signal can include the DVB-T scattered pilot carriers. In one implementation, the continuous pilot signal and symbol clock signal within the DVB-T signal are used as acquisition aids.

Each of a plurality of summers 3418A through 3418N generates a clock offset between the master synchronization signal and one of the channel synchronization signals. Processor 3420 formats and sends the resulting data to DTV location server 110. In one implementation, this data includes, for each DTV channel measured, the identification number of the DTV transmitter, the DTV channel number, the antenna phase center for the DTV transmitter, and the clock offset. This data can be transmitted by any of a number of methods including air link and the Internet. In one implementation, the data is broadcast in spare MPEG packets on the DTV channel itself.

In another implementation, the receiver is software-based. For example, receiver 1800 of FIG. 18 may be programmed to process the incoming DTV signals.

Now the processing of the DTV channel signal by DSP 1714 is described for a coherent software receiver. A nominal offset frequency for the downconverted sampled signal is assumed. If this signal is downconverted to baseband, the nominal offset is 0 Hz. The process generates the complete autocorrelation function based on samples of a signal s(t). The process may be implemented far more efficiently for a low duty factor signal. Let $T_i$ be the period of data sampled, $\omega_{in}$ be the nominal offset of the sampled incident signal, and let $\omega_{offset}$ be the largest possible offset frequency, due to Doppler shift and oscillator frequency drift. The process implements the pseudocode listed below.

$R_{max}=0$

Create a complex code signal $$s_{code}(t)=C_i(t)+jC_q(t)$$

where $C_i$ is the function describing the in-phase baseband signal and $C_q$ is the function describing the quadrature baseband signal.

Compute $F\{s_{code}\}^*$ where F is the Fourier transform operator, and * is the conjugate operator.

For $$\omega = \omega_{in} - \omega_{offset} \text{ to } \omega_{in} + \omega_{offset} \text{ step } \frac{\pi}{2T_i}$$

Create a complex mixing signal $$s_{mix}(t)=\cos(\omega t)+j\sin(\omega t), t=[0\ldots T_i]$$

Combine the incident signal s(t) and the mixing signal $s_{mix}(t)$ $$s_{comb}(t)=s(t)s_{mix}(t)$$

Compute the correlation function $R(\tau)=F^{-1}\{F(s_{code})F(s_{comb})\}$

If $\max_\tau |R(\tau)| > R_{max}$, then $R_{max} \leftarrow \max_\tau |R(\tau)|, R_{store}(\tau) = R(\tau)$ Next $\omega$ Upon exit from the process, $R_{store}(\tau)$ will store the correlation between the incident signal s(t) and the complex code signal $s_{code}(t)$. $R_{store}(\tau)$ may be further refined by searching over smaller steps of $\omega$. The initial step size for $\omega$ must be less then half the Nyquist rate $$\frac{2\pi}{T_i}.$$

The time offset $\tau$ that produces the maximum correlation output is used as the pseudo-range.

Additional Position Location Examples

A number of embodiments of the invention have been described. Nevertheless, it will be understood that various modifications may be made without departing from the spirit and scope of the invention. For example, many specific details have been described with respect to certain ATSC and DVB-T digital television signals. However, the invention is also applicable to other DTV signals, including DTV signals as defined by the Japanese Integrated Service Digital Broadcasting-Terrestrial (ISDB-T).

As another example, the invention can be implemented in digital electronic circuitry, or in computer hardware, firmware, software, or in combinations thereof. Various signals and signal processing techniques can be implemented in either the digital or analog domain. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

As another example, although one method for tracking the ATSC signal using the in-phase and quadrature channels is described, it should be clear that one can use only the in-phase channel, only the quadrature channel or any combination of the two to provide accurate tracking Furthermore it should be clear that there are several methods of tracking DTV signals using various forms of conventional delay lock loops and through the use of various types of matched filters.

Implementations of the present invention exploit the low duty factor of the DTV signal in many ways. For example, one implementation employs a time-gated delay-lock loop (DLL) such as that disclosed in J. J. Spilker, Jr., Digital Communications by Satellite, Prentice-Hall, Englewood Cliffs N.J., 1977, Chapter 18-6. Other implementations employ variations of the DLL, including coherent, noncoherent, and quasi-coherent DLLs, such as those disclosed in J. J. Spilker, Jr., Digital Communications by Satellite, Prentice-Hall, Englewood Cliffs N.J., 1977, Chapter 18 and B. Parkinson and J. Spilker, Jr., Global Positioning System-Theory and Applications, AIAA, Washington, D.C., 1996, Vol. 1, Chapter 17, Fundamentals of Signal Tracking Theory by J. Spilker, Jr. Other implementations employ various types of matched filters, such as a recirculating matched filter.

As a final example, in some implementations, DTV location server 110 employs redundant signals available at the system level, such as pseudo-ranges available from the DTV transmitters, making additional checks to validate each DTV channel and pseudo-range, and to identify DTV channels that are erroneous. One such technique is conventional receiver autonomous integrity monitoring (RAIM).

Accordingly, other embodiments are within the scope of the following claims.

What is claimed is:

1. A method for providing a navigation service, the method comprising:
  accessing data representing a location of a device, the location determined from pseudo-ranges between the device and a plurality of digital television (DTV) transmitters, the pseudo-ranges calculated from broadcast DTV signals received by the device from the DTV transmitters, wherein each of the pseudo-ranges represents a difference between a time of transmission from the respective DTV transmitter of a component of the respective DTV signal and a time of reception at the device of the component, as well as a clock offset of the device; and
  providing data representing navigation information according to the location of the device.

2. The method of claim 1, wherein the navigation information comprises a map of a local vicinity around the device.

3. The method of claim 1, wherein the navigation information comprises directions between the location of the device and a second location.

4. The method of claim 3, wherein the second location is determined by a user of the device.

5. The method of claim 1, wherein the navigation information comprises directions between the location of the device and a location of a second device, wherein the location of the second device is determined from pseudo-ranges between the second device and a plurality of DTV transmitters, the pseudo-ranges calculated from broadcast DTV signals received by the second device from the DTV transmitters.

6. The method of claim 1, further comprising:
  periodically accessing an updated location of the device; and
  periodically providing updated navigation information according to the updated location.

7. The method of claim 1, wherein providing navigation information comprises:
  the device providing the navigation information.

8. The method of claim 1, wherein accessing the location of the device comprises:
  receiving the location from a DTV location server.

9. The method of claim 1, wherein providing navigation information comprises:
  a service provider system retrieving the navigation information according to the location of the device; and
  the service provider system transmitting the navigation information to the device.

10. The method of claim 1, wherein providing navigation information comprises:
  a service provider system determining a key code for navigation information according to the location of the device, the key code enabling retrieval of the navigation information; and
  the service provider system transmitting the key code to the device.

11. The method of claim 1 wherein the DTV signals are American Television Standards Committee (ATSC) signals.

12. The method of claim 1 wherein the DTV signals are European Telecommunications Standards Institute Digital Video Broadcasting-Terrestrial (DVB-T) signals.

13. A computer software product, comprising computer executable instructions stored on a computer readable medium, to effect, when executed, a method for providing navigation information according to a location of a device, comprising:
  accessing a location of the device, the location determined from pseudo-ranges between the device and a plurality of DTV transmitters, the pseudo-ranges calculated from broadcast DTV signals received by the device from the DTV transmitters, wherein each of the pseudo-ranges represents a difference between a time of transmission from the respective DTV transmitter of a component of the respective DTV signal and a time of reception at the device of the component, as well as a clock offset of the device; and providing navigation information according to the location of the device.

14. The computer software product of claim 13, wherein the navigation information comprises a map of a local vicinity around the device.

15. The computer software product of claim 13, wherein the navigation information comprises directions between the location of the device and a second location.

16. The computer software product of claim 15, wherein the second location is determined by a user of the device.

17. The computer software product of claim 13, the effected method further comprising:
  periodically accessing an updated location of the device; and
  periodically providing updated navigation information according to the updated location.

18. A system for providing a navigation service, comprising:
  a device to receive broadcast DTV signals from a plurality of DTV transmitters; and
  a DTV location server to determine a location of the device from pseudo-ranges between the device and the DTV transmitters, the pseudo-ranges calculated from the received DTV signals, wherein each of the pseudo-ranges represents a difference between a time of transmission from the respective DTV transmitter of a component of the respective DTV signal and a time of reception at the device of the component, as well as a clock offset of the device.

19. The system of claim 18 further comprising a service provider system to provide navigation information according to the location of the device.

20. The system of claim 19 wherein:
  the device serves as the DTV location server by determining the location from the pseudo-ranges; and
  the device serves as the service provider system by providing the navigation information.

21. The system of claim 18 wherein:
  the device serves as the DTV location server by determining the location from the pseudo-ranges.

* * * * *